US012812539B2

(12) United States Patent
Da Silva

(10) Patent No.: US 12,812,539 B2
(45) Date of Patent: Nov. 24, 2026

(54) BEAM MANAGEMENT FOR DEACTIVATED SECONDARY CELL GROUP (SCG)

(71) Applicant: Telefonaktiebolaget LM Ericsson (publ), Stockholm (SE)

(72) Inventor: Icaro Leonardo Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 584 days.

(21) Appl. No.: 18/025,425

(22) PCT Filed: Sep. 16, 2021

(86) PCT No.: PCT/SE2021/050888
§ 371 (c)(1),
(2) Date: Mar. 9, 2023

(87) PCT Pub. No.: WO2022/071840
PCT Pub. Date: Apr. 7, 2022

(65) Prior Publication Data

US 2023/0362817 A1 Nov. 9, 2023

Related U.S. Application Data

(60) Provisional application No. 63/084,642, filed on Sep. 29, 2020.

(51) Int. Cl.
*H04W 52/02* (2009.01)
*H04W 24/10* (2009.01)
*H04W 72/232* (2023.01)

(52) U.S. Cl.
CPC ....... *H04W 52/0235* (2013.01); *H04W 24/10* (2013.01); *H04W 72/232* (2023.01)

(58) Field of Classification Search
None
See application file for complete search history.

(56) References Cited

U.S. PATENT DOCUMENTS 10,965,434 B1 3/2021 Babaei
2019/0215896 A1 7/2019 Zhou et al.
(Continued)

FOREIGN PATENT DOCUMENTS

CN 110268741 A 9/2019
CO 2021001677 A2 2/2021
(Continued)

OTHER PUBLICATIONS

"3GPP TS 36.300 V16.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Sep. 2020, pp. 1-390.
(Continued)

*Primary Examiner* — Walter J Divito
(74) *Attorney, Agent, or Firm* — Murphy, Bilak & Homiller, PLLC

(57) ABSTRACT

Embodiments include methods for a user equipment (UE) configured to communicate with a wireless network via a master cell group (MCG) and a secondary cell group (SCG). Such methods include entering a reduced-energy mode for the SCG responsive to receiving a first command via the MCG or the SCG. Such methods also include, while in the reduced-energy mode for the SCG and in a connected mode for the MCG, performing SCG measurements and reporting the SCG measurements to the wireless network (e.g., via MCG or SCG). Other embodiments include complementary methods for first and second network nodes arranged, respectively, to provide the MCG and the SCG, as well as UEs and network nodes configured to perform the exemplary methods.

15 Claims, 32 Drawing Sheets

(56) References Cited

U.S. PATENT DOCUMENTS

| | | | | |
|---|---|---|---|---|
| 2020/0100154 | A1 | 3/2020 | Cirik et al. | |
| 2020/0120522 | A1 | 4/2020 | Xiao et al. | |
| 2020/0266876 | A1 | 8/2020 | Yu et al. | |
| 2020/0314880 | A1* | 10/2020 | Cirik | H04W 72/1273 |
| 2020/0351771 | A1 | 11/2020 | Geekie et al. | |
| 2021/0160126 | A1 | 5/2021 | Cirik et al. | |
| 2021/0175955 | A1 | 6/2021 | Kung et al. | |
| 2022/0007256 | A1 | 1/2022 | Ozturk et al. | |
| 2022/0007446 | A1 | 1/2022 | Purkayastha et al. | |
| 2022/0022065 | A1 | 1/2022 | Wang et al. | |
| 2022/0052906 | A1 | 2/2022 | Awoniyi-oteri et al. | |
| 2022/0124514 | A1 | 4/2022 | Lee et al. | |
| 2022/0225457 | A1 | 7/2022 | Purkayastha et al. | |
| 2022/0394583 | A1 | 12/2022 | Deenoo et al. | |
| 2023/0189039 | A1 | 6/2023 | Turtinen et al. | |
| 2023/0217276 | A1* | 7/2023 | Chen | H04W 24/10 370/252 |
| 2023/0232259 | A1 | 7/2023 | Awoniyi-oteri et al. | |
| 2023/0262501 | A1 | 8/2023 | Rugeland et al. | |
| 2023/0275802 | A1 | 8/2023 | Awoniyi-oteri et al. | |
| 2023/0276279 | A1 | 8/2023 | Kim | |
| 2023/0337020 | A1 | 10/2023 | Da Silva et al. | |
| 2023/0362817 | A1 | 11/2023 | Da Silva | |
| 2023/0371109 | A1 | 11/2023 | Jang et al. | |
| 2024/0073984 | A1 | 2/2024 | Wu et al. | |
| 2025/0007596 | A1 | 1/2025 | Wallentin et al. | |

FOREIGN PATENT DOCUMENTS

| | | | |
|---|---|---|---|
| EP | 3525516 | A1 | 8/2019 |
| WO | 2020028792 | A1 | 2/2020 |
| WO | 2020033542 | A1 | 2/2020 |
| WO | 2020047080 | A1 | 3/2020 |
| WO | 2020063757 | A1 | 4/2020 |
| WO | 2020067806 | A1 | 4/2020 |
| WO | 2020146737 | A1 | 7/2020 |
| WO | 2020150991 | A1 | 7/2020 |
| WO | 2020156156 | A1 | 8/2020 |
| WO | 2020166848 | A1 | 8/2020 |
| WO | 2020167203 | A1 | 8/2020 |
| WO | 2020168238 | A1 | 8/2020 |
| WO | 2020172184 | A1 | 8/2020 |
| WO | 2020198746 | A1 | 10/2020 |
| WO | 2021067236 | A1 | 4/2021 |
| WO | 2022071848 | A1 | 4/2022 |

OTHER PUBLICATIONS

"UE measurements and reporting in deactivated SCG", 3GPP TSG-RAN WG2 Meeting #115-e, R2-2107423, Online, Revision of R2-2103893, Aug. 9-27, 2021, pp. 1-9.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.6.0, Jun. 2021, pp. 1-88.

"3rd Generation Partnership Project; Technical Specification Group Radio Access Network; NR; Medium Access Control (MAC) protocol specification (Release 16)", 3GPP TS 38.321 V16.6.0, Sep. 2021, pp. 1-158.

"3rd Generation Partnership Project; Technical Specification Group Radio Access Network; NR; Radio Resource Control (RRC) protocol specification (Release 16)", 3GPP TS 38.331 V16.6.0, Sep. 2021, pp. 1-961.

"Report of 3GPP TSG RAN WG2 meeting #113bis-e, Online", 3GPP TSG-RAN WG2 meeting #114-2, R2-2104xxx, Apr. 12-20, 2021, pp. 1-279.

"Report on LTE legacy, Mobility, DCCA, Multi-SIM and RAN slicing", 3GPP TSG-RAN WG2 Meeting #113 bis electronic, R2-2104301, Online, Apr. 12-Apr. 20, 2021, pp. 1-38.

"3GPP TS 38.101-4 V16.1.0", 3rd Generation Partnership Project; Technical Specification Group Radio Access Network; NR; User Equipment (UE) radio transmission and reception; Part 4: Performance requirements (Release 16), Jun. 2020, pp. 1-271.

"Draft Letter to ITU in reply to ITU_R_WP5D_TEMP_39 = RP-200037 on update submission for LTE-Advanced towards Revision 5 of Recommendation ITU-R M.2012", 3GPP TSG RAN Meeting #89e; RP-201432; Electronic Meeting, Sep. 14-18, 2020, pp. 1-4.

"Efficient SCG activation/deactivation in MR-DC", 3GPP TSG-RAN WG2 Meeting #111-e; R2-2007748; E-meeting, Aug. 17-28, 2020, pp. 1-5.

"Email report of [AT109e][046][DCCA] Fast SCell Activation (Oppo)", 3GPP TSG-RAN WG2 Meeting #109 electronic; R2-2002224, Feb. 24-Mar. 6, 2020, pp. 1-31.

"Email report of [AT110e][052][DCCA] Fast Scell Activation (Oppo)", 3GPP TSG-RAN WG2 Meeting #110; R2-2006079; Electronic, Jun. 1-12, 2020, pp. 1-13.

"3GPP TS 36.300 V16.2.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Jul. 2020, pp. 1-390.

"3GPP TS 36.321 V16.1.0", 3rd Generation Partnership Project; Technical Specification Group Radio Access Network; Evolved Universal Terrestrial Radio Access (E-UTRA); Medium Access Control (MAC) protocol specification (Release 16), Jul. 2020, pp. 1-141.

"3GPP TS 38.331 V15.1.0", 3rd Generation Partnership Project; Technical Specification Group Radio Access Network; NR; Radio Resource Control (RRC) protocol specification (Release 15), Mar. 2018, pp. 1-268.

"Efficient SCG (de)activation", 3GPP TSG-RAN WG2 #112e, Tdoc R2-2010062, Electronic meeting, Nov. 2-13, 2020, pp. 1-13.

"On fast deactivation/activation of one SG and SCells", 3GPP TSG-RAN WG2 Meeting #111-e, R2-2007068, Elbonia, Aug. 17-28, 2020, pp. 1-5.

"UE measurements and reporting in deactivated SCG", 3GPP TSG-RAN WG2 #115, Tdoc R2-2108389, Electronic meeting, Aug. 9-27, 2021, pp. 1-10.

"[AT 113-e][230][eDCCA] Solution alternatives for SCG activation and deactivation (Huawei)", 3GPP TSG-RAN WG2#113-e, R2-2101966, Online, Jan. 25-Feb. 5, 2021, pp. 1-33.

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.

"3GPP TS 36.331 V16.2.0", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, pp. 1-1081.

"3GPP TS 38.214 V15.0.0", 3rd Generation Partnership Project; Technical Specification Group Radio Access Network; NR; Physical layer procedures for data (Release 15), Dec. 2017, pp. 1-71.

"BFD on dormant SCell", 3GPP TSG-RAN WG2 Meeting #109e, R2-2000678, Elbonia, Feb. 24-Mar. 6, 2020, p. 1.

"Discussion on SCG deactivation and activation", 3GPP TSG-RAN WG2 Meeting #113 electronic, R2-2100136, Online, Jan. 25-Feb. 5, 2021, pp. 1-14.

"Framework of SCG deactivation and activation", 3GPP TSG-RAN WG2 Meeting #111 electronic, R2-2006900, e-meeting, Aug. 17-28, 2020, pp. 1-6.

"Introduction of dormancy behavior in NR", 3GPP TSG-RAN WG2 Meeting #108, R2-1914552, Reno, USA, Nov. 18-22, 2019, pp. 1-10.

"Remaining issues on NR physical downlink control channel", 3GPP TSG RAN WG1 Meeting #94bis R1-1810339 Chengdu, China,, Oct. 8-12, 2018, pp. 1-11.

"UE Power Saving Techniques", 3GPP TSG-RAN WG 1 Meeting #96, R1-1902771, Athens, Greece, Feb. 25-Mar. 1, 2019, pp. 1-15.

(56) References Cited

OTHER PUBLICATIONS

"3GPP TS 38.133 V16.4.0", 3rd Generation Partnership Project; Technical Specification Group Radio Access Network; NR; Requirements for support of radio resource management (Release 16), Jun. 2020, pp. 1-1463.
"3GPP TS 38.211 V16.2.0", 3rd Generation Partnership Project; Technical Specification Group Radio Access Network; NR; Physical channels and modulation (Release 16), Jun. 2020, pp. 1-131.
"3GPP TS 38.213 V16.2.0", 3rd Generation Partnership Project; Technical Specification Group Radio Access Network; NR; Physical layer procedures for control (Release 16), Jun. 2020, pp. 1-176.
"3GPP TS 38.321 V16.1.0", 3rd Generation Partnership Project; Technical Specification Group Radio Access Network; NR; Radio Resource Control (RRC) protocol specification (Release 16), Jul. 2020, pp. 1-151.
"3GPP TS 38.331 V16.1.0", 3rd Generation Partnership Project; Technical Specification Group Radio Access Network; NR; Radio Resource Control (RRC) protocol specification (Release 16), Jul. 2020, pp. 1-906.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.
"Views on NR Rel-17", 3GPP TSG RAN Meeting #84, RP-190919, Newport Beach, USA, Jun. 4, 2019, pp. 1-36.
"Report of 3GPP TSG RAN2#107bis meeting, Chongqing, China", 3GPP TSG-RAN WG2 meeting #108, R2-1914301, Oct. 14-18, 2019, pp. 1-283.
"Introducing suspension of SCG", 3GPP TSG RAN WG2 Meeting #107, R2-1908679, Prague, Czech, Aug. 26-30, 2019, pp. 1-4.

* cited by examiner

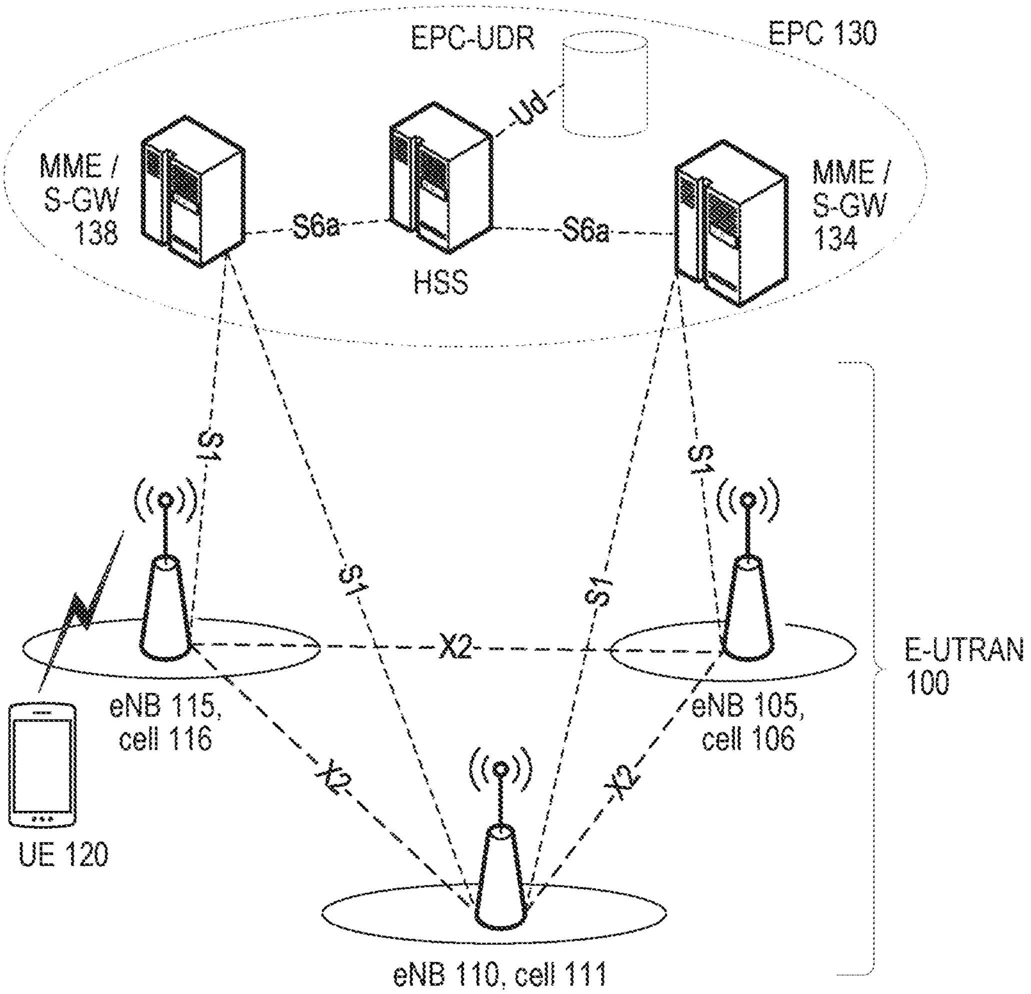
FIG. 1 -- Prior Art --
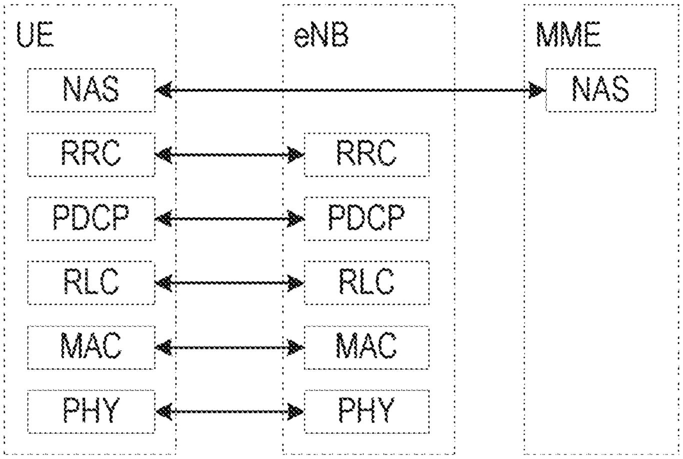
FIG. 2 -- Prior Art --

FIG. 12

```
CellGroupConfig
      > spCellConfig
            > spCellConfigDedicated
                  > initialDownlinkBWP
                        > pdsch-Config
                              > TCI-states configurations
```

```
-- ASN1START
-- TAG-PDSCH-CONFIG-START
PDSCH-Config ::=                      SEQUENCE {
    dataScramblingIdentityPDSCH         INTEGER (0..1023)                                   OPTIONAL,   -- Need S
    dmrs-DownlinkForPDSCH-MappingTypeA  SetupRelease { DMRS-DownlinkConfig }                OPTIONAL,   -- Need M
    dmrs-DownlinkForPDSCH-MappingTypeB  SetupRelease { DMRS-DownlinkConfig }                OPTIONAL,   -- Need M
    tci-StatesToAddModList              SEQUENCE (SIZE(1..maxNrofTCI-States)) OF TCI-State    OPTIONAL,   -- Need N
    tci-StatesToReleaseList             SEQUENCE (SIZE(1..maxNrofTCI-States)) OF TCI-StateId  OPTIONAL,   -- Need N
}
...
-- TAG-PDSCH-CONFIG-STOP
-- ASN1STOP
```

FIG. 13A

```
-- ASN1START
-- TAG-PDCCH-CONFIG-START
PDCCH-Config ::=                  SEQUENCE {
    controlResourceSetToAddModList    SEQUENCE(SIZE (1..3)) OF ControlResourceSet    OPTIONAL,   -- Need N
    controlResourceSetToReleaseList   SEQUENCE(SIZE (1..3)) OF ControlResourceSetId  OPTIONAL,   -- Need N
    searchSpacesToAddModList          SEQUENCE(SIZE (1..10)) OF SearchSpace          OPTIONAL,   -- Need N
    searchSpacesToReleaseList         SEQUENCE(SIZE (1..10)) OF SearchSpaceId        OPTIONAL,   -- Need N
    downlinkPreemption                SetupRelease { DownlinkPreemption }            OPTIONAL,   -- Need M
    tpc-PUSCH                         SetupRelease { PUSCH-TPC-CommandConfig }       OPTIONAL,   -- Need M
    tpc-PUCCH                         SetupRelease { PUCCH-TPC-CommandConfig }       OPTIONAL,   -- Need M
    tpc-SRS                           SetupRelease { SRS-TPC-CommandConfig}          OPTIONAL,   -- Need M
    ...,
}
...
-- TAG-PDCCH-CONFIG-STOP
-- ASN1STOP
```

FIG. 13B

```
-- ASN1START
-- TAG-CONTROLRESOURCESET-START
ControlResourceSet ::=          SEQUENCE {
    controlResourceSetId          ControlResourceSetId,
    frequencyDomainResources      BIT STRING (SIZE (45)),
    duration                      INTEGER (1..maxCoReSetDuration),
    cce-REG-MappingType           CHOICE {
        interleaved                  SEQUENCE {
            reg-BundleSize              ENUMERATED {n2, n3, n6},
            interleaverSize             ENUMERATED {n2, n3, n6},
            shiftIndex                  INTEGER(0..maxNrofPhysicalResourceBlocks-1)  OPTIONAL -- Need S
        },
        nonInterleaved               NULL
    },
    precoderGranularity           ENUMERATED {sameAsREG-bundle, allContiguousRBs},
    tci-StatesPDCCH-ToAddList     SEQUENCE(SIZE (1..maxNrofTCI-StatesPDCCH)) OF TCI-StateId
                                                                                OPTIONAL, -- Cond NotSIB1-initialBWP
    tci-StatesPDCCH-ToReleaseList SEQUENCE(SIZE (1..maxNrofTCI-StatesPDCCH)) OF TCI-StateId
                                                                                OPTIONAL, -- Cond NotSIB1-initialBWP
    tci-PresentInDCI              ENUMERATED {enabled}                          OPTIONAL, -- Need S
    ...,
}
-- TAG-CONTROLRESOURCESET-STOP
-- ASN1STOP
```

FIG. 13C

```
-- ASN1START
-- TAG-TCI-STATE-START
TCI-State ::=        SEQUENCE {
    tci-StateId        TCI-StateId,
    qcl-Type1          QCL-Info,
    qcl-Type2          QCL-Info                  OPTIONAL, -- Need R
    ...
}
QCL-Info ::=         SEQUENCE {
    cell               ServCellIndex             OPTIONAL, -- Need R
    bwp-Id             BWP-Id                    OPTIONAL, -- Cond CSI-RS-Indicated
    referenceSignal    CHOICE {
        csi-rs            NZP-CSI-RS-ResourceId,
        ssb               SSB-Index
    },
    qcl-Type           ENUMERATED {typeA, typeB, typeC, typeD},
    ...
}
-- TAG-TCI-STATE-STOP
-- ASN1STOP
```

FIG. 13D

| | | | | | | | | |
|---|---|---|---|---|---|---|---|---|
| Serving Cell ID | | | | | CORESET ID | | | Oct 1 |
| CORE SET ID | TCI State ID | | | | | | | Oct 2 |

| | | | | | | | | |
|---|---|---|---|---|---|---|---|---|
| R | Serving Cell ID | | | | | BWP ID | | Oct 1 |
| $T_7=1$ | $T_6=0$ | $T_5=1$ | $T_4=1$ | $T_3=0$ | $T_2=1$ | $T_1=0$ | $T_0=0$ | Oct 2 |
| $T_{15}=0$ | $T_{14}=0$ | $T_{13}=1$ | $T_{12}=0$ | $T_{11}=1$ | $T_{10}=0$ | $T_9=1$ | $T_8=1$ | Oct 3 |

FIG. 15A

```
ServingCellConfig ::=    SEQUENCE {
. . .
    csi-MeasConfig          SetupRelease { CSI-MeasConfig } OPTIONAL,   -- Need M
. . .
}
```

```
-- ASN1START
-- TAG-CSI-MEASCONFIG-START
CSI-MeasConfig ::=                 SEQUENCE {
    nzp-CSI-RS-ResourceToAddModList    SEQUENCE (SIZE (1..maxNrofNZP-CSI-RS-Resources)) OF NZP-CSI-RS-Resource
. . .
    nzp-CSI-RS-ResourceSetToAddModList SEQUENCE (SIZE (1..maxNrofNZP-CSI-RS-ResourceSets)) OF NZP-CSI-RS-ResourceSet   OPTIONAL,
    . . .                                                                                                               -- Need N
    csi-SSB-ResourceSetToAddModList    SEQUENCE (SIZE (1..maxNrofCSI-SSB-ResourceSets)) OF CSI-SSB-ResourceSet
    . . .
    csi-ResourceConfigToAddModList     SEQUENCE (SIZE (1..maxNrofCSI-ResourceConfigurations)) OF CSI-ResourceConfig
    csi-ReportConfigToAddModList       SEQUENCE (SIZE (1..maxNrofCSI-ReportConfigurations)) OF CSI-ReportConfig
(...)
}
-- TAG-CSI-MEASCONFIG-STOP
-- ASN1STOP
```

FIG. 15B

FIG. 15C

```
-- ASN1START
-- TAG-NZP-CSI-RS-RESOURCESET-START
NZP-CSI-RS-ResourceSet ::=    SEQUENCE {
    nzp-CSI-ResourceSetId        NZP-CSI-RS-ResourceSetId,
    nzp-CSI-RS-Resources         SEQUENCE (SIZE (1..maxNrofNZP-CSI-RS-ResourcesPerSet)) OF NZP-CSI-RS-ResourceId,
    repetition                   ENUMERATED { on, off }                               OPTIONAL,   -- Need S
    aperiodicTriggeringOffset    INTEGER(0..6)                                        OPTIONAL,   -- Need S
    trs-Info                     ENUMERATED {true}                                    OPTIONAL,   -- Need R
    ...,
    [[
    aperiodicTriggeringOffset-r16  INTEGER(0..31)                                     OPTIONAL   -- Need S
    ]]
}
-- TAG-NZP-CSI-RS-RESOURCESET-STOP
-- ASN1STOP
```

FIG. 15D

```
CSI-SSB-ResourceSet ::=            SEQUENCE {
    csi-SSB-ResourceSetId              CSI-SSB-ResourceSetId,
    csi-SSB-ResourceList               SEQUENCE (SIZE(1..maxNrofCSI-SSB-ResourcePerSet)) OF SSB-Index,
    ...
}
```

```
CSI-ResourceConfig ::=      SEQUENCE {
    csi-ResourceConfigId        CSI-ResourceConfigId,
    csi-RS-ResourceSetList      CHOICE {
       nzp-CSI-RS-SSB              SEQUENCE {
         nzp-CSI-RS-ResourceSetList  SEQUENCE (SIZE (1..maxNrofNZP-CSI-RS-ResourceSetsPerConfig)) OF NZP-CSI-RS-ResourceSetId
                                                                                                   OPTIONAL,-- Need R
         csi-SSB-ResourceSetList     SEQUENCE (SIZE (1..maxNrofCSI-SSB-ResourceSetsPerConfig)) OF CSI-SSB-ResourceSetId
                                                                                                   OPTIONAL -- Need R
       },
       csi-IM-ResourceSetList      SEQUENCE (SIZE (1..maxNrofCSI-IM-ResourceSetsPerConfig)) OF CSI-IM-ResourceSetId
    },
    bwp-Id                      BWP-Id,
    resourceType                ENUMERATED { aperiodic, semiPersistent, periodic },
    ...
}
```

FIG. 15E

```
-- ASN1START
-- TAG-CSI-REPORTCONFIG-START
CSI-ReportConfig ::=              SEQUENCE {
    reportConfigId                        CSI-ReportConfigId,
    carrier                               ServCellIndex                 OPTIONAL,   -- Need S
    resourcesForChannelMeasurement        CSI-ResourceConfigId,
    csi-IM-ResourcesForInterference       CSI-ResourceConfigId          OPTIONAL,   -- Need R
    nzp-CSI-RS-ResourcesForInterference   CSI-ResourceConfigId          OPTIONAL,   -- Need R
    reportConfigType                      CHOICE {
        periodic                             SEQUENCE {
            reportSlotConfig                    CSI-ReportPeriodicityAndOffset,
            pucch-CSI-ResourceList              SEQUENCE (SIZE (1..maxNrofBWPs)) OF PUCCH-CSI-Resource
        },
        semiPersistentOnPUCCH                SEQUENCE {
            reportSlotConfig                    CSI-ReportPeriodicityAndOffset,
            pucch-CSI-ResourceList              SEQUENCE (SIZE (1..maxNrofBWPs)) OF PUCCH-CSI-Resource
        },
        semiPersistentOnPUSCH                SEQUENCE {
            reportSlotConfig                    ENUMERATED {sl5, sl10, sl20, sl40, sl80, sl160, sl320},
            reportSlotOffsetList                SEQUENCE (SIZE (1.. maxNrofUL-Allocations)) OF INTEGER(0..32),
            p0alpha                             P0-PUSCH-AlphaSetId
        },
        aperiodic                            SEQUENCE {
            reportSlotOffsetList             SEQUENCE (SIZE (1..maxNrofUL-Allocations)) OF INTEGER(0..32)
        }
    },
    reportQuantity                  CHOICE {
        none                           NULL,
        cri-RI-PMI-CQI                 NULL,
        cri-RI-i1                      NULL,
        cri-RI-i1-CQI                  SEQUENCE {
            pdsch-BundleSizeForCSI        ENUMERATED {n2, n4}                 OPTIONAL   -- Need S
        },
        cri-RI-CQI                     NULL,
        cri-RSRP                       NULL,
        ssb-Index-RSRP                 NULL,
        cri-RI-LI-PMI-CQI              NULL
    },
    reportFreqConfiguration         SEQUENCE {
        cqi-FormatIndicator            ENUMERATED { widebandCQI, subbandCQI }  OPTIONAL,  -- Need R
        pmi-FormatIndicator            ENUMERATED { widebandPMI, subbandPMI }  OPTIONAL,  -- Need R
        csi-ReportingBand              CHOICE {
            subbands3                     BIT STRING(SIZE(3)),
            (. . .)
            subbands18                    BIT STRING(SIZE(18)),
            ...,
            subbands19-v1530              BIT STRING(SIZE(19))
        }   OPTIONAL    -- Need S
    }                                                                       OPTIONAL, -- Need R
```

FIG. 16A

```
   timeRestrictionForChannelMeasurements       ENUMERATED {configured, notConfigured},
   timeRestrictionForInterferenceMeasurements  ENUMERATED {configured, notConfigured},
   codebookConfig                              CodebookConfig                              OPTIONAL, -- Need R
   dummy                                       ENUMERATED {n1, n2}                         OPTIONAL, -- Need R
   groupBasedBeamReporting                     CHOICE {
       enabled                                     NULL,
       disabled                                    SEQUENCE {
           nrofReportedRS                          ENUMERATED {n1, n2, n3, n4}             OPTIONAL  -- Need S
       }
   },
   cqi-Table              ENUMERATED {table1, table2, table3, spare1}                      OPTIONAL, -- Need R
   subbandSize            ENUMERATED {value1, value2},
   non-PMI-PortIndication SEQUENCE (SIZE (1..maxNrofNZP-CSI-RS-ResourcesPerConfig)) OF PortIndexFor8Ranks OPTIONAL, -- Need R
   ...,
 [[ semiPersistentOnPUSCH-v1530         SEQUENCE {
       reportSlotConfig-v1530               ENUMERATED {sl4, sl8, sl16}
   }                                                                                       OPTIONAL    -- Need R
   ]],
 [[ semiPersistentOnPUSCH-v1610              SEQUENCE {
       reportSlotOffsetListForDCI-Format0-2-r16  SEQUENCE (SIZE (1.. maxNrofUL-Allocations-r16)) OF INTEGER(0..32)
                                                                                           OPTIONAL,  -- Need R
       reportSlotOffsetListForDCI-Format0-1-r16  SEQUENCE (SIZE (1.. maxNrofUL-Allocations-r16)) OF INTEGER(0..32)
                                                                                           OPTIONAL   -- Need R
   }                                                                                       OPTIONAL,    -- Need R
   aperiodic-v1610                 SEQUENCE {
       reportSlotOffsetListForDCI-Format0-2-r16  SEQUENCE (SIZE (1.. maxNrofUL-Allocations-r16)) OF INTEGER(0..32)
                                                                                           OPTIONAL,  -- Need R
       reportSlotOffsetListForDCI-Format0-1-r16  SEQUENCE (SIZE (1.. maxNrofUL-Allocations-r16)) OF INTEGER(0..32)
                                                                                           OPTIONAL   -- Need R
   }                                                                                       OPTIONAL,    -- Need R
   reportQuantity-r16                     CHOICE {
      cri-SINR-r16                           NULL,
      ssb-Index-SINR-r16                     NULL
   }                                                                                       OPTIONAL,   -- Need R
   codebookConfig-r16                     CodebookConfig-r16                               OPTIONAL    -- Need R
   ]]
}
CSI-ReportPeriodicityAndOffset ::=  CHOICE {
    slots4                              INTEGER(0..3), ...
    slots320                            INTEGER(0..319)
}
PUCCH-CSI-Resource ::=              SEQUENCE {
    uplinkBandwidthPartId               BWP-Id,
    pucch-Resource                      PUCCH-ResourceId
}
```

FIG. 16B

```
PortIndexFor8Ranks ::=                CHOICE {
    portIndex8                            SEQUENCE{
        rank1-8                               PortIndex8                        OPTIONAL,   -- Need R
        rank2-8                               SEQUENCE(SIZE(2)) OF PortIndex8  OPTIONAL,   -- Need R
. . .
    },
    portIndex4                            SEQUENCE{
        rank1-4                               PortIndex4                        OPTIONAL,   -- Need R
        rank2-4                               SEQUENCE(SIZE(2)) OF PortIndex4  OPTIONAL,   -- Need R
. . .
    },
    portIndex1                            NULL
}
PortIndex8::=                         INTEGER (0..7)
PortIndex4::=                         INTEGER (0..3)
PortIndex2::=                         INTEGER (0..1)
-- TAG-CSI-REPORTCONFIG-STOP
-- ASN1STOP
```

BEAM MANAGEMENT FOR DEACTIVATED SECONDARY CELL GROUP (SCG)

TECHNICAL FIELD

The present disclosure generally relates to wireless communication networks and particularly relates to techniques that reduce the energy consumed by a user equipment (UE) when connected to multiple cell groups in a wireless network, particularly when one of the cell groups is in a deactivated state.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of CA, in which the aggregated carriers (or cells) are provided by network nodes that are physically separated and not connected via a robust, high-capacity connection.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

Each of the CGs includes one MAC entity, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical UL control channel (PUCCH) transmission and contention-based random access by UEs.

In general, an NR UE needs to continuously monitor a physical DL control channel (PDCCH) for UL grants and DL scheduling assignments on PCell, PSCell, and potentially all other SCells if cross carrier scheduling is not used. Even if cross carrier scheduling is used, the UE must perform extra PDCCH monitoring on PCell or PSCell for the SCell, depending on whether the SCell belongs to MCG or SCG.

In order to improve network energy efficiency and battery life for UEs in MR-DC, 3GPP Rel-17 includes a work item for efficient SCG/SCell activation/deactivation. This can be especially important for MR-DC configurations with NR SCG since, in some cases, NR UE energy consumption is three-to-four times higher than in LTE.

SUMMARY

However, if the UE's SCG is deactivated (or, more generally, in a reduced-energy mode such as SCG suspended, SCG dormant, etc.) then the UE may stop monitoring PDCCH for PSCell and SCell of the SCG. This can cause various problems, issues, and/or difficulties for the UE's beam management in the SCG, including beam failure detection and recovery.

Embodiments of the present disclosure provide specific improvements to beam management procedures for UEs operating in a wireless network, such as by facilitating solutions to overcome exemplary problems summarized above and described in more detail below.

Embodiments include methods (e.g., procedures) for a UE configured to communicate with a wireless network via an MCG and an SCG. These exemplary methods can include entering a reduced-energy mode for the SCG responsive to receiving a first command via the MCG or the SCG. These exemplary methods can also include, while in the reduced-energy mode for the SCG and in a connected mode for the MCG, performing SCG measurements and reporting the SCG measurements to the wireless network.

In some embodiments, the SCG measurements are reported to the wireless network via one of the following: a physical UL shared channel (PUSCH) of the MCG, a PUSCH of the SCG, a physical UL control channel (PUCCH) of the MCG, or a PUCCH of the SCG. In some embodiments, the SCG measurements are reported in one of the following: a MAC CE sent via the MCG, an RRC message sent via the MCG, layer-1 UL control information (UCI) sent via the MCG, or layer-1 UCI sent via the SCG.

In some embodiments, the SCG includes a PSCell and one or more SCells, and the SCG measurements are reported via the PSCell. Additionally, the one or more SCells have no uplinks configured while the UE is in the reduced-energy mode for the SCG.

In some embodiments, reporting the SCG measurements while in the reduced-energy mode for the SCG can be responsive to one of the following:

one or more conditions that are also applicable to reporting of SCG measurements while in the connected mode for the SCG; or a reporting period that is greater than a reporting period for SCG measurements while in the connected mode for the SCG.

In some embodiments, these exemplary methods can also include: while in the reduced-energy mode for the SCG and in the connected mode for the MCG, receiving via the MCG a TCI state associated with a PDCCH of the SCG; and upon exiting the reduced-energy mode for the SCG, monitoring the PDCCH of the SCG based on the received TCI state.

In some of these embodiments, the received TCI state is different than a most recent TCI state associated with the PDCCH of the SCG, the most recent TCI state being received before entering the reduced-energy mode for the SCG. In some of these embodiments, these exemplary methods can also include receiving a second command to enter the connected mode for the SCG. In such case, exiting the reduced-energy mode for the SCG is responsive to the second command.

In some variants, the TCI state is received via the MCG and the second command is received via the SCG. In other variants, the TCI state and the second command are received concurrently via the MCG. Furthermore, in different variants, the second command is received and the SCG measurements are reported via a same one or via different ones of the MCG and the SCG. Additionally, in different variants, the TCI state is received and the SCG measurements are reported via a same one or via different ones of the MCG and the SCG.

In some embodiments, the TCI state is received as a MAC control element (CE) via a PDCCH in a first cell of the SCG (e.g., PSCell). These exemplary methods can also include performing one or more of the following while in the reduced-energy mode for the SCG: refraining from monitoring PDCCH in one or more other cells (e.g., SCells) of the SCG; and monitoring a subset of the PDCCH in the first cell of the SCG based on the TCI state.

In other embodiments, the TCI state is received as a MAC CE via a PDCCH in a first cell of the MCG (e.g., PCell). These exemplary methods can also include refraining from monitoring PDCCH in one or more other cells (e.g., SCells) of the MCG while in the reduced-energy mode for the SCG.

In some embodiments, these exemplary methods can also include receiving one of the following while in the connected mode for the SCG:

- a measurement configuration for the SCG, which indicates the SCG measurements to be performed and reported while in the reduced-energy mode for the SCG, or
- a measurement configuration for the MCG, which indicates SCG measurements to be performed and reported while in the connected mode for the MCG.

In such embodiments, performing and reporting SCG measurements while in the reduced-energy mode for the SCG can be based on the received measurement configuration.

Other embodiments include methods (e.g., procedures) for a second network node configured to provide an SCG for a UE in a wireless network. These exemplary methods can include, while the UE is in a connected mode for the SCG, sending to the UE a command to enter a reduced-energy mode for the SCG. These exemplary methods can also include, while the UE is in the reduced-energy mode for the SCG and in a connected mode for an MCG in the wireless network, receiving one or more reports of SCG measurements performed by the UE while the UE is in the reduced-energy mode for the SCG and in the connected mode for the MCG.

In some embodiments, the reports of SCG measurements are received from the first network node. In other embodiments, the reports of SCG measurements are received from the UE via a PUSCH of the SCG or via a PUCCH of the SCG. In some variants, the reports of SCG measurements are received from the UE in layer-1 UCI via the SCG.

In some embodiments, the SCG includes a PSCell and one or more SCells, and the SCG measurements are received from the UE via the PSCell. Additionally, the one or more SCells have no uplinks configured while the UE is in the reduced-energy mode for the SCG.

In some embodiments, the reports of SCG measurements are received responsive to one of the following:

- one or more conditions that are also applicable to reporting of SCG measurements while the UE is in the connected mode for the SCG; or
- a reporting period that is greater than a reporting period for SCG measurements while the UE is in the connected mode for the SCG.

In some embodiments, these exemplary methods can also include sending, to the UE via the SCG, a command to enter the connected mode for the SCG. In other embodiments, these exemplary methods can also include sending, to the first network node, a request for the UE to enter the connected mode for the SCG. These operations can cause (directly or indirectly) the UE to exit the reduced-energy mode and enter the connected mode for the SCG.

In some embodiments, these exemplary methods can also include the following operations: based on the one or more reports of SCG measurements, determining a TCI state associated with a PDCCH of the SCG; while the UE is in the reduced-energy mode for the SCG and in the connected mode for the MCG, sending the TCI state to the UE or to a first network node configured to provide the MCG; and after the UE exits the reduced-energy mode for the SCG, transmitting the PDCCH based on the TCI state.

In some of these embodiments, the TCI state is different than a most recent TCI state associated with the PDCCH of the SCG. The most recent TCI state was sent to the UE before the UE entered the reduced-energy mode for the SCG. In some of these embodiments, these exemplary methods can also include receiving, from the first network node, a request for an updated TCI state associated with the PDCCH of the SCG. The TCI state is sent to the first network node in response to the request.

In some of these embodiments, the TCI state is sent to the UE as a MAC CE via a PDCCH in a first cell (e.g., PSCell) of the SCG. In some variants, the TCI state is sent in a subset of the PDCCH in the first cell of the SCG. In other variants, these exemplary methods can also include refraining from transmitting PDCCH to the UE in one or more other cells (e.g., SCells) of the SCG while the UE is in the reduced-energy mode for the SCG.

In some embodiments, these exemplary methods can also include sending, to the UE while the UE is in the connected mode for the SCG, a measurement configuration for the SCG that indicates SCG measurements to be performed and reported while in the reduced-energy mode for the SCG. The received reports of SCG measurements can be based on the measurement configuration.

Other embodiments include methods (e.g., procedures) for a first network node configured to provide an MCG for a UE in a wireless network. These exemplary methods can include, while the UE is in a connected mode for the MCG and in a reduced-energy for an SCG in the wireless network, receiving from the UE via the MCG one or more reports of SCG measurements performed by the UE while the UE is in the reduced-energy mode for the SCG and in the connected mode for the MCG. These exemplary methods can also include sending, to the UE via the MCG, a command to enter the connected mode for the SCG.

In some embodiments, the reports of SCG measurements are received from the UE via a PUSCH or a PUCCH (i.e., of the MCG). In some embodiments, each report of SCG measurements is received from the UE in one of the following: a MAC CE, an RRC message, or layer-1 UCI. In some embodiments, these exemplary methods can also include forwarding the received reports of SCG measurements to a second network node configured to provide the SCG.

In some embodiments, these exemplary methods can also include, while the UE is in the reduced-energy mode for the SCG and in the connected mode for the MCG, sending to the UE, via the MCG, a TCI state associated with a PDCCH of the SCG. The first network node can obtain this TCI state in various ways.

In some variants, the first network node can receive the TCI state from a second network node configured to provide the SCG. In some cases, these exemplary methods can also include sending, to the second network node, a request for an updated TCI state associated with the PDCCH of the SCG. The TCI state can be received in response to the request.

In other variants, these exemplary methods can also include determining the TCI state based on the received reports of SCG measurements.

In some embodiments, the TCI state is sent as a MAC CE via a PDCCH in a first cell (e.g., PCell) of the MCG, and these exemplary methods can also include refraining from transmitting PDCCH to the UE in one or more other cells (e.g., SCells) of the MCG while the UE is in the reduced-energy mode for the SCG.

In some embodiments, these exemplary methods can also include receiving, from the second network node, a request for the UE to enter the connected mode for the SCG. The command to enter the SCG can be sent in response to the request.

In some embodiments, these exemplary methods can also include sending, to the UE, a measurement configuration for the MCG that indicates SCG measurements to be performed and reported while the UE is in the connected mode for the MCG. The received reports of SCG measurements can be based on the measurement configuration.

Other embodiments include UEs (e.g., wireless devices, IoT devices, etc. or component(s) thereof) or network nodes (e.g., base stations, eNBs, gNBs, ng-eNBs, en-gNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can facilitate a UE to quickly activate an SCG that is in deactivated state without excess UE energy consumption while the SCG is deactivated. The disclosed variants provide different tradeoffs between readiness (e.g., how quickly the UE can resume/activate the SCG without having to perform random access) and UE energy consumption (e.g., due to reduction/minimization of measurements, reports and PDCCH monitoring on the deactivated second cell group).

These and other objects, features, and advantages of embodiments of the present disclosure will become apparent upon reading the following Detailed Description in view of the Drawings briefly described below.

BRIEF DESCRIPTION OF THE DRAWINGS

FIG. 1 shows a high-level view of an exemplary LTE network architecture.

FIG. 2 shows exemplary LTE control plane (CP) protocol layers.

FIG. 12 shows an exemplary structure of a CellGroupConfig information element (IE).

FIGS. 13A-D show ASN.1 data structures for various exemplary IEs or fields used for TCI state configuration.

FIGS. 15A-E show ASN.1 data structures for various exemplary IEs or fields used for channel state information (CSI) resource configuration.

FIGS. 16A-C show an ASN.1 data structure for an exemplary CSI-ReportConfig UE.

DETAILED DESCRIPTION

Figure 3:
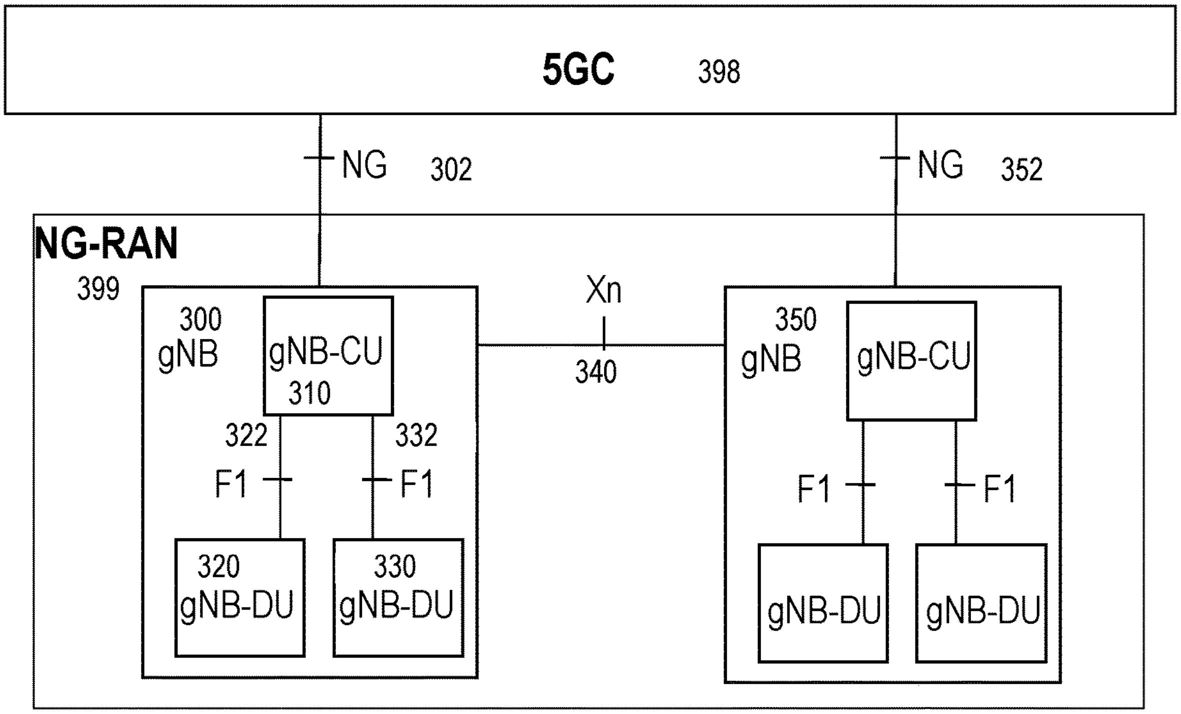
FIG. 3 shows a high-level view of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, if a UE's SCG is deactivated (or, more generally, in a reduced-energy mode such as SCG suspended, SCG dormant, etc.) then the UE may stop monitoring PDCCH for PSCell and SCell of the SCG. This can cause various problems, issues, and/or difficulties for the UE's beam management in the SCG, including beam failure detection and beam failure recovery. This is discussed in more detail below, after the following description of NR network architecture and various dual connectivity (DC) arrangements.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 3GC via one or more NG interfaces, such as gNBs 300, 350 connected via interfaces 302, 352, respectively. In addition, the gNBs can be connected to each other via one or more Xn interfaces, such as Xn interface 340 between gNBs 300 and 350. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

3GPP TR 38.804 describes various exemplary dual-connectivity (DC) scenarios or configurations in which the MN and SN can apply either NR, LTE, or both. The following terminology is used to describe these exemplary DC scenarios or configurations:

- DC: LTE DC (i.e., both MN and SN employ LTE, as discussed above);
- EN-DC: LTE-NR DC where MN (eNB) employs LTE and SN (gNB) employs NR, and both are connected to EPC.
- NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.
- NE-DC: LTE-NR dual connectivity where a UE is connected to one gNB that acts as a MN and one ng-eNB that acts as a SN. The gNB is connected to 5GC and the ng-eNB is connected to the gNB via the Xn interface.
- NR-DC (or NR-NR DC): both MN and SN employ NR.
- MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Figure 4:
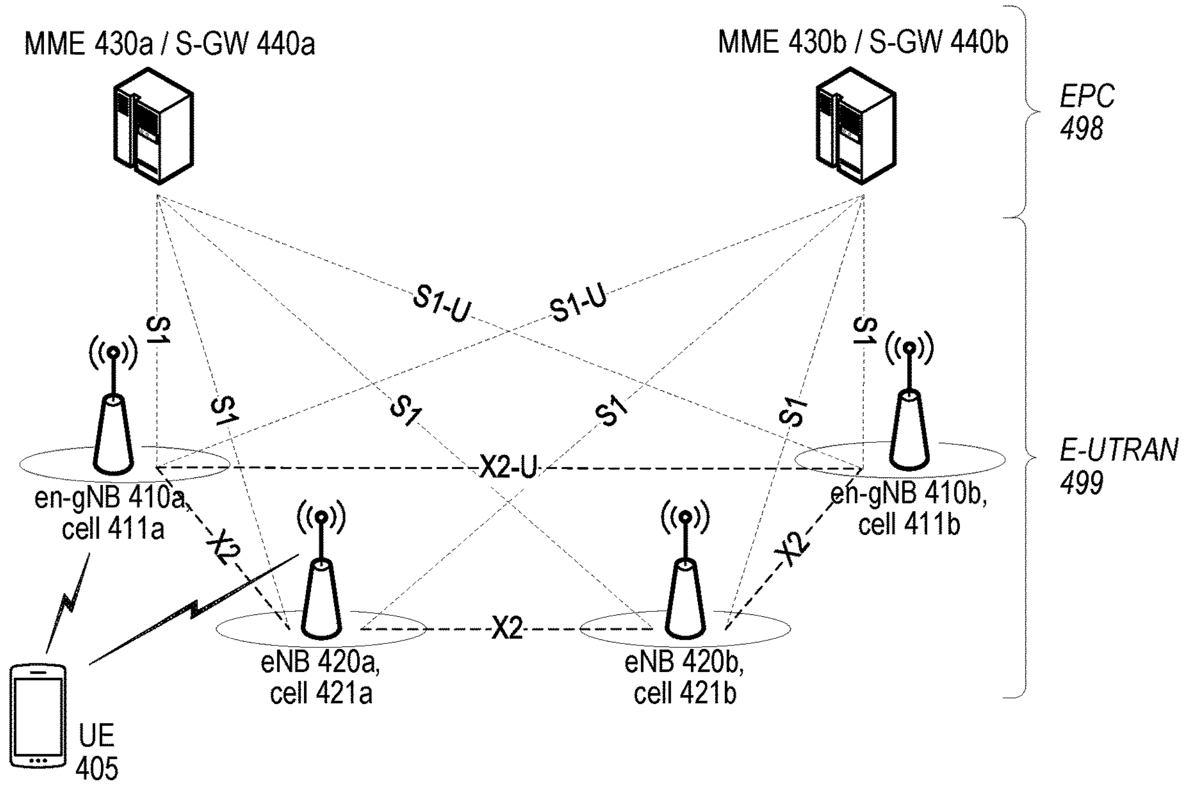
FIGS. 4-5 show high-level views of exemplary network architectures that support MR-DC using EPC and 5GC, respectively.

FIG. 4 shows a high-level view of an exemplary network architecture that supports EN-DC, including an E-UTRAN 499 and an EPC 498. As shown in the figure, E-UTRAN 499 can include en-gNBs 410 (e.g., 410*a,b*) and eNBs 420 (e.g., 420*a,b*) that are interconnected with each other via respective X2 (or X2-U) interfaces. The eNBs 420 can be similar to those shown in FIG. 1, while the ng-eNBs can be similar to the gNBs shown in FIG. 5 except that they connect to EPC 498 via an S1-U interface rather than to a 5GC via an X2 interface. The eNBs also connect to EPC 498 via an S1 interface, similar to the arrangement shown in FIG. 1. More specifically, en-gNBs 410 (e.g., 410*a,b*) and eNBs 420 (e.g., 420*a,b*) connect to MMEs (e.g., MMEs 430*a,b*) and S-GWs (e.g., S-GWs 440*a,b*) in EPC 498.

Each of the en-gNBs and eNBs can serve a geographic coverage area including one more cells, including cells 411*a-b* and 421*a-b* shown as exemplary in FIG. 4. Depending on the particular cell in which it is located, a UE 405 can communicate with the en-gNB or eNB serving that particular cell via the NR or LTE radio interface, respectively. In addition, UE 405 can be in EN-DC connectivity with a first cell served by an eNB and a second cell served by an en-gNB, such as cells 420*a* and 410*a* shown in FIG. 4.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Figure 5:
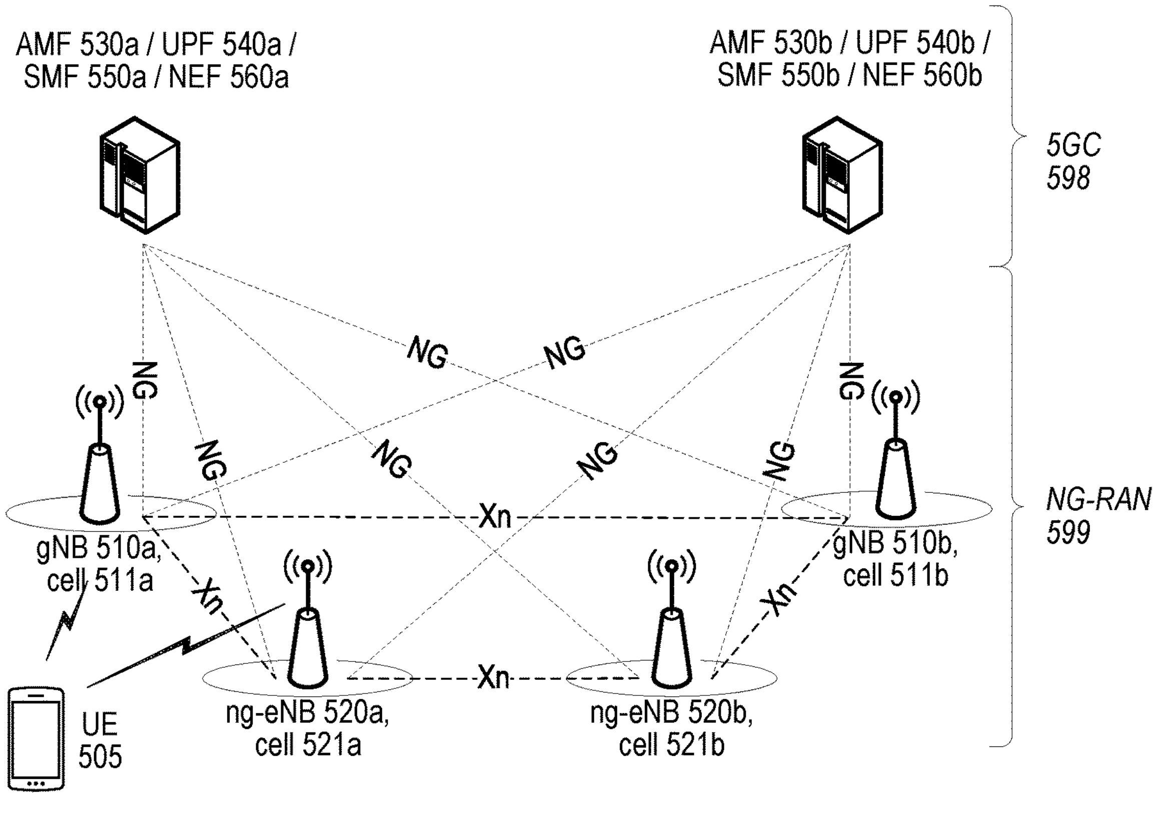

FIG. 5 shows a high-level view of an exemplary network architecture that supports MR-DC configurations based on a 5GC. More specifically, FIG. 5 shows an NG-RAN 599 and a 5GC 598. NG-RAN 599 can include gNBs 510 (e.g., 510*a,b*) and ng-eNBs 520 (e.g., 520*a,b*) that are interconnected with each other via respective Xn interfaces. The gNBs and ng-eNBs are also connected via the NG interfaces to 5GC 598, more specifically to the AMF (Access and Mobility Management Function) 530 (e.g., AMFs 530*a,b*) via respective NG-C interfaces and to the UPF (User Plane Function) 540 (e.g., UPFs 540*a,b*) via respective NG-U interfaces. Moreover, the AMFs 530*a,b* can communicate with one or more session management functions (SMFs, e.g., SMFs 550*a,b*) and network exposure functions (NEFs, e.g., NEFs 560*a,b*).

Each of the gNBs 510 can be similar to those shown in FIG. 5, while each of the ng-eNBs can be similar to the eNBs shown in FIG. 1 except that they connect to 5GC 598 via an NG interface rather than to EPC via an S1 interface. Each of the gNBs and ng-eNBs can serve a geographic coverage area including one more cells, including cells 511*a-b* and 521*a-b* shown as exemplary in FIG. 5. The gNBs and ng-eNBs can also use various directional beams to provide coverage in the respective cells. Depending on the particular cell in which it is located, a UE 505 can communicate with the gNB or ng-eNB serving that particular cell via the NR or LTE radio interface, respectively. In addition, UE 505 can be in MR-DC connectivity with a first cell served by an ng-eNB and a second cell served by a gNB, such as cells 520*a* and 510*a* shown in FIG. 5.

Figure 6:
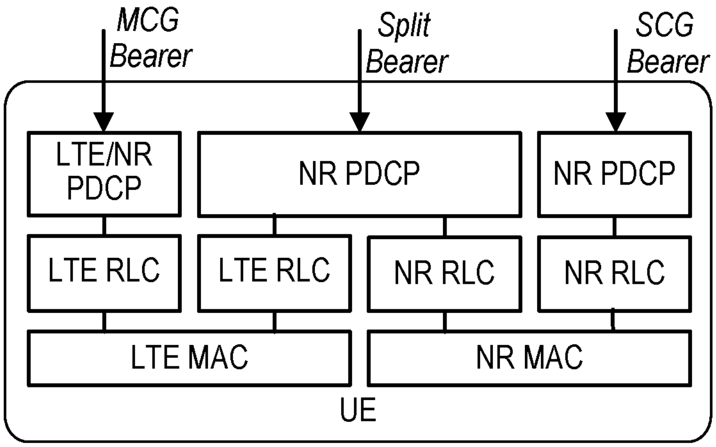
FIGS. 6-7 show user plane (UP) radio protocol architectures from a UE perspective for EN-DC with EPC and MR-DC with 5GC, respectively.
Figure 7:
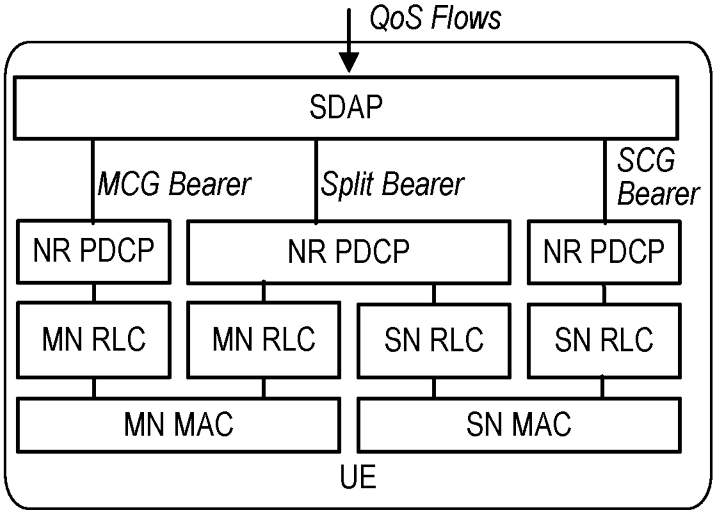

FIGS. 6-7 show UP radio protocol architectures from a UE perspective for MR-DC with EPC (e.g., EN-DC) and with 5GC (e.g., NGEN-DC, NE-DC, and NR-DC), respectively. In both cases, a UE supports MCG, SCG, and split bearers, as discussed above. One difference between the architectures in FIGS. 6-7 is that the various bearers for MR-DC with 5GC are associated with QoS flows that are terminated in an SDAP layer above PDCP.

Figure 8:
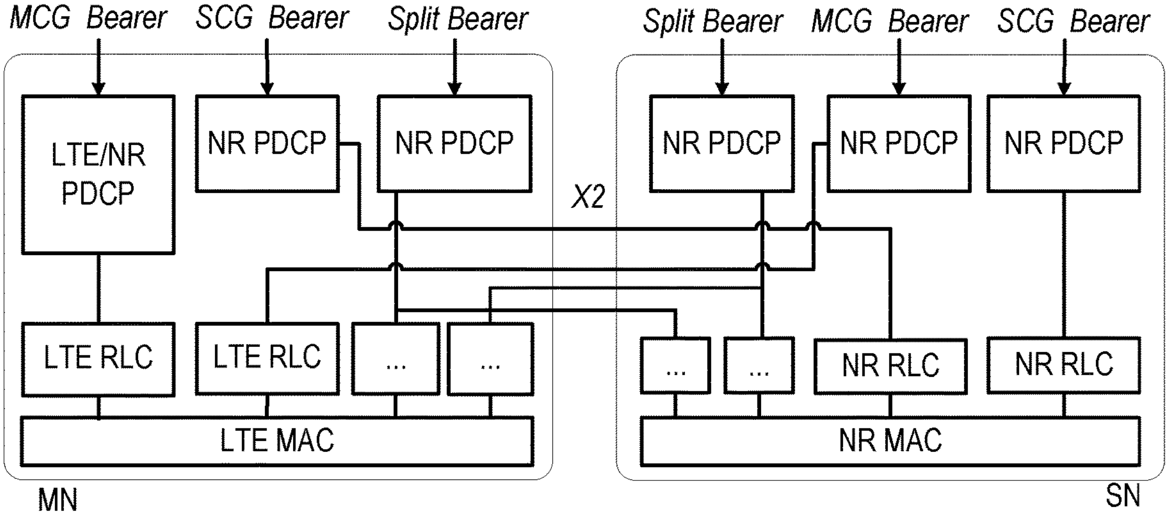
FIGS. 8-9 show UP radio protocol architectures from a network perspective for EN-DC with EPC and MR-DC with 5GC, respectively.
Figure 9:
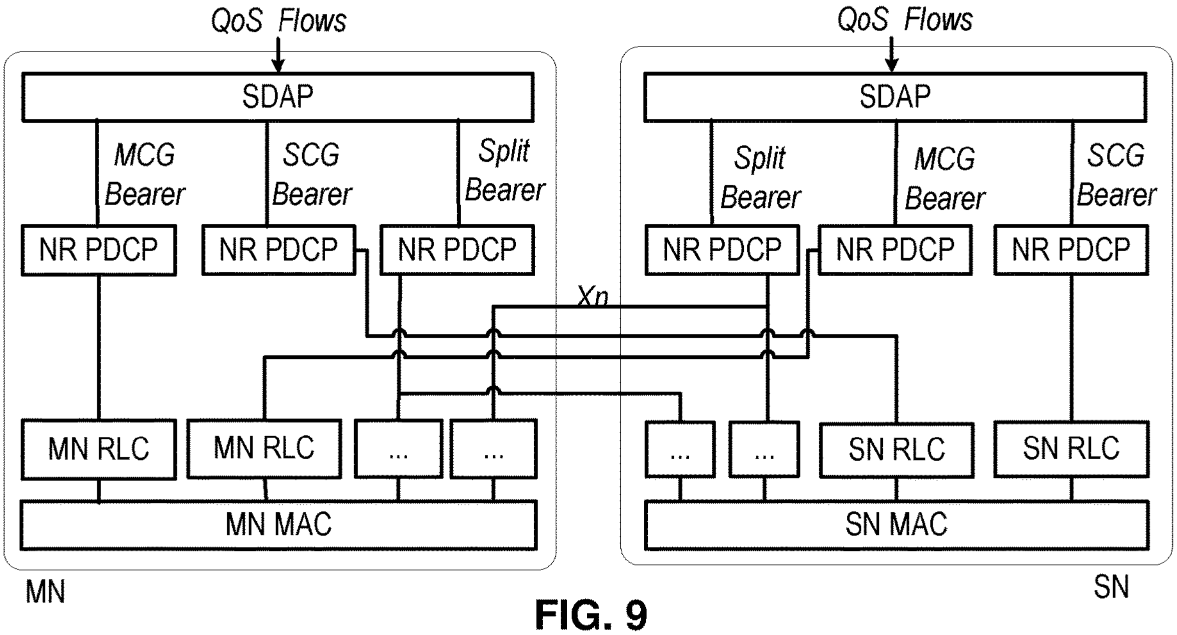

FIGS. 8-9 show UP radio protocol architectures from a network perspective for MR-DC with EPC (e.g., EN-DC) and with 5GC (e.g., NGEN-DC, NE-DC, and NR-DC), respectively. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN.

Figure 10:
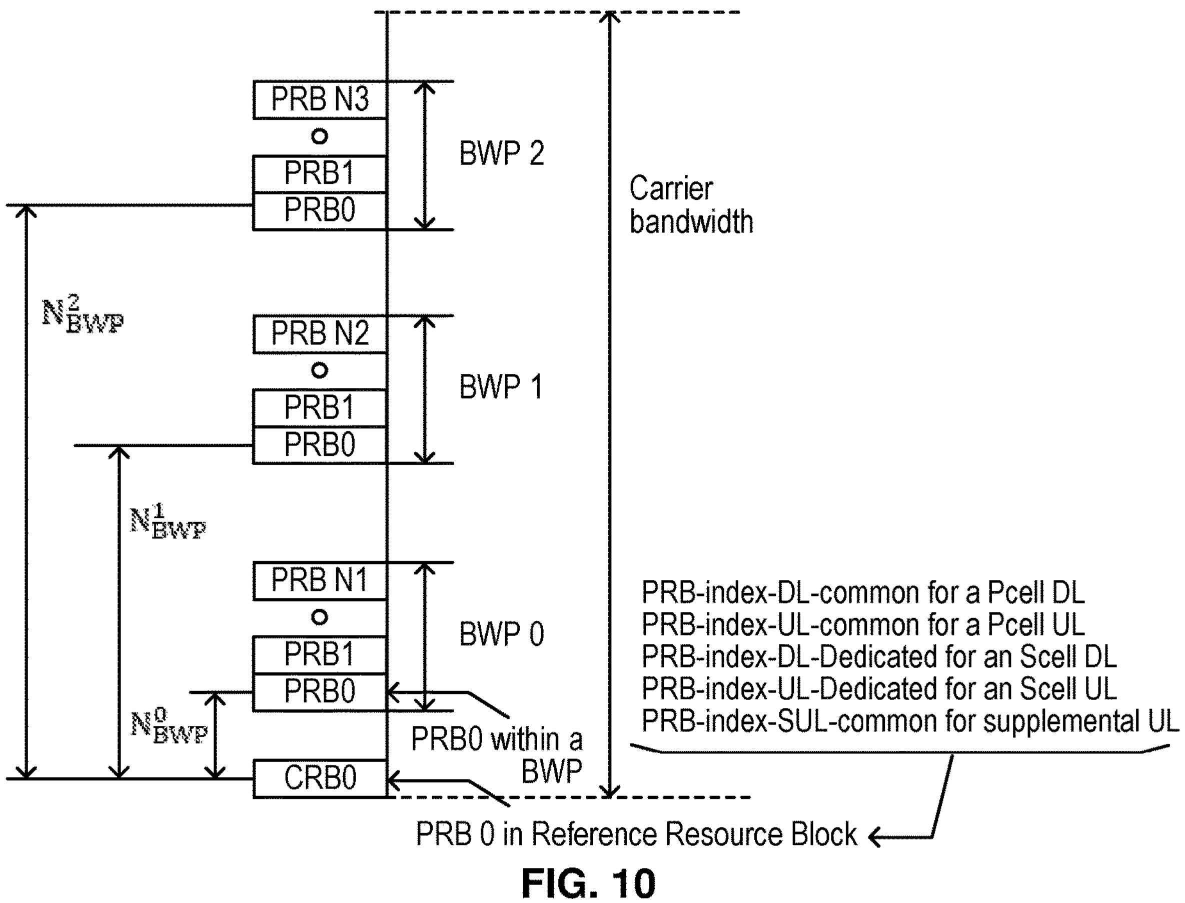
FIG. 10 shows an exemplary frequency-domain configuration for an NR UE.

FIG. 10 shows an exemplary frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 10, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 10), such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 10, BWPs 0-2 start at CRBs $N^0_{BWP}$, $N^1_{BWP}$, and $N^2_{BWP}$, respectively. Within a BWP, PRBs are defined and numbered in the frequency domain from 0 to $$N_{BWP,i}^{size} - 1,$$

where i is the index of the particular BWP for the carrier. In the arrangement shown in FIG. 10, BWPs 0-2 include PRBs 0 to N1, N2, and N3, respectively.

Each NR resource element (RE) corresponds to one OFDM subcarrier during one OFDM symbol interval. NR supports various SCS values $\Delta f=(15\times 2^{\mu})$ kHz, where $\mu\in(0, 1, 2, 3, 4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu}*50$ MHz. Table 1 below summarizes the supported NR numerologies and associated parameters. Different DL and UL numerologies can be configured by the network.

TABLE 1

| μ | Δf = $2^{\mu}$ . 15 (kHz) | Cyclic prefix (CP) | CP duration | Symbol duration | Symbol+ CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHZ |

Figure 11:
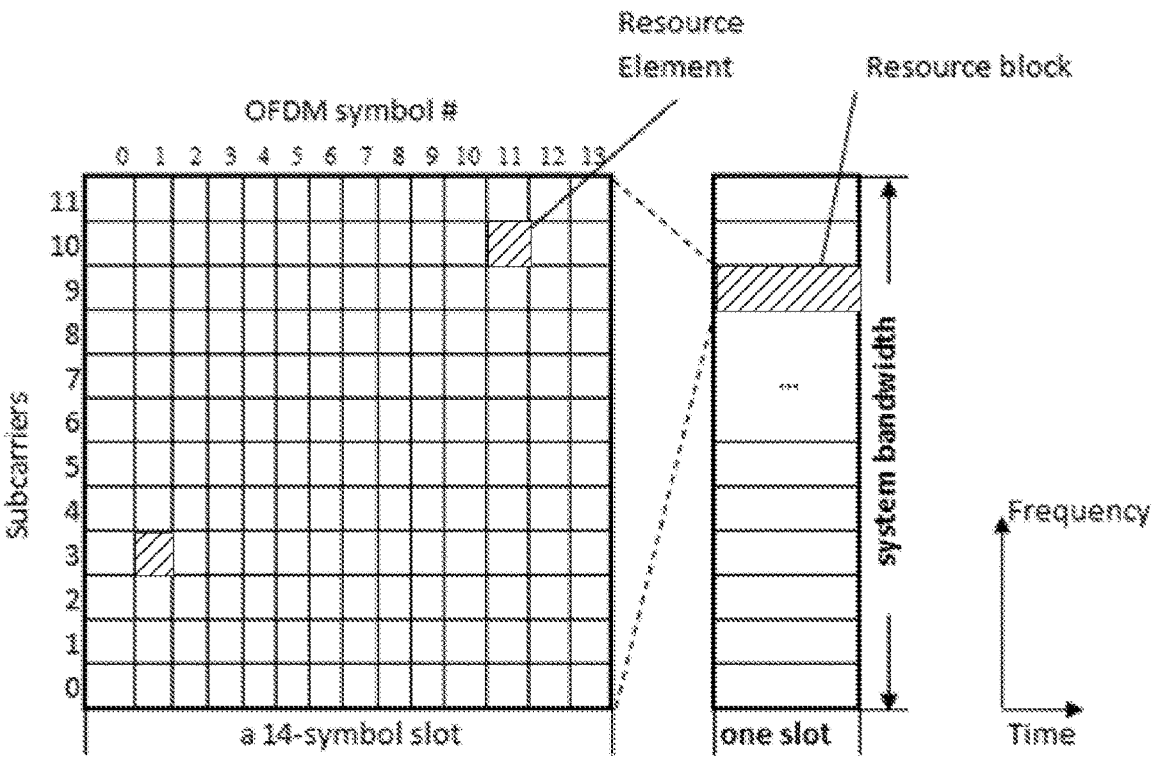
FIG. 11 shows an exemplary time-frequency resource grid for an NR slot.

FIG. 11 shows an exemplary time-frequency resource grid for an NR slot. As illustrated in FIG. 11, a resource block (RB) consists of a group of 12 contiguous OFDM subcarriers for a duration of a 14-symbol slot. Like in LTE, a resource element (RE) consists of one subcarrier in one slot. An NR slot can include 14 OFDM symbols for normal cyclic prefix and 12 symbols for extended cyclic prefix.

In NR, the physical downlink control channel (PDCCH) is confined to a region containing a particular number of symbols and a particular number of subcarriers, referred to as the control resource set (CORESET). In general, a CORESET includes multiple RBs (i.e., multiples of 12 REs) in the frequency domain and 1-3 OFDM symbols in the time domain. The smallest unit used for defining CORESET is resource element group (REG), which spans one PRB in frequency and one OFDM symbol in time. CORESET resources can be indicated to a UE by RRC signaling.

In addition to PDCCH, each REG in a CORESET contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on a physical UL control channel (PUCCH) in that slot, as well as which RBs will carry that data. A UE first detects and decodes DCI and, if the DCI includes an UL grant for the UE, transmits the corresponding physical UL shared channel (PUSCH) on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such, DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (U) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2.

Beam management has been defined for NR since Rel-15. The feature is used to keep track of suitable beams for transmission and reception. Network nodes that use analog beamforming with fixed grid-of-beam transmission schemes typically monitor beam candidates continuously, e.g., by evaluating UE reports of layer-1 (L1) reference signal received power (RSRP) per beam. UEs perform such measurements on SSBs associated with the respective beams.

In general, the NR beam management framework allows the network to inform the UE about spatial relations between beams and to facilitate UE-side beam tracking. Before starting a random access channel (RACH) procedure towards the network, the UE measures on a set of SSBs and chooses a suitable one. The UE then transmits on the RACH resources associated with the selected SSB. The corresponding beam will be used by both the UE and the network to communicate until RRC_CONNECTED state beam management is active. The network infers which SSB beam was chosen by the UE without any explicit signaling. This procedure for finding an initial beam is often denoted P1.

The network can use the SSB beam as an indication of which (narrow) CSI-RS beams to try, i.e., the candidate set of narrow CSI-RS beams for beam management is based on the best SSB beam. Once CSI-RS is transmitted, the UE measures RSRP and reports the result to the network. If the network receives a CSI-RSRP report from the UE that indicates a new CSI-RS beam is better than the beam used to transmit PDCCH/PDSCH, the network updates the serving beam for the UE accordingly (and possibly also modifies the candidate set of CSI-RS beams).

The network can also instruct the UE to perform measurements on SSBs. If the network receives a UE report indicating that a new SSB beam is better than the previous best SSB beam, a corresponding update of the candidate set of CSI-RS beams for the UE may be motivated. This refinement procedure is often referred to as P2.

Once in RRC_CONNNECTED state, the UE is configured with a set of reference signals. Based on beam management/L1 measurements, the UE determines which of its DL beams is suitable to receive each reference signal in the set. The network then indicates which reference signals are associated with the beam that will be used to transmit PDCCH/PDSCH, and the UE uses this information to adjust its DL beam when receiving PDCCH/PDSCH. PDCCH and PDSCH beams can be identical—if not, additional signaling is needed.

When the network has updated its serving DL transmit beam for the UE, the UE may need to update its corresponding DL receive beam. To accomplish this, the network repeatedly transmits CSI-RS on the new serving transmit beam while the UE varies its receive beam. The UE can then select the best receive beam and associate it with the measured reference signal. This procedure is often referred to as P3.

Several signals can be transmitted from the same base station (e.g., gNB) antenna from different antenna ports. These signals can have the same large-scale properties, such as in terms of parameters including Doppler shift/spread, average delay spread, and/or average delay. These antenna ports are then said to be "quasi co-located" or "QCL". The network can signal to the UE that two antenna ports are QCL with respect to one or more parameters. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is a demodulation reference signal (DMRS) (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

Information about what assumptions can be made regarding QCL is signaled to the UE from the network. In NR, the following four types of QCL relations between a transmitted source RS and transmitted target RS are defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as "spatial QCL." There is currently no strict definition of spatial QCL, but the understanding is that if two transmitted antenna ports are spatially QCL, the UE can use the same Rx beam to receive them. When a QCL relation is signaled to a UE, it includes not only information about the particular QCL type (e.g., A, B, C, or D), but also a serving cell index, a BWP index, and a source reference signal identity (CSI-RS, TRS or SSB).

QCL Type D is the most relevant for beam management, but it is also necessary to convey a Type A QCL RS relation to UEs so they can estimate all the relevant large scale parameters. Typically, this can be done by configuring a UE with a tracking reference signal (TRS, e.g., a CSI-RS) for time/frequency offset estimation. To be able to use any QCL reference, the UE would have to receive it with a sufficiently good signal-to-interference-plus-noise ratio (SINR). In many cases, this constrains the TRS for a particular UE to be transmitted in a particular beam and/or beam configuration.

In other words, one could say that two signals are transmitted in the same direction or via the same downlink beams when these are QCL Type D. If the UE knows that a signal is spatially QCL with some other signal it received earlier with a particular RX beam, then the UE can reliably use the same RX beam to receive this signal. Hence, the network may give this relation between a channel to be decoded (e.g., PDCCH/PDSCH) and a signal that is known to be transmitted in a given direction that may be used as reference by the UE, like CSI-RS, SSB, etc.

To introduce dynamics in beam and TRP selection, the UE can be configured through RRC signaling with N Transmission Configuration Indicator (TCI) states, where N is up to 128 in frequency range 2 (FR2, e.g., above 6 GHz) and up to eight in FR1 (e.g., below 6 GHz), depending on UE capability. Each configured TCI state includes parameters for the QCL associations between source RS (e.g., CSI-RS or SS/PBCH) and target RS (e.g., PDSCH/PDCCH DMRS antenna ports). TCI states can also be used to convey QCL information for the reception of CSI-RS. The N states in the list of TCI states can be interpreted as N possible beams transmitted by the network, N possible TRPs used by the network to communicate with the UE, or a combination of one or multiple beams transmitted from one or multiple TRPs.

More specifically, each TCI state can contain an ID along with QCL information for one or two source DL RSs, with each source RS associated with a QCL type, a serving cell index, a BWP index, and a source reference signal identity (CSI-RS, TRS or SSB). For example, two different CSI-RSs {CSI-RS1, CSI-RS2} can be configured in the TCI state as {qcl-Type1, qcl-Type2}={Type A, Type D}. The UE can interpret this TCI state to mean that the UE can derive Doppler shift, Doppler spread, average delay, delay spread from CSI-RS1, and Spatial Rx parameter (e.g., RX beam to use) from CSI-RS2. In case QCL Type D is not applicable (e.g., low- or mid-band operation), then a TCI state contains only a single source RS. Unless specifically noted, however, references to source RS “pairs” include cases of a single source RS.

Furthermore, a first list of available TCI states can be configured for PDSCH, and a second list can be configured for PDCCH. This second list can contain pointers, known as TCI State IDs, to a subset of the TCI states configured for PDSCH. For the UE operating in FR1, the network then activates one TCI state for PDCCH (i.e., by providing a TCI to the UE) and up to eight TCI states for PDSCH, depending on UE capability.

As an example, a UE can be configured with four active TCI states from a list of 64 total configured TCI states. Hence, the other 60 configured TCI states are inactive and the UE need not be prepared to estimate large scale parameters for those. On the other hand, the UE continuously tracks and updates the large-scale parameters for the four active TCI states by performing measurements and analysis of the source RSs indicated for each of those four TCI states. Each DCI used for PDSCH scheduling includes a pointer (or index) to one or two active TCI states for the scheduled UE. Based on this pointer, the UE knows which large scale parameter estimate to use when performing PDSCH DMRS channel estimation and PDSCH demodulation.

UE TCI states are currently configured via RRC as part of CellGroupConfig information element (IE), which is a DU configuration parameter in the CU-DU split architecture discussed above. This IE can be sent to the UE, for example, in an RRCResume message during transition from RRC_INACTIVE to RRC_CONNECTED state, or in an RRCReconfiguration message during handovers, intra-cell reconfigurations, or transitions from RRC_IDLE to RRC_CONNECTED state. The TCI states configuration is signaled as part of the PDSCH configuration per DL BWP of an SpCell (i.e., a PCell or a PSCell), where an SpCell can be comprised of one or multiple DL BWPs. FIG. 12 shows an exemplary structure of CellGroupConfig including TCI-states configuration.

FIGS. 13A-D show ASN.1 data structures for various exemplary IEs used for configuring TCI states of a UE via RRC signaling. In particular, FIG. 13A shows an ASN.1 data structure for a PDSCH configuration (i.e., for a particular DL BWP) including a list of TCI states to be added or modified. Each list member is described by a TCI-State field, for which FIG. 13D shows an exemplary ASN.1 data structure. As shown in FIG. 13D, each TCI-state field has a TCI-stateID associated in its configuration.

There is also an association between the PDCCH configuration and a TCI state, since the UE may also need to monitor a DL beam for PDCCH. In the PDCCH-Config there is a list of so-called CORESET (Control Resource Sets). Similarly, FIG. 13B shows an ASN.1 data structure for a PDCCH-Config IE used for PDCCH configuration. This IE includes a controlResourcesSetToAddModList, which is a list of CORESET resources. FIG. 13C shows an ASN.1 data structure for a ControlResourceSet field, which represents a single CORESET resource.

As discussed above, each CORESET contains 1-3 OFDM symbols as well as a frequency-domain allocation of PDCCH, i.e., where in frequency the PDCCH is transmitted and shall be monitored by the UE. The ControlResourceSet field shown in FIG. 13C also includes a list of TCI states to be added or modified, with each member include a TCI-StateID field that points to one of the TCI states configured for reception of PDSCH (e.g., according to FIG. 13A) that should be used to receive PDCCH candidates transmitted in that CORESET. Each CORESET can have a different TCI state configured/activated, facilitating use of different transmit beams for different PDCCH candidates.

The exemplary TCI-State field definition in FIG. 13D includes a field called cell in the QCL configuration, which indicates the UE’s serving cell in which the QCL source RS is being configured. If the field is absent, it applies to the serving cell in which the TCI-State is configured (i.e., the SpCell of the cell group, not an indexed SCell). The RS can be located on a serving cell other than the serving cell in which the TCI-State is configured only if qcl-Type is configured as type D. In other words, for a given SpCellConfig, the RS for a given TCI state is associated with a serving cell in that cell group, which may be the PCell/PScell or an associated SCell. That is indicated by the field cell in the TCI state configuration. And if the field is absent, that refers to the cell where the TCI state is configured.

To summarize, TCI configurations are provided in the PDSCH configuration in a given DL BWP. For PDCCH, the CORESET configuration contains a TCI state pointer to a configured TCI state in PDSCH. Each TCI state contains the previously described QCL information, i.e., one or two source downlink RS, with each source RS associated with a QCL type.

Once the UE has been configured with a CellGroupConfig and SpCellConfig with PDSCH and PDCCH configurations per BWP, having possible TCI states associated to different transmission downlink beams where these channels need to be detected, the UE needs to know when the network is transmitting in the time domain. In other words, all these TCI states that are configured are not used all the time, but only when needed. Hence, an efficient activation/deactivation procedure is defined in NR whereby the network indicates for a given CORESET which TCI state is to be monitored by the UE (e.g., which DL beam the UE needs to monitor to detect a possible CORESET transmitted by the network).

Figures 14A, 14B, 14C:
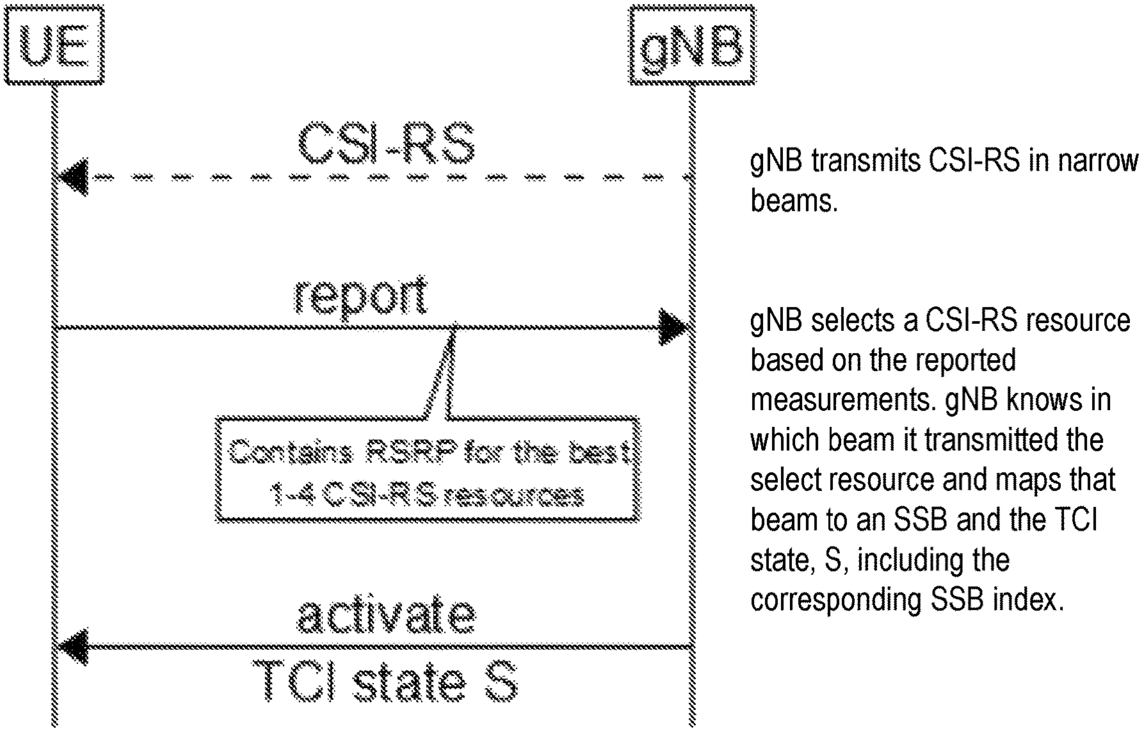
FIGS. 14A-C illustrate various aspects of how TCI states are configured and/or activated.

FIGS. 14A-C illustrate various aspects of TCI state activation for a UE. In particular, FIG. 14A shows a signaling diagram between UE and serving gNB. The gNB initially transmits CSI-RS in narrow beams to the UE, which reports RSRP for the best 1-4 CSI-RS resources to the gNB. The gNB selects a CSI-RS resource based on the reported measurements. The gNB knows in which beam it transmitted the select resource and maps that beam to an SSB and the TCI state, S, including the corresponding SSB index. The gNB then sends the UE a medium access control (MAC) control element (CE) that activates TCI state S.

FIG. 14B shows an exemplary MAC CE for activating a TCI state. The following text from 3GPP TS 38.321 further describes the contents and use of this exemplary MAC CE.

*Begin Text from 3PGG TS 38.321*

5.18.5 Indication of TCI State for UE-Specific PDCCH

The network may indicate a TCI state for PDCCH reception for a CORESET of a Serving Cell or a set of Serving Cells configured in simultaneousTCI-UpdateList1-r16 or simultaneousTCI-UpdateList2-r16 by sending the TCI State Indication for UE-specific PDCCH MAC CE described in clause 6.1.3.15.

The MAC entity shall:

1> if the MAC entity receives a TCI State Indication for UE-specific PDCCH MAC CE on a Serving Cell:

2> indicate to lower layers the information regarding the TCI State Indication for UE-specific PDCCH MAC CE.

. . .

6.1.3.15 TCI State Indication for UE-Specific PDCCH MAC CE

The TCI State Indication for UE-specific PDCCH MAC CE is identified by a MAC subheader with LCID as specified in Table 6.2.1-1. It has a fixed size of 16 bits with following fields:

Serving Cell ID: This field indicates the identity of the Serving Cell for which the MAC CE applies. The length of the field is 5 bits. If the indicated Serving Cell is configured as part of a simultaneousTCI-UpdateList1-r16 or simultaneousTCI-UpdateList2-r16 as specified in TS 38.331 [5], this MAC CE applies to all theServing Cells in the set simultaneousTCI-UpdateList1-r16 or simultaneousTCI-UpdateList2-r16, respectively;

CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;

TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

*End Text from 3PGG TS 38.321*

In general, the network can indicate/activate via MAC CE one TCI state for PDCCH (i.e., provides a TCI for PDCCH) and up to eight active TCI states for PDSCH. The number of active TCI states the UE support is a UE capability.

Once the UE knows the TCI state for a given CORESET for PDCCH monitoring (e.g., the DL beam direction to use for monitoring PDCCH), the UE needs to know which TCI state is considered for a given data being scheduled. When the UE is monitoring PDCCH in a CORESET according to a given TCI state indicated with MAC CE, the UE may receive a DCI that indicates which of the configured TCI states for PDSCH is to be used (i.e., activated) for decoding the data on PDSCH. There are different ways this could be done, such as:

DCI indicates that UE shall use same TCI state as the CORESET where DCI was received;

DCI indicates that UE shall use another TCI state associated with PDSCH, with three bits indication mapping to one TCI state configured in a list in PDSCH configuration; or DCI indicates that UE shall use another TCI state associated to PDSCH, with three bits indication for a bit map between integers 0-7 and one of the TCI states configured in a list in PDSCH configuration. The bit map is provided in another MAC CE for PDSCH activation. This case is used when the list of TCI states configured for PDSCH is larger than 8, and PDSCH is to be scheduled in a different TCI state compared to PDCCH.

In summary, a UE obtains from DCI the TCI state for PDSCH associated with a given scheduling opportunity. PDSCH configuration contains the tci-StatesToAddModList, which indicates a transmission configuration that includes QCL-relationships between the DL RSs in one RS set and the PDSCH DMRS ports. In other words, it indicates the beams where PDSCH may be scheduled. Each of these configured TCI states can be activated by DCI.

In case more than 8 TCI states are defined for PDSCH, a DCI-based MAC CE-assisted scheme exists, i.e., the third option described above. The different values that can be represented by the bitmap are referred to as "codepoints." For example, a three-bit field can represent up to eight TCI codepoints. Either one or two TCI states can be mapped to each TCI code point. When one TCI state is mapped to a TCI code point, the indicated TCI state is to be used for single- TRP transmission. When two TCI states are mapped to a TCI code point, the indicated TCI states are to be used for multi-TRP transmission.

FIG. 14C illustrates how TCI States are mapped to the codepoints in the DCI Transmission Configuration Indication field in NR-Rel-15. In this example, the MAC CE for Activation/Deactivation of TCI States for UE-specific PDSCH has a size of three octets and contains 16 $T_i$ fields (i=0, 1, 2, . . . , 15) corresponding to 16 different TCI State IDs that have been configured in a UE for a given BWP. In this example, TCI States with IDs i=2, 4, 5, 7, 8, 9, 11, and 13 are being activated with the MAC CE shown in FIG. 14C. In particular, the TCI State IDs are mapped to the codepoint values of DCI Transmission Configuration Indication field as follows:

TCI State ID i=2 corresponds to codepoint value 0;
TCI State ID i=4 corresponds to codepoint value 1;
TCI State ID i=5 corresponds to codepoint value 2;
TCI State ID i=7 corresponds to codepoint value 3;
TCI State ID i=8 corresponds to codepoint value 4;
TCI State ID i=9 corresponds to codepoint value 5;
TCI State ID i=1 corresponds to codepoint value 6; and
TCI State ID i=13 corresponds to codepoint value 7.

In NR Rel-15, an RRC_CONNECTED UE can be configured to report L1-RSRP for each one of up to four beams, either on CSI-RS or SSB. UE measurement reports can be sent via PUCCH or PUSCH. The following characteristics also apply to measurements and reporting for beam management:

- Periodic and semi-persistent CSI-RS resources are RRC configured with a certain period and a certain slot offset.
- Aperiodic CSI-RS is scheduled by DCI, in the same DCI where the UL resources for the measurement report are scheduled.
- Semi-persistent CSI-RS is configured using RRC and activated using MAC CE. Periodic CSI-RS is configured using RRC.
- Options for what/how the UE shall report is defined in a CSI-RS reporting setting (CSIReportConfig), part of CSI-MeasConfig which is part of ServingCellConfig (i.e., within CellGroupConfig for SpCell).
- A reporting setting also refers to a CSI-ResourceConfig, which defines the resources for which the report setting should be used.
- A UE can be configured to report CSI based on CSI-RS.
- The reported RSRP value corresponding to the first (best) CSI/SSB requires 7 bits (absolute value) and any others are reported with 4 bits using encoding relative to the first.

Table 2 below summarizes UE reporting of L1 measurements.

TABLE 2

| Reference signal | Periodic reporting | Semi-persistent reporting | Aperiodic reporting |
|---|---|---|---|
| SSB | PUCCH | PUCCH/PUSCH | PUSCH |
| Periodic CSI-RS | PUCCH | PUCCH/PUSCH | PUSCH |
| Semi-pers. CSI-RS | Not supported | PUCCH/PUSCH | PUSCH |
| Aperiodic CSI-RS | Not supported | Not supported | PUSCH |

L1 measurements and reports (e.g., for beam management and CSI) are configured for a UE per serving cell, as part of CSI measurement configuration. The UE is configured with an RRCReconfiguration message that includes CellGroupConfig (e.g., for the UE's SCG), wherein each serving cell of the cell group is provided a dedicated configuration called ServingCellConfig. FIG. 15A shows an ASN.1 data from for an exemplary ServingCellConfig IE with a CSI-MeasConfigfield. In 3GPP TS 38.331, a CSI-MeasConfigIE configures channel state information reports to be transmitted on PUCCH on the serving cell in which CSI-MeasConfig is included, as well as channel state information reports on PUSCH triggered by DCI received on the serving cell in which CSI-MeasConfig is included.

FIG. 15B shows an ASN.1 data structure for an exemplary CSI-MeasConfig IE. As shown in FIG. 15B, this IE includes both SSB and CSI-RS configurations for beam management, such as the following:

CSI-RS resources to be grouped later;
Set of CSI-RS, grouped for later reference;
Set of SSBs, grouped for later reference; and
What and how CSI is to be reported.

CSI-RS resources for beam management are included in an nzp-CSI-RS-ResourceToAddModList, which is a pool of NZP-CSI-RS-Resource identified by the field NZP-CSI-RS-ResourceSet. This field includes identifiers of Non-Zero-Power (NZP) CSI-RS resources comprising the set as well as and set-specific parameters. These can be referred to from CSI-ResourceConfig or from MAC CEs. FIG. 15C shows an ASN.1 data structure for an exemplary NZP-CSI-RS-ResourceSet IE.

SSB resources for beam management are included in csi-SSB-ResourceSetToAddModList, which is a pool of CSI-SSB-ResourceSet that can be referred to from CSI-ResourceConfig. FIG. 15D shows an ASN.1 data structure for an exemplary CSI-SSB-ResourceSet IE. This IE is used to configure one SSB resource set which refers the SSB indicated in ServingCellConfigCommon. The IE CSI-ResourceConfigToAddModList is used to configure CSI resource settings, such as in the in CSI-MeasConfig IE shown in FIG. 15B. It contains a list of CSI-ResourceConfig fields, where each defines a group of one or more NZP-CSI-RS-ResourceSet, CSI-IM-ResourceSet and/or CSI-SSB-ResourceSet. FIG. 15E shows an ASN.1 data structure for an exemplary CSI-ResourceConfig field. The following provides additional definition of individual fields shown in FIG. 15E:

- bwp-Id: The DL BWP which the CSI-RS associated with this CSI-ResourceConfig are located in (see 3GPP TS 38.214, clause 5.2.1.2. This explains why a list of CSI-ResourceConfig is needed such that each BWP would have its own CSI-ResourceConfig.
- csi-IM-ResourceSetList: List of references to CSI-IM resources used for beam measurement and reporting in a CSI-RS resource set. Contains up to maxNrofCSI-IM-ResourceSetsPerConfig resource sets if resourceType is 'aperiodic' and 1 otherwise (see 3GPP TS 38.214, clause 5.2.1.2).
- CSI-ResourceConfigId: Used in CSI-ReportConfig to refer to an instance of CSI-ResourceConfig.
- csi-SSB-ResourceSetList: List of references to SSB resources used for beam measurement and reporting in a CSI-RS resource set (see 3GPP TS 38.214, clause 5.2.1.2).
- nzp-CSI-RS-ResourceSetList: List of references to NZP CSI-RS resources used for beam measurement and reporting in a CSI-RS resource set. Contains up to maxNrofNZP-CSI-RS-ResourceSetsPerConfig resource sets if resourceType is 'aperiodic' and 1 otherwise (see 3GPP TS 38.214, clause 5.2.1.2).

resourceType: Time domain behavior of resource configuration (see 3GPP TS 38.214, clause 5.2.1.2). It does not apply to resources provided in the csi-SSB-ResourceSetList.

In addition, CSI-MeasConfig (FIG. 15B) also contains configurations for what and how to report as beam measurements. This information is included in the CSI-ReportConfigToAddMod-List IE, which is a list of CSI-ReportConfig fields, each of which is used to:

Configure a periodic or semi-persistent report sent on PUCCH on the cell in which the CSI-ReportConfig is included; or Configure a semi-persistent or aperiodic report sent on PUSCH triggered by DCI received on the cell in which the CSI-ReportConfig is included (in this case, the cell on which the report is sent is determined by the received DCI).

FIGS. 16A-B show an ASN.1 data structure for an exemplary CSI-ReportConfig field (or IE). The following provides additional definition of individual fields shown in FIG. 16:

Carrier: Indicates in which serving cell the CSI-ResourceConfig indicated below are to be found. If the field is absent, the resources are on the same serving cell as this report configuration. The IE is about reporting but needs to refer to resources that are measured. to be reported (e.g., SSBs/CSI-RSs). The carrier indicates which serving cell is transmitting these resources to be reported according to the reporting configuration.

codebookConfig: Codebook configuration for Type-1 or Type-2 including codebook subset restriction. Network does not configure codebookConfig and codebookConfig-r16 simultaneously to a UE.

cqi-FormatIndicator: Indicates whether the UE shall report a single (wideband) or multiple (subband) CQI. (see 3GPP TS 38.214, clause 5.2.1.4).

cqi-Table: Which CQI table to use for CQI calculation (see 3GPP TS 38.214, clause 5.2.2.1).

csi-IM-ResourcesForinterference: CSI IM resources for interference measurement. CSI-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.

csi-ReportingBand: Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see 3GPP TS 38.214, clause 5.2.1.4). This field is absent if there are less than 24 PRBs (no sub band) and present otherwise, the number of sub bands can be from 3 (24 PRBs, sub band size 8) to 18 (72 PRBs, sub band size 4).

groupBasedBeamReporting: Turning on/off group beam based reporting (see 3GPP TS 38.214, clause 5.2.1.4).

If enabled: UE shall report different CRI or SSBRI for each report setting in a single report nrofReportedRS;

If disabled: UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.

non-PMI-PortIndication: Port indication for RI/CQI calculation. For each CSI-RS resource in the linked ResourceConfig for channel measurement, a port indication for each rank R, indicating which R ports to use. Applicable only for non-PMI feedback (see 3GPP TS 38.214, clause 5.2.1.4.2). The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.

nrofReportedRS: The number (N) of measured RS resources to be reported per report setting in a non-group-based report. N<=N_max, where N_max is either 2 or 4 depending on UE capability.

nzp-CSI-RS-ResourcesForInterference: NZP CSI RS resources for interference measurement. CSI-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.

p0alpha: Index of the p0-alpha set determining the power control for this CSI report transmission (see 3GPP TS 38.214, clause 6.2.1.2).

pdsch-BundleSizeForCSL: PRB bundling size to assume for CQI calculation when reportQuantity is CR1/RI/i1/CQI. If the field is absent, the UE assumes that no PRB bundling is applied (see 3GPP TS 38.214, clause 5.2.1.4.2).

pmi-FormatIndicator: Indicates whether the UE shall report a single (wideband) or multiple (subband) PMI. (see 3GPP TS 38.214, clause 5.2.1.4).

pucch-CSI-ResourceList: Indicates which PUCCH resource to use for reporting on PUCCH.

reportConfigType: Time domain behavior of reporting configuration. It is worth mentioning two typical report types configured for beam measurement reporting: cri-RSRP (CSI-RS Resource Indicator) and ssb-Index-RSRP.

reportFreqConfiguration: Reporting configuration in the frequency domain. (see 3GPP TS 38.214, clause 5.2.1.4).

reportQuantity: The CSI related quantities to report. see 3GPP TS 38.214, clause 5.2.1. If the field reportQuantity-r16 is present, UE shall ignore reportQuantity (without suffix).

reportSlotConfig: Periodicity and slot offset (see 3GPP TS 38.214, clause 5.2.1.4). If the field reportSlotConfig-v1530 is present, the UE shall ignore the value provided in reportSlotConfig (without suffix). reportSlotOffsetList, reportSlotOffsetListForDCI-Format0-1, reportSlotOffsetListForDCI-Format0-2 Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity. Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see 3GPP TS 38.214, clause 6.1.2.1). The field reportSlotOffsetList applies to DCI format 0_0, the field reportSlotOffsetListForDCI-Format0-1 applies to DCI format 0_1 and the field reportSlotOffsetListForDCI-Format0-2 applies to DCI format 0_2 (see 3GPP TS 38.214, clause 6.1.2.1).

resourcesForChannelMeasurement: Resources for channel measurement. CSI-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

subbandSize: Indicates one out of two possible BWP-dependent values for the subband size as indicated in 3GPP TS 38.214, table 5.2.1.4-2. If csi-ReportingBand is absent, the UE shall ignore this field.

timeRestrictionForChannelMeasurements: Time domain measurement restriction for the channel (signal) measurements (see 3GPP TS 38.214, clause 5.2.1.1).

timeRestrictionForInterferenceMeasurements: Time domain measurement restriction for interference measurements (see 3GPP TS 38.214, clause 5.2.1.1).

3GPP previously specified the concepts of dormant LTE SCell and dormancy-like behavior of an NR SCell. In LTE, when an SCell is in dormant state, the UE does not need to monitor the corresponding PDCCH or PDSCH and cannot transmit in the corresponding UL. This behavior is similar to behavior in a deactivated state, but the UE is also required to perform and report CQI measurements, which is different from deactivated state behavior. A PUCCH SCell (SCell configured with PUCCH) cannot be in dormant state.

In NR, dormancy-like behavior for SCells is based on the concept of dormant bandwidth parts (BWP). One of the UE's dedicated BWPs configured via RRC signaling can be configured as dormant for an SCell. If the active BWP of the activated SCell is a dormant BWP, the UE stops monitoring PDCCH on the SCell but continues performing CSI measurements, AGC, and beam management (if configured to do so). Downlink control information (DCI) on PDCCH is used to control entering/leaving the dormant BWP for SCell(s) or SCG(s), and is sent to the SpCell of the cell group that includes the dormant SCell (i.e., to PCell if SCell belongs to MCG, to PSCell if SCell belongs to SCG). The SpCell (i.e., PCell or PSCell) and PUCCH SCell cannot be configured with a dormant BWP.

Figures 16C, 17:
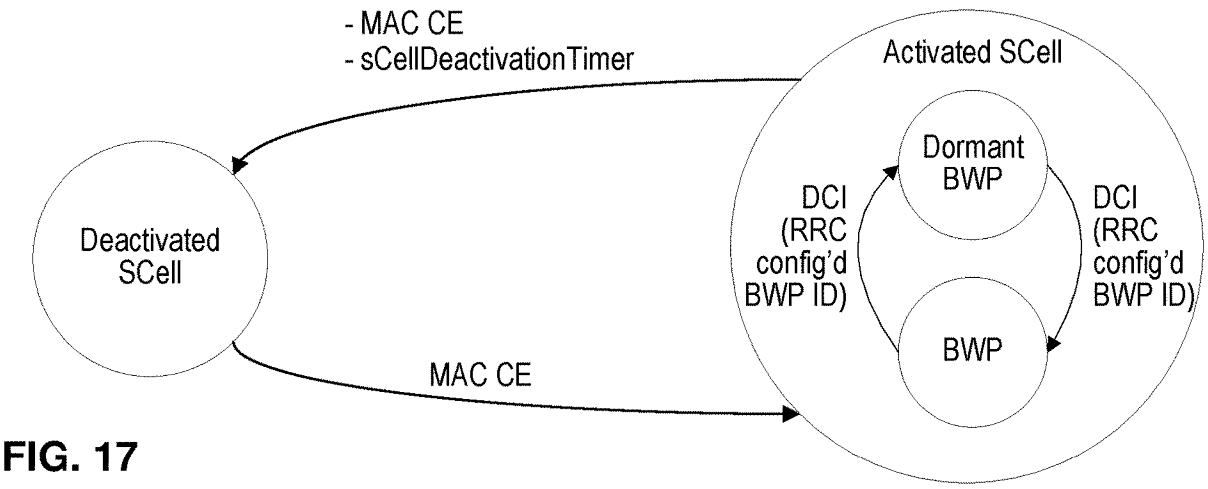

FIG. 17 is an exemplary state transition diagram for NR SCells. At a high level, a UE's SCell can transition between deactivated and activated states based on explicit commands from the network (e.g., MAC CEs) or expiration of a deactivation timer. Within the activated state, a particular BWP can transition between active and dormant conditions based on DCI received from the network.

However, if the UE is configured with MR-DC, it cannot fully benefit from the energy reductions of dormant state or dormancy-like behavior since the PSCell cannot be configured to be dormant. Instead, an existing solution could be releasing (for power savings) and adding (when traffic demands requires) the SCG on an as-needed basis. Traffic is likely to be bursty, however, so adding and releasing the SCG as needed can involve a significant amount of RRC signaling and inter-node messaging between the MN and the SN. This can experience considerable delay.

In the context of 3GPP Rel-16, there were some discussions about placing the PSCell in dormancy, also referred to as SCG Suspension. Some agreed principles of this solution include:

The UE supports network-controlled suspension of the SCG in RRC_CONNECTED.

UE behavior for a suspended SCG is for further study (FFS)

The UE supports at most one SCG configuration, suspended or not suspended, in Rel16.

In RRC_CONNECTED upon addition of the SCG, the SCG can be either suspended or not suspended by configuration.

More detailed solutions were proposed for Rel-16, but these have various problems. For example, one solution proposed that a gNB can indicate for a UE to suspend SCG transmissions when no data traffic is expected to be sent in SCG, so that UE keeps the SCG configuration but does not use it for power saving purposes. Signaling to suspend SCG could be based on DCI/MAC-CE/RRC, but no details were discussed above the particular configuration from the gNB to the UE. Even so, this solution for SCells may not be applicable to PSCells, which may be associated with a different network node (e.g., a gNB operating as SN).

No specific SCG energy reduction techniques have been discussed for 3GPP Rel-17. However, it is expected that such techniques will involve one or more of the following:

The UE starting to operate the PSCell in dormancy, e.g., switching the PSCell to a dormant BWP). The network considers the PSCell in dormancy and at least stops transmitting PDCCH for that UE in the PSCell.

The UE deactivating the PSCell, similar to SCell deactivation. The network considers the PSCell as deactivated and at least stops transmitting PDCCH for that UE in the PSCell.

The UE operating the PSCell in long DRX; SCG DRX can be switched off from the MN (e.g., via MCG MAC CE or DCI) when the need arises, such as DL data arrival for SN-terminated SCG bearers.

The UE suspending its operation with the SCG (e.g., suspending bearers associated with SCG, including MN- and SN-terminated bearers) but storing the SCG configuration ("stored SCG). On the network side, the SN can store the SCG like the UE, or the SN can release the UE's SCG context and re-generate it upon resume. The latter option requires support from the MN, which stores SCG context for UEs whose SCG is suspended.

Although these techniques are focused on SCG, it is likely that similar approaches could be used on the MCG. For example, the MCG may be suspended or in long DRX, while data communication is happening only via the SCG.

Recently, it was agreed within 3GPP RAN2 WG that the following issues should be studied for SCG deactivation:

- How signalling and inter-node interaction works at activation deactivation (e.g., MN triggered, SN triggered, UE triggered, signalling mechanism, which node is in control etc)
- If for deactivated SCG, the UE stops monitoring PDCCH for PSCell and SCells of the SCG
- If for the PSCell in deactivated SCG, the UE performs CSI/RRM measurement and report; AGC; beam management; RLM; etc.

A likely behavior in deactivated SCG is that the UE stops monitoring PDCCH for PSCell and SCell of the SCG. Up to Rel-16, a UE configured with MR-DC may perform beam management operations at least with each SpCell, i.e., PCell, PSCell, and if configured with SCell(s) of the SCG. With the introduction of the SCG deactivation in Rel-17, the UE should reduce energy consumption by minimizing SCG operations such as PDCCH monitoring. However, PDCCH monitoring is part of the beam management framework, and the UE is supposed to be able to receive MAC CEs with TCI state indications for the configured CORESET(s). Without that, upon receiving a command/indication to resume the SCG (or to transition the SCG to a normal/active/activated mode of operation), the UE has no means to know which TCI state to assume for the PDCH monitoring.

Accordingly, embodiments of the present disclosure provide techniques for a UE configured for MR-DC with a first cell group (e.g., MCG) and a second cell group (e.g., SCG) in a wireless network (e.g., NG-RAN). These techniques can include the UE receiving (from a network node) an indication for the second cell group to enter a deactivated mode of operation (e.g., from a normal mode of operation). In addition, the UE can perform beam measurements and/or reporting operations while second cell group is deactivated. These beam measurements and/or reporting operations can be performed at least according to one of the following:

- L1/CSI beam measurements and reporting on PUSCH and/or on PUCCH;
- L1 measurements based on SSB, e.g., L1 CSI-RSRP;
- L1 measurements based on CSI-RS, e.g., L1 CSI-RSRP;
- Periodic, aperiodic, and semi-persistent reporting;
- Reporting over PUCCH and/or PUSCH of the second cell group (e.g., SCG PUCCH, SCG PUSCH);
- Reporting over PUCCH and/or PUSCH of the first cell group (e.g., MCG PUCCH, MCG PUSCH);
- Reporting on a MAC CE of the first cell group (e.g., MAC CE of MCG);
- Reporting on an RRC message of the first cell group (e.g., measurement report on MCG).

In addition, the UE can manage PDCCH TCI state indications received while the second cell group is deactivated in at least one of following ways:

- L1 measurements and L1 reporting, MAC CEs for TCI state PDCH indication:
  - MAC CE for TCI state indications over PDCCH of second cell group (e.g., PDCCH of SCG);
  - MAC CE for TCI state indications over PDCCH of first cell group (e.g., PDCCH of MCG);
- L1 measurements and L1 reporting, but no MAC CEs for TCI state PDCCH updates while second cell group is deactivated;
- No L1 measurements, no L1 reporting, no MAC CEs for TCI state PDCH indication, UE assumes latest TCI state indicated for the configured CORESETs;
- Request/response mechanism upon resumption of the SCG; and
- UE-initiated resume/activation of the second cell group.

Embodiments can provide various benefits, advantages, and/or solutions to problems described herein. For example, embodiments facilitate the UE to quickly resume/activate an SCG that is in deactivated state. The disclosed variants provide different tradeoffs between readiness (e.g., how quickly the UE can resume/activate the SCG without having to perform random access) and UE energy consumption (e.g., due to reduction/minimization of measurements, reports and PDCCH monitoring on the deactivated second cell group).

In the following discussion, the terms "suspended SCG", "deactivated SCG", "inactive SCG", and "SCG in reduced-energy mode" are used interchangeably. From the UE perspective, however, "SCG in reduced-energy mode" means that the UE is operating in a reduced-energy mode with respect to the SCG. Likewise, the terms "resumed SCG", "activated SCG", "active SCG", "SCG in normal energy mode", "normal SCG operation", and "legacy SCG operation" are used interchangeably. From the UE perspective, "SCG in normal energy mode" means that the UE is operating in a normal (i.e., non-reduced) energy mode with respect to the SCG. Examples of operations are UE signal reception/transmission procedures e.g., RRM measurements, reception of signals, transmission of signals, measurement configuration, measurement reporting, evaluation of triggered event measurement reports, etc.

In the following discussion, the phrases "measurements on the SCG" or "measurements associated with the SCG" correspond to performing measurements on a cell of the SCG (e.g., SpCell) and/or performing measurements according to an SCG measurement configuration.

In the following, embodiments are described in terms of an SCG that is suspended for a UE configured with DC. However, similar principles can be applied to an MCG that is suspended for a UE configured with DC.

In the following discussion, the phrase "L1 beam measurements" may correspond to any measurement of RS (e.g., SSBs and/or CSI-RSs) that is included in the serving cell configuration (e.g., ServingCellConfig). In the case the second cell group is an SCG that is in a deactivated mode of operation, "L1 beam measurements" are L1 measurements configured in ServingCellConfig of the PSCell or an SCell of the SCG. These can be any measurement configured within CSI-MeasConfig of ServingCellConfig.

In the following, the phrase "L1 beam reporting" may correspond to the reporting of any measurement of RS (e.g., SSBs and/or CSI-RSs) that is included in the serving cell configuration (e.g., ServingCellConfig). In the case the second cell group is an SCG that is in a deactivated mode of operation, "L1 beam reporting" is the reporting of L1 measurements configured in the ServingCellConfig of the PSCell or an SCell of the SCG. These can be any measurement configured within CSI-MeasConfig of that ServingCellConfig. The reporting configuration for these L1 beam reporting is associated with the cell where these reports are to be reported, which is not necessarily the same cell transmitting the RS to be measured. For example, if L1 beam measurements of the PSCell are to be reported on the PCell, while the SCG is deactivated, the reporting configuration is configured as part of the CSI-MeasConfig of the PCell (i.e., in the PCell's ServingCellConfig).

To distinguish from RRM measurements that are typically used for supporting mobility procedures, L1 beam measurements and L1 beam reporting can correspond to any measurement and reporting configured in CSI-MeasConfig, which are for CSI reporting in support of beam management operations. In contrast, RRM measurements are configured in a MeasConfig IE, and are not part of a cell or cell group configuration (i.e., not within ServingCellConfig or CellGroupConfig).

As summarized above, a UE can perform beam measurements and/or beam reporting operations while second cell group is deactivated. In various embodiments, these beam measurements and/or beam reporting operations can be performed according to one or more of the following enumerated options listed below.

1. L1 beam measurements and reporting on PUSCH and/or on PUCCH.
2. L1 CSI measurements and reporting on PUSCH and/or on PUCCH.
3. L1 measurements based on SSB, e.g., L1 SSB-RSRP:
   - In some embodiments, only SSB measurements are performed while the second cell group is in deactivated mode of operation, even if CSI-RS measurements are configured (in that case of be used in normal mode of operation);
   - In some embodiments, a set of configured SSB measurements (and associated reporting) are performed while the second cell group is in deactivated mode of operation, wherein the configuration for the set of configured SSB measurements may be different from the configuration used for the while the second cell group is in activated/normal mode of operation;
4. L1 measurements based on CSI-RS, e.g., L1 CSI-RSRP:
   - In some embodiments, only CSI-RS measurements are performed while the second cell group is in deactivated mode of operation, even if SSB measurements are configured (in that case of be used in normal mode of operation);
   - In some embodiments, a set of configured CSI-RS measurements (and associated reporting) are performed while the second cell group is in deactivated mode of operation, wherein the configuration for the set of configured CSI-RS measurements may be different from the configuration used for the while the second cell group is in activated/normal mode of operation;
5. Periodic, aperiodic and semi-persistent reporting.
6. Reporting over PUCCH of the second cell group (e.g., an SCG PUCCH):
   - In some embodiments, UE reports L1 measurements associated to a serving cell in the second cell group (e.g., SpCell of an SCG, or an SCell of the SCG) that is in deactivated mode of operation on a Physical Uplink Control Channel (PUCCH) associated with the second cell group;
     - For example, a UE whose SCG is deactivated perform L1 measurements on the SCG (e.g., for the PSCell reference signal(s)) and report over PUCCH of the SCG (e.g., PUCCH associated to the PSCell configuration).
     - For example, a UE whose MCG is deactivated perform L1 measurements on the MCG (e.g., for the PCell reference signal(s)) and report over PUCCH of the MCG (e.g., PUCCH associated to the PCell configuration).
   - For the PUCCH configuration for reporting (or reporting configuration on PUCCH):
     - In some embodiments, the configuration of PUCCH for L1 reporting is the same cell as while the second cell group was in activated/normal mode of operation.
     - In some embodiments, the configuration of PUCCH for L1 reporting is a different cell than while the second cell group was in activated/normal mode of operation, i.e., at least one field of the PUCCH configuration and/or reporting configuration on PUCCH is different.
     - In some embodiments, to further reduce the number of L1 measurements and L1 reports in deactivated mode of operation compared to normal mode of operation, as that might not be needed as UE is not expected to be scheduled too often, the UE may report only SpCell-related L1 measurements. In other words, SCell-related measurements can be suspended/deactivated (UE stops measuring and reporting) and resumed when the second cell group is resumed.
7. Reporting over PUCCH of the first cell group (e.g., an MCG PUCCH):
   - In some embodiments, UE reports L1 measurements associated to a serving cell in the second cell group (e.g., SpCell of an SCG, or an SCell of the SCG) that is in deactivated mode of operation on a PUCCH associated with the first cell group (e.g., PUCCH of SpCell of an MCG);
     - For example, a UE whose SCG is deactivated perform L1 measurements on the SCG (e.g., for the PSCell reference signal(s)) and report over PUCCH of the MCG (e.g., PUCCH associated to the PSCell configuration).
     - For example, a UE whose MCG is deactivated perform L1 measurements on the MCG (e.g., for the PCell reference signal(s)) and report over PUCCH of the SCG (e.g., PUCCH associated to the PSCell configuration).
   - For the PUCCH configuration for reporting (or reporting configuration on PUCCH:
     - In some embodiments, the configuration of PUCCH for L1 reporting is a new configuration to be used by the UE when the second cell group was in activated/normal mode of operation; In other words, this inter-cell group reporting is to be performed when the second cell group is in deactivated mode of operation (i.e., reporting L1 information of a second cell group on a control channel of the first cell group);
     - In some embodiments, to further reduce the number of L1 measurements and L1 reports in deactivated mode of operation compared to normal mode of operation, as that might not be needed as UE is not expected to be scheduled too often, the UE may report only SpCell related L1 measurements i.e., SCell related measurements are suspended/deactivated (UE stops measuring and reporting), and only resumed when the second cell group is resumed;

8. Reporting over PUSCH of the second cell group (e.g., an SCG PUSCH):
   - In some embodiments, UE reports L1 measurements associated to a serving cell in the second cell group (e.g., SpCell of an SCG, or an SCell of the SCG) that is in deactivated mode of operation on a PUSCH associated with the second cell group;
     - For example, a UE whose SCG is deactivated perform L1 measurements on the SCG (e.g., for the PSCell reference signal(s)) and report over PUSCH of the SCG (e.g., PUSCH associated to the PSCell configuration).
     - For example, a UE whose MCG is deactivated perform L1 measurements on the MCG (e.g., for the PCell reference signal(s)) and report over PUSCH of the MCG (e.g., PUSCH associated to the PCell configuration).
   - Concerning the PUSCH configuration for reporting (or reporting configuration on PUSCH), at least the following options are possible;
     - In some embodiments, the configuration of PUSCH for L1 reporting is the same cell while the second cell group was in activated/normal mode of operation;
     - In another option the configuration of PUSCH for L1 reporting is different cell while the second cell group was in activated/normal mode of operation i.e., at least one field of the PUSCH configuration and/or reporting configuration on PUSCH can be different;
     - In some embodiments, to further reduce the number of L1 measurements and L1 reports in deactivated mode of operation compared to normal mode of operation, as that might not be needed as UE is not expected to be scheduled too often, the UE may report only SpCell related L1 measurements i.e., SCell related measurements are suspended/deactivated (UE stops measuring and reporting), and only resumed when the second cell group is resumed;
9. Reporting over PUSCH of the first cell group (e.g., an MCG PUSCH):
   - In some embodiments, UE reports L1 measurements associated to a serving cell in the second cell group (e.g., SpCell of an SCG, or an SCell of the PUSCH associated with the first cell group (e.g., PUSCH of SpCell of an MCG);
     - For example, a UE whose SCG is deactivated perform L1 measurements on the SCG (e.g., for the PSCell reference signal(s)) and report over PUSCH of the MCG (e.g., PUSCH associated to the PSCell configuration).
     - For example, a UE whose MCG is deactivated perform L1 measurements on the MCG (e.g., for the PCell reference signal(s)) and report over PUSCH of the SCG (e.g., PUSCH associated to the PSCell configuration).
   - For the PUSCH configuration for reporting (or reporting configuration on PUSCH):
     - In some embodiments, the configuration of PUSCH for L1 reporting can be a new configuration to be used by the UE when the second cell group was in activated/normal mode of operation; In other words, this inter-cell group reporting is to be performed when the second cell group is in deactivated mode of operation (i.e., reporting L1 information of a second cell group on a control channel of the first cell group);
     - In some embodiments, to further reduce the number of L1 measurements and L1 reports in deactivated mode of operation compared to normal mode of operation, as that might not be needed as UE is not expected to be scheduled too often, the UE may report only SpCell related L1 measurements i.e., SCell related measurements are suspended/deactivated (UE stops measuring and reporting), and only resumed when the second cell group is resumed;

Reporting over any other UL control channel used on a serving cell of a second cell group while the second cell group is in a deactivated mode of operation can also be supported.

In the case of cross-cell group reporting (e.g., L1 beam measurements of a cell of the second cell group in deactivated mode of operation that are reported on a channel of a cell of the first cell group, e.g., PCell), the configuration of the L1 measurements to be performed (e.g., SSB resources, CSI-RS resources, triggers, periodicities of transmissions, etc.) are part of the PSCell configuration, configured within the CSI-MeasConfig of the ServingCellConfig of the PSCell. Meanwhile, the reporting configuration is part of the PCell configuration, configured within the CSI-MeasConfig of the ServingCellConfig of the PSCell and including for a given report configuration an indication of the cell associated to the resources to be measured and its cell group e.g., serving cell identifier of the PCell and an identifier of the cell group e.g., an identifier of the SCG. Examples below show some modifications in the definitions of the specifications to implement these cases:

- The IE CSI-MeasConfig is used to configure CSI-RS (reference signals) belonging to the serving cell in which CSI-MeasConfig is included (e.g., PSCell when the SCG is deactivated), channel state information reports to be transmitted on PUCCH on the serving cell in which CSI-MeasConfig is included (e.g., the CSI-MeasConfig of the PCell for reporting on PCell's PUCCH CSI information on the PSCell, as configured in the CSI-MeasConfig of the PSCell) and channel state information reports on PUSCH triggered by DCI received on the serving cell in which CSI-MeasConfig is included (e.g., DCI in this case is received via the PCell, but reported information may be related to the PSCell).'
- Within the CSI-ReportConfig IE, some parameters would be modified to realize cross-cell group reporting, such one or more of the following:
  - a. Carrier: In legacy, this indicates in which serving cell the CSI-ResourceConfig indicated below are to be found. If the field is absent, the resources are on the same serving cell as this report configuration. According to embodiments, if beam measurement information of the SCG (e.g., of the PSCell) is to be reported via the PCell, in addition to the carrier information (serving cell index), CSI-ReportConfig needs to include an identifier of a cell group. Then, while SCG beam measurement resources to be measured are configured within CellGroupConfig of the SCG (within ServingCellConfig for each serving cell, within the MCG's CSI-MeasConfig), the reporting is configured within the SCG's CSI-MeasConfig (within each CSI-ReportConfig, to be more precise). For example, in the case the SCG is deactivated and UE needs to be configured with beam measurements to be reported over the MCG (e.g., over PCell), the PCell's CSI-MeasConfig contains a CSI-ReportConfig including a cell group identifier (e.g., cellGroupId=1 to indicate an SCG) and a carrier information (serving cell identification, e.g., indicating that resources to be reported are to be found in the PSCell of the SCG or in one of the SCell(s) of the SCG).

b. csi-IM-ResourcesForInterference: CSI IM resources for interference measurement. According to the method, if CSI-IM of the SCG (e.g., of the PSCell) is to be reported via the PCell, in addition to the carrier information (serving cell index), CSI-ReportConfig needs to include an identifier of a cell group;

c. csi-ReportingBand: Indicates a contiguous or non-contiguous subset of subbands in the bandwidth part which CSI shall be reported for. According to the method, if csi-ReportingBand of the SCG (e.g., of the PSCell) is to be reported via the PCell in case the SCG is deactivated, this field configured in the PCell configuration (ServingCellConfig within CellGroupConfig for the MCG) needs to refers to the sub-bands of a PSCell. Hence, in addition to the carrier information (serving cell index), CSI-ReportConfig needs to include an identifier of a cell group;

d. nrofReportedRS: The number (N) of measured RS resources to be reported per report setting in a non-group-based report. N<=N_max, where N_max is either 2 or 4 depending on UE capability. According to the method, there may be a new capability for the number (N) of measured RS resources to be reported per report setting in a non-group-based report in case the UE reports L1 beam measurements on the second cell group over the first cell group e.g., PSCell L1 measurements reported on PUCCH of the PSCell.

e. pucch-CSI-ResourceList: Indicates which PUCCH resource to use for reporting on PUCCH. According to the method, this PUCCH resource is the one associated to the ServingCellConfig. In other words, if UE is configured with CSI reporting on PCell's PUCCH of CSI information of the PSCell, the PUCCH configuration herein is for the PSCell; thus, it is included in the CSI-ReportConfig within the PCell's ServingCellConfig;

f. reportConfigType: Time domain behavior of reporting configuration. It is worth mentioning two typical report types configured for beam measurement reporting: cri-RSRP (CSI-RS Resource Indicator) and ssb-Index-RSRP. According to the method this is describing what is to be reported to the first cell group concerning the resources (e.g., SSBs/CSI-RSs) of the second cell group;

g. reportFreqConfiguration: Reporting configuration in the frequency domain. (see TS 38.214 [19], clause 5.2.1.4). According to the method, this indication concern the measurement to be performed on a cell of the other cell group in case the UE is configured to report CSI of the SCG (e.g., PScell) on the PCell; in that case the configuration belongs to the ServingCellConfig of the MCG, while it refers to a measurement of the SCG e.g., a wideband CQI, or sub band CQI on the PSCell and/or widebandPMI, subbandPMI on the PSCell, and/or sub-bands of the PSCell to be measured;

h. In summary, according to the method resources for beam measurements on a cell of a second cell group that is deactivated are part of the ServingCellConfig of the cell that belongs to the deactivated cell group, as in normal mode of operation; However, if beam measurements reporting is to be performed on the first cell group (e.g., L1 beam measurements on the PSCell reporting on the PCell), the reporting configuration of the PCell should refer to resources in the PSCell configuration (the ones to be measured).

10. Reporting on a MAC CE of the first cell group (e.g., a MAC CE of the MCG)

In some embodiments, UE reports L1 measurements (or measurement information derived based on L1 measurements e.g., any CSI/L1 information currently performed according to CSI-MeasConfig or derived from these measurements) associated to a serving cell in the second cell group (e.g., SpCell of an SCG, or an SCell of the SCG) that is in deactivated mode of operation in a MAC CE of the MAC entity of the first cell group;

For example, a UE whose SCG is deactivated perform L1 measurements on the SCG, like on the PSCell, (and possibly derive information based on L1 measurements performed on the second cell group) and includes the measurements or information derived in a MAC CE to be transmitted to the MCG;

For example, a UE whose MCG is deactivated perform L1 measurements on the MCG (and possibly derive information based on L1 measurements performed on the second cell group) and includes the measurements or information derived in a MAC CE to be transmitted to the SCG;

One advantage of using MAC CE instead of relying on inter-cell-group reporting is that a MAC CE may contain some payload in a more flexible manner;

In some embodiments, a new MAC CE (associated to a new logical channel) may be defined for that purpose;

In some embodiments, the information derived based on L1 measurements may enable the network (e.g., network node associated with the second cell group) to determine a TCI state to be activated/indicated to the UE in a cell of the second cell group.

11. Reporting on an RRC message of the first cell group (e.g., measurement report on MCG):

In some embodiments, UE includes in an RRC message L1 measurements (or measurement information derived based on L1 measurements) associated to a serving cell in the second cell group (e.g., SpCell of an SCG, or an SCell of the SCG) that is in deactivated mode of operation; wherein the RRC message is to be transmitted to the first cell group.

In some embodiments, that RRC message is a measurement report message.

In some embodiments, that RRC message is an ULInformationTransferMRDC message (i.e., framework of MR-DC is reused).

12. Triggering conditions for the L1 reports to be transmitted:

In some embodiments, the triggering conditions for transmitting these L1 measurements are the same ones configured for L1 reporting via the second cell group when the second cell group was in normal mode of operation;

In some embodiments, the triggering conditions for transmitting these L1 measurements are scaled (by a factor of K) compared to the ones configured for L1 reporting via the second cell group when the second cell group was in normal mode of operation; For example, if periodic reporting with periodicity N (e.g., every 10 ms), the reporting would be with periodicity would be N times K.

In some embodiments, the triggering conditions for transmitting these L1 measurements have different settings and, in particular in the case of a higher layers reporting (e.g., L1 information reported over MAC CE and/or RRC) these periodicities are longer; in that alternatives, measurements may be filtered;

13. Usage of RRC message, MAC CE reporting via the first cell group, and/or L1 reporting over PUSCH/PUCCH of the second or first cell groups may be configurable.

14. L1 measurements on the second cell group, to be performed while the second cell group is deactivated, can be performed according to any of the following configurations:

Configurations according to CSI-MeasConfig IE (part of Serving Cell configuration and transmitted within an IE CellGroupConfig) associated with a cell of the second cell group; the configuration is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. That may possibly be enhanced with a cross-cell group reference e.g., an indication in a cell group reporting configuration that the uplink channel of another cell group is to be used for the reporting; some of the configurations for reporting while the second cell group is deactivated are the following:

nzp-CSI-RS-ResourceToAddModList is a list of NZP-CSI-RS-Resource;

Pool of NZP-CSI-RS-ResourceSet which can be referred to from CSI-ResourceConfig or from MAC CEs;

csi-SSB-ResourceSetToAddModList is a list of CSI-SSB-ResourceSet;

Pool of CSI-SSB-ResourceSet which can be referred to from CSI-ResourceConfig;

CSI-ResourceConfigToAddModList is a list of CSI-ResourceConfig;

Configured CSI resource settings as specified in 3GPP TS 38.214 section 5.2.1.2;

CSI-ReportConfigToAddModList is a list of CSI-ReportConfig;

Configured CSI report settings as specified in 3GPP TS 38.214 section 5.2.1.1.

Configurations according to CSI-ReportConfig (of CSI-MeasConfig) associated with a cell of the second cell group; the configuration is used. Suspending the configuration and/or stopping actions performed according to the configuration corresponds to stopping or suspending periodic or semi-persistent reporting on PUCCH on the cell in which the CSI-ReportConfig is included (e.g., SpCell of the second cell group or an SCell associated to the cell group). Suspending the configuration and/or stopping actions performed according to the configuration corresponds to stopping or suspending semi-persistent or aperiodic report sent on PUSCH triggered by DCI received on the cell in which the CSI-ReportConfig is included (in this case, the cell on which the report is sent is determined by the received DCI). In some variants, at least one configuration (i.e., field or IE) within CSI-ReportConfig could be suspended (i.e., measurements and reporting stops) when the second cell group enters deactivated mode of operation.

In various embodiments, there may be different alternatives concerning the serving cell(s) where reports are transmitted, i.e., cells for which UL channels are configured for the reception of the reports of measurements of the second cell group such as PScell CSI measurements. Two options are described below.

The SpCell of the second cell group; This is a case without cross-cell group reporting, i.e., the measurements on the PSCell are reported on UL channels of the PSCell and/or the measurements on an SCell of the SCG are reported on UL channels of the PSCell. As such, only UL channels of the SpCell would need to be configured while the SCG is in deactivated mode of operation;

The SpCell of the first cell group; This is a case with cross-cell group reporting, i.e., the measurements on the PSCell are reported on UL channels of the PCell (as described above) and/or the measurements on an SCell of the SCG are reported on UL channels of the PCell. As such, there is no need to transmit information on UL channels of any cell in the SCG while that is in deactivated mode of operation.

In embodiments involving cross-cell group reporting, there can be various inter-node communication between the MN and the SN, including any of the following:

SN indicates at least one configuration in CSI-MeasConfig for the serving cell that the UE needs to measure while the SCG is in deactivated mode of operation.

MN configures the UE to report measurements on a serving cell of the SCG including measurements on the PSCell and/or an SCell of the SCG.

MN receives UE reports (e.g., on PUCCH and/or PUSCH and/or MAC CEs and/or RRC of a serving cell of the MCG) including measurements on the PSCell and/or an SCell of the SCG. The MN forwards these measurements to the SN to inform the SN of the link situation for the cell(s) of the deactivated SCG. The SN can take various actions, described below in relation to various embodiments.

As summarized above, a UE can manage PDCCH TCI state indications received while the second cell group is deactivated in various ways according to various embodiments and options. These are described below in more detail.

In various embodiments, while performing and report L1 measurements while the second cell group is deactivated (e.g., according to any of the above-described embodiments), a UE can receive one or more MAC CEs for PDCCH TCI state indication. This can cause different UE and network behavior according to different embodiments and/or variants described below.

In some embodiments (referred to as "1a"), a UE can receive a MAC CE for PDCCH TCI state indication via the second cell group (e.g., PDCCH of SCG). These embodiments improves readiness since the UE is up to date concerning PDCCH TCI state, so that upon reception of an indication to resume the second cell group (i.e., to normal mode of operation), the UE knows the TCI state to use for monitoring PDCCH. In some variants, the UE only monitors PDCCH on the SpCell of the second cell group, to reduce PDCCH monitoring and associated energy consumption. In some variants, a light or reduced version of PDCCH can be configured only for the purpose of receiving these MAC CEs while the second cell group is deactivated.

Figure 18:
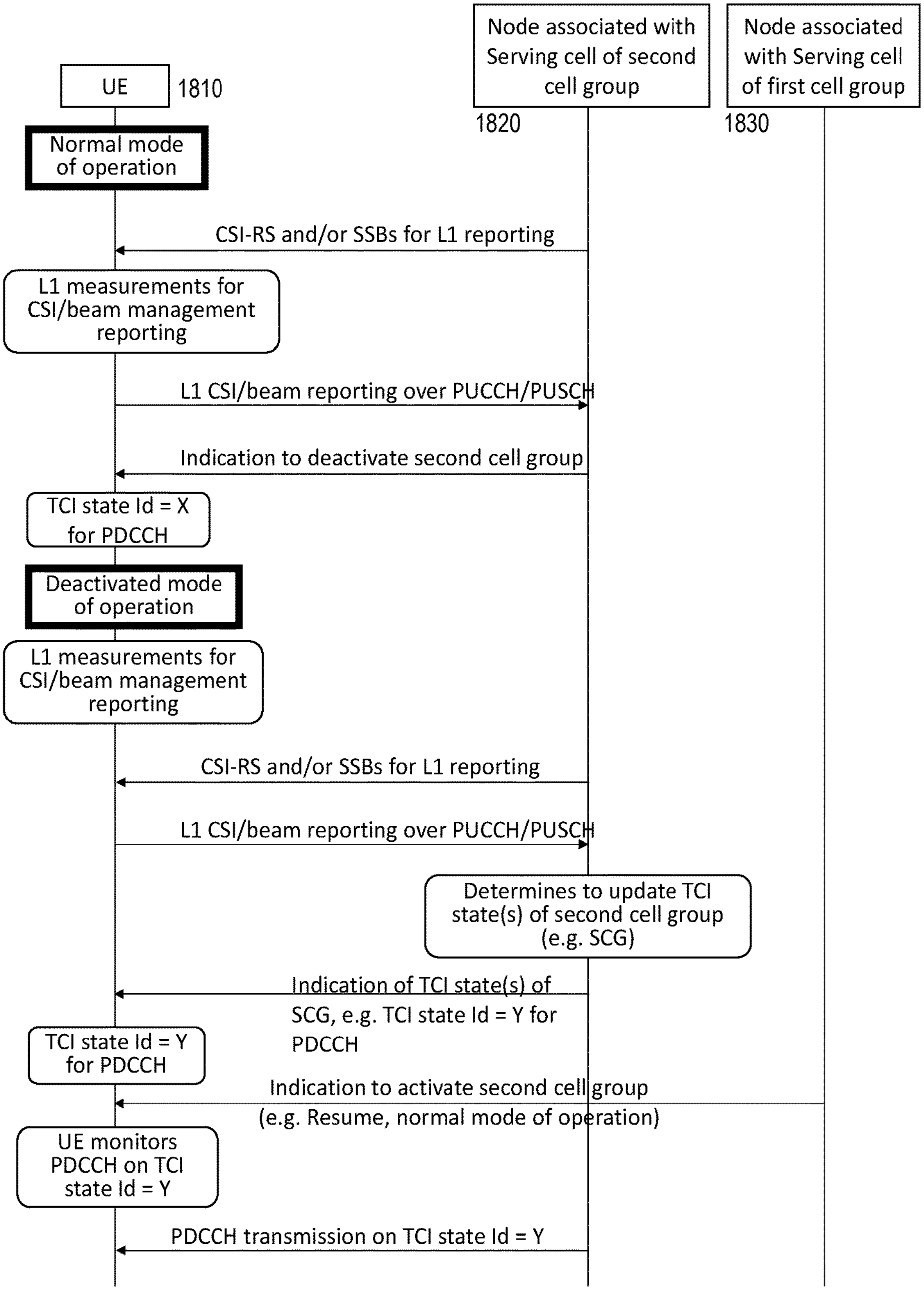
FIGS. 18-26 are signal flow diagrams between a UE and network nodes associated with the UE's MCG and SCG, according to various embodiments of the present disclosure.

FIG. 18 shows a signal flow diagram that illustrates certain 1a embodiments, particularly for the case without inter-cell group reporting (i.e., SCG measurements are reported on an SCG cell). The exemplary signaling shown in FIG. 18 is between the UE (1810), a node associated with the serving cell of the second cell group (e.g., SN 1820), and a node associated with the serving cell of the first cell group (e.g., MN 1830). As illustrated in FIG. 18, an advantage of these embodiments is limited involvement of the MN. Other advantages include no required changes to the control channel design and configurations associated with the first cell group.

Figure 19:
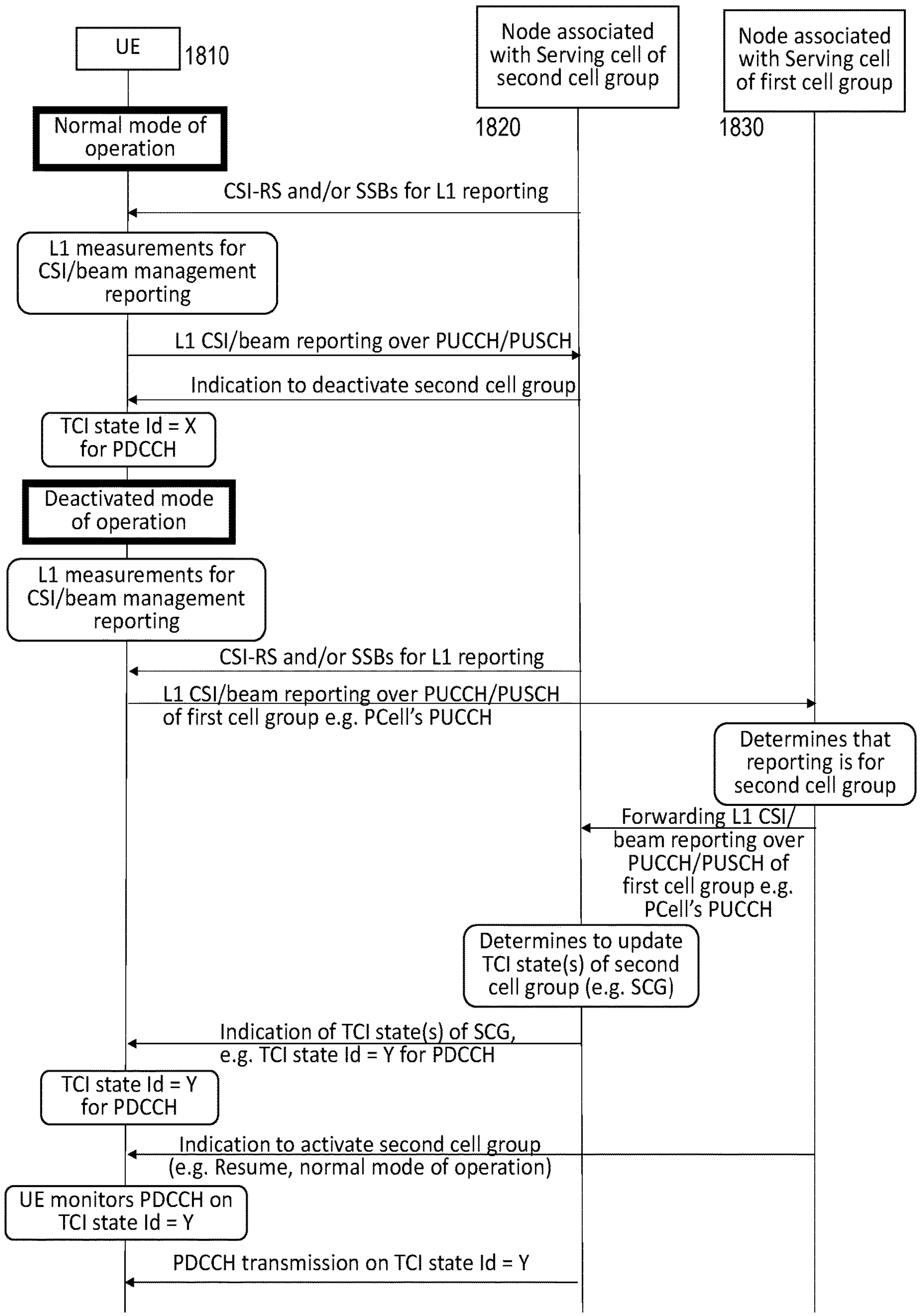

FIG. 19 shows a signal flow diagram that illustrates other 1a embodiments, particularly for the case with inter-cell group reporting (i.e., SCG measurements are reporting on an MCG cell). The exemplary signaling shown in FIG. 19 is between the UE (1810), the node associated with the serving cell of the second cell group (e.g., SN 1820), and a node associated with the serving cell of the first cell group (e.g., MN 1830). One difference from FIG. 18 is the forwarding of L1 CSI/beam reporting from the first cell group node (e.g., MN) to the second cell group node (e.g., SN), which determines the TCI state update for the SCG and provides the update to the UE. As illustrated in FIG. 19, one advantage is that the UE is not required to report on PUCCH of a deactivated cell group, at the expense of requiring inter-node communication for TCI state update.

In some embodiments (referred to as "1b"), a UE can receive a MAC CE for PDCCH TCI state indication via the first cell group (e.g., PDCCH of MCG). In these embodiments, the UE only monitors PDCCH for SpCell of the first cell group, at least for the purpose of receiving information concerning the second cell group, thereby reducing energy consumption. These embodiments also improves readiness since the UE is up to date concerning PDCCH TCI state, so that upon reception of an indication to resume the second cell group (i.e., to normal mode of operation), the UE knows the TCI state to use for monitoring PDCCH.

Since the UE is not required to monitor PDCCH of the second cell group that is deactivated, the UE consumes less energy than in 1a embodiments, albeit at the price of a need for inter-node communication for TCI state update to the node associated with the cell group for which the UE is monitoring PDCCH.

Figure 20:
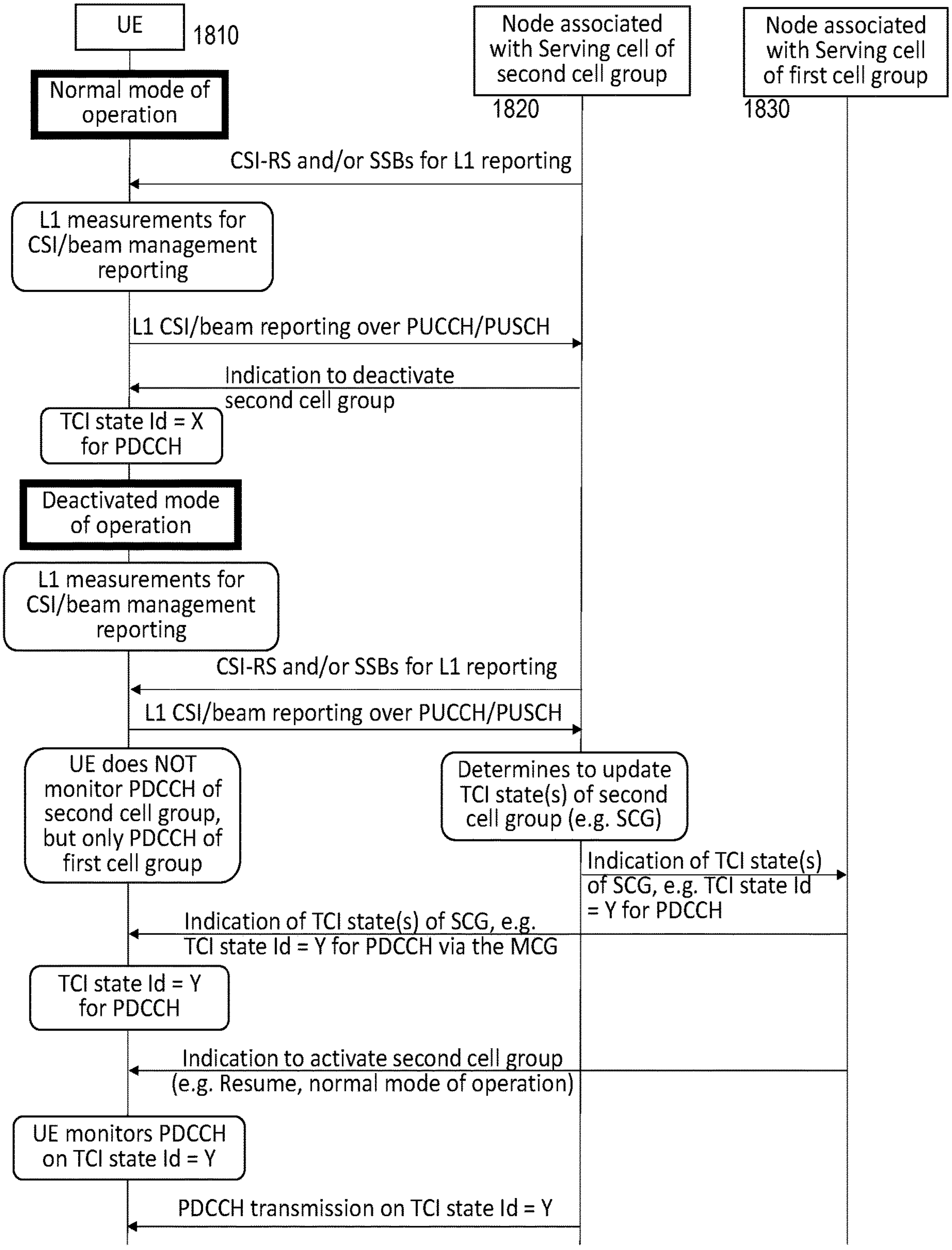

FIG. 20 shows a signal flow diagram that illustrates certain 1b embodiments, particularly for the case without inter-cell group reporting (i.e., SCG measurements are reported on an SCG cell). The exemplary signaling shown in FIG. 20 is between the UE (1810), a node associated with the serving cell of the second cell group (e.g., SN 1820), and a node associated with the serving cell of the first cell group (e.g., MN 1830). As illustrated in FIG. 20, PDCCH is monitored only on the first cell group. The node receiving the UE's L1 measurements determines a TCI state update and informs the node associated with the cell group for which the UE monitors PDCCH, so that TCI state can be updated.

Figure 21:
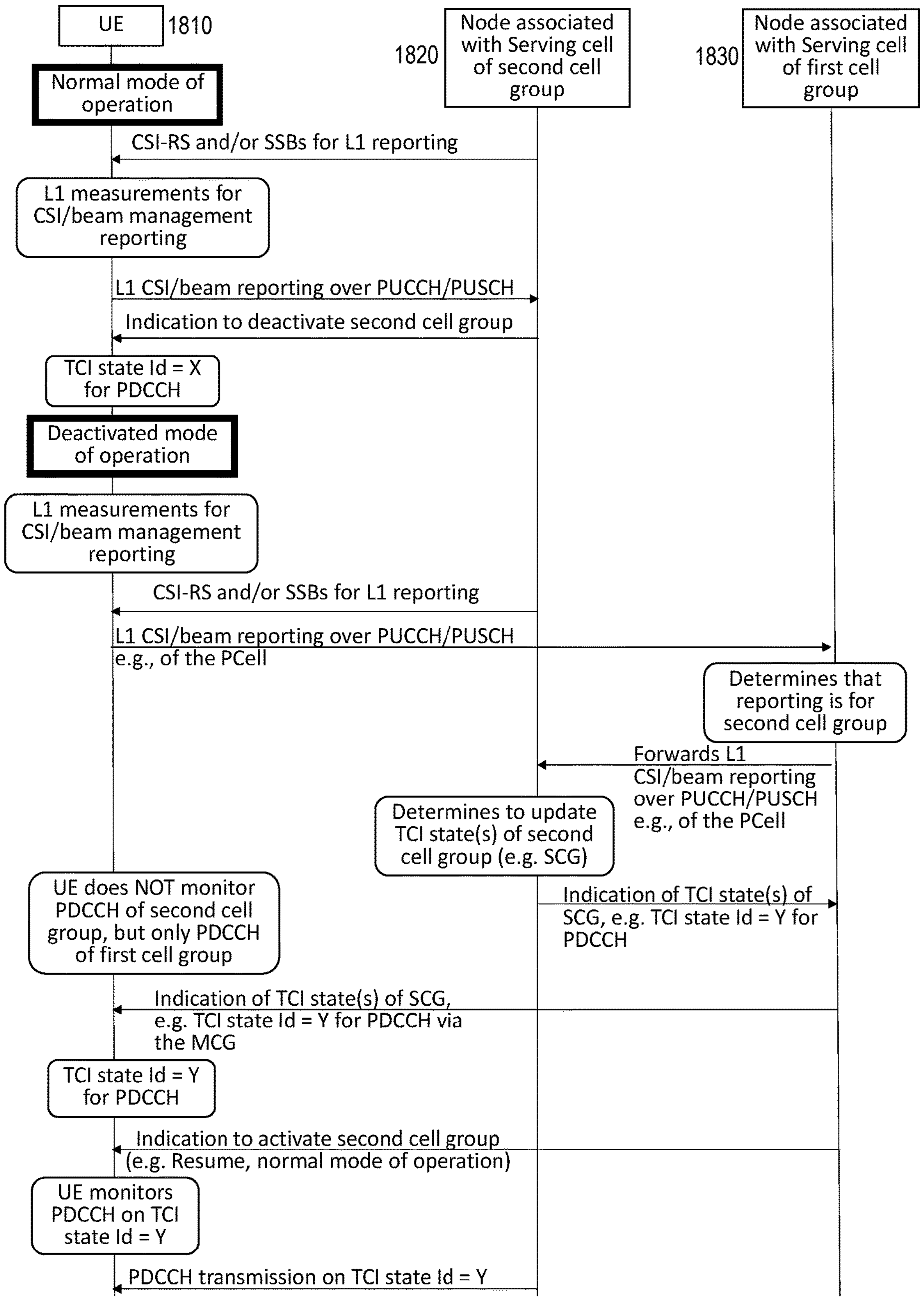

FIG. 21 shows a signal flow diagram that illustrates other 1b embodiments, particularly for the case with inter-cell group reporting (i.e., SCG measurements are reporting on an MCG cell). The exemplary signaling shown in FIG. 21 is between the UE (1810), a node associated with the serving cell of the second cell group (e.g., SN 1820), and a node associated with the serving cell of the first cell group (e.g., MN 1830). One difference from FIG. 20 is the forwarding of L1 CSI/beam reporting from the first cell group node (e.g., MN) to the second cell group node (e.g. SN), which determines the TCI state update for the SCG and provides the update to the first cell group node, which signals it to the UE.

Figure 22:
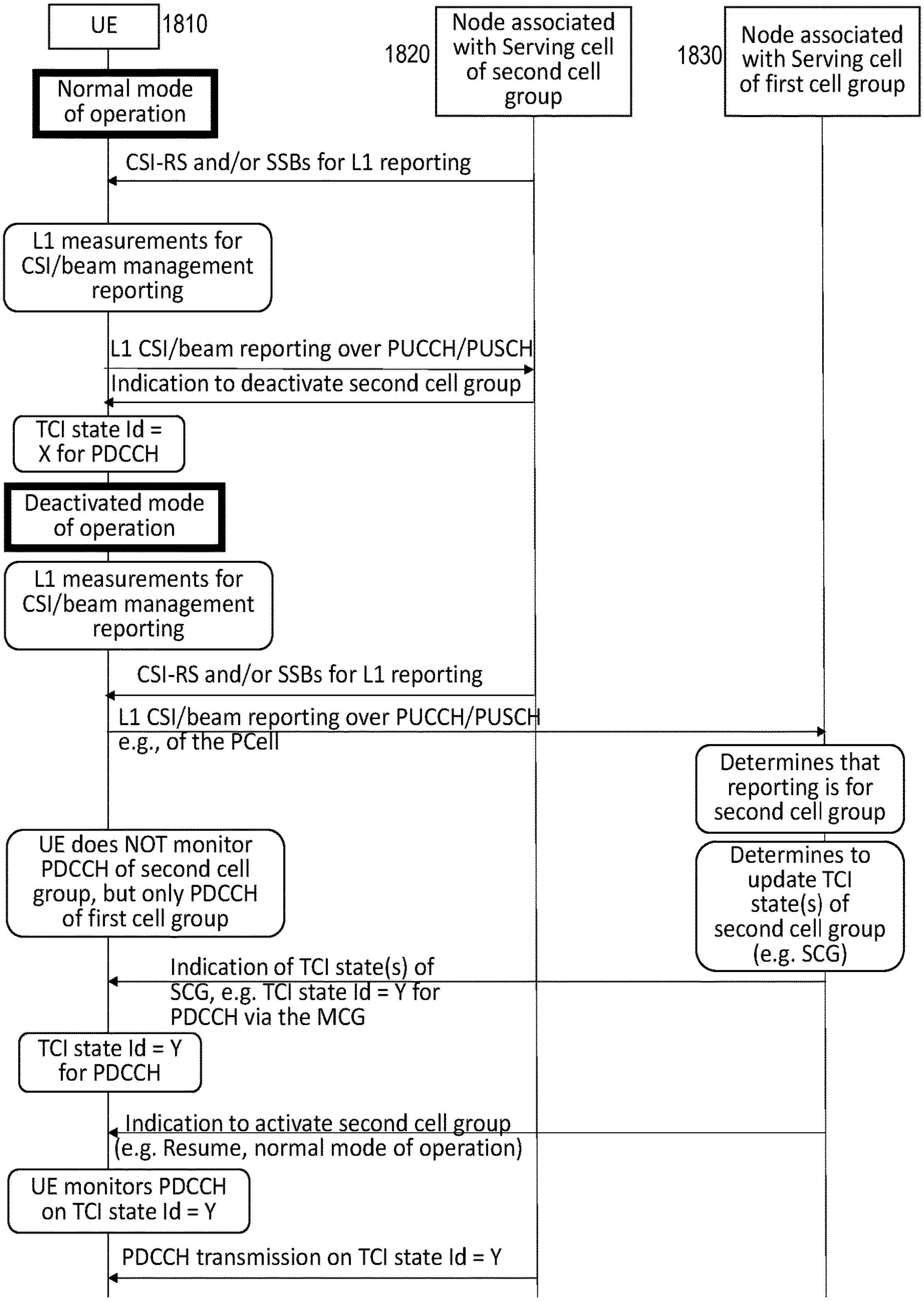

FIG. 22 shows a signal flow diagram that illustrates other 1b embodiments, particularly for another case with inter-cell group reporting (i.e., SCG measurements are reporting on an MCG cell). FIG. 22 uses the same reference numbers as in FIGS. 18-21. One difference from the exemplary signaling shown in FIG. 21 is that the node receiving the reports (e.g., MN) is also capable of determining a TCI state update for the second cell group. Since the UE monitors PDCCH only on the first cell group, that saves some inter-node signaling for communicating TCI state update information at the expense of the first cell group node having to interpret the L1 reports of the second cell group and make a decision concerning the TCI state. That information may need to be indicated to the second cell group node, since that node needs to transmit PDCCH accordingly when the second cell group is resumed/activated.

In the 1b embodiments, there can be different ways the TCI state update (e.g., TCI state indication) for the second cell group that is in deactivated state can be indicated to a UE. In some variants, when the UE receives the indication via the second cell group, this can be via MAC CE for PDCCH TCI state indication as in legacy. Since the UE is not expecting any data to be scheduled, the UE may only monitor information on the logical channel associated to that MAC CE. In some embodiments, when the UE receives the indication via the first cell group, this can be a new MAC CE for PDCCH TCI state indication for a second cell group, or an enhanced version of the existing MAC CE defined for the first cell group. In other embodiments, an RRC message that contains a field indicating the MAC CE can be used when the UE receives the indication via the first cell group.

In various embodiments, while performing and report L1 measurements while the second cell group is deactivated (e.g., according to any of the above-described embodiments), a UE does not receive any MAC CEs for PDCCH TCI state indication. This can cause different UE and network behavior according to different embodiments and/or variants described below.

In general, these embodiments may reduce UE energy consumption relative to 1a and 2*b* embodiments, since it improves readiness by only indicating the TCI state for PDCCH of the second cell group when it is really needed (e.g., when the second cell group is to be resumed from deactivated mode of operation).

On the other hand, the PDCCH TCI state information for the second cell group needs to be included in the indication to resume the second cell group to normal mode of operation. This may require some specification change in case MAC CE is used as indication. Alternately, two MAC CEs could need to be multiplexed: the PDCCH TCI state indication for the second cell group and the indication to resume the second cell group. However, the choice to update the UE only when it is time to resume could also be a network implementation choice.

Figure 23:
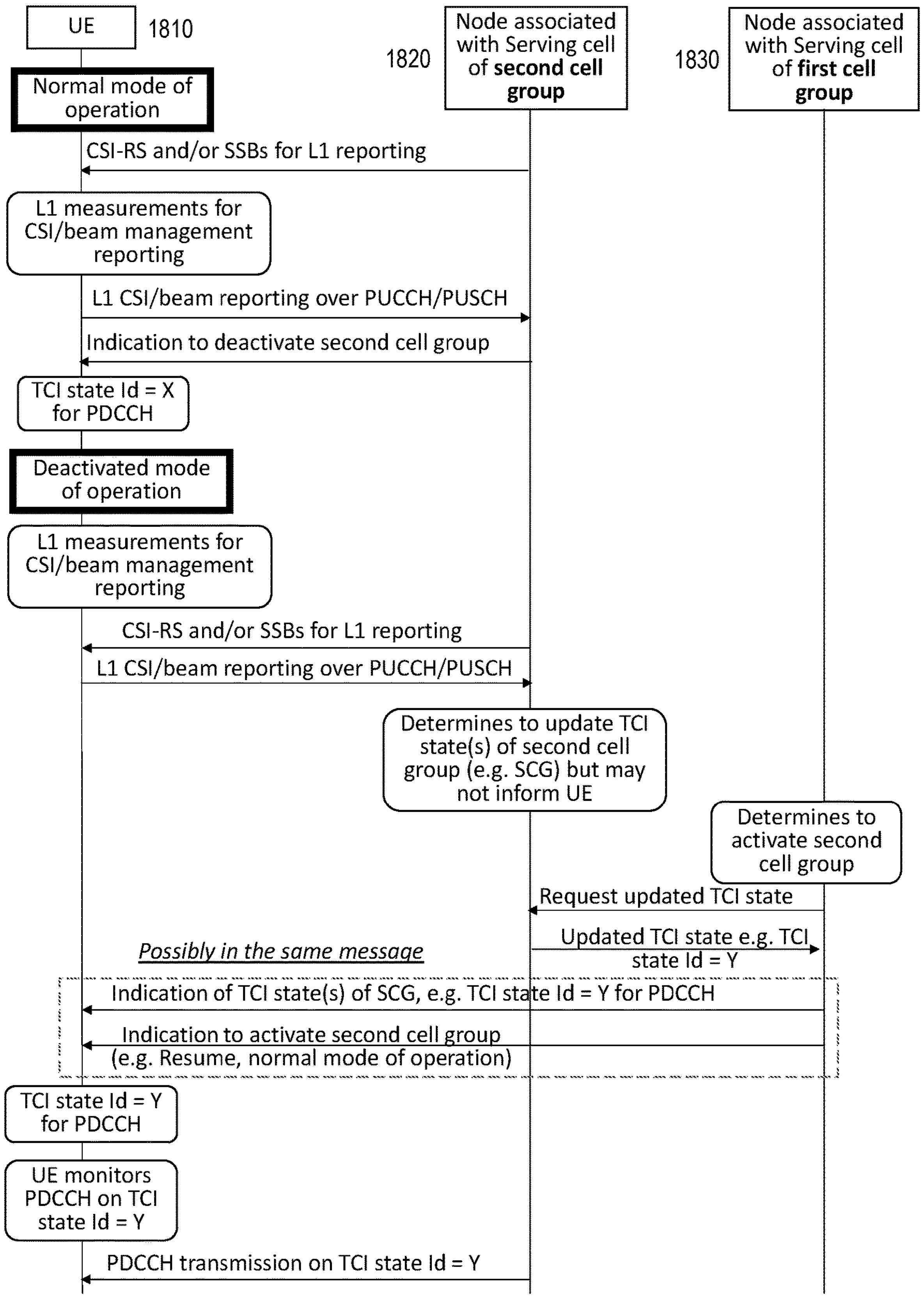
Figure 24:
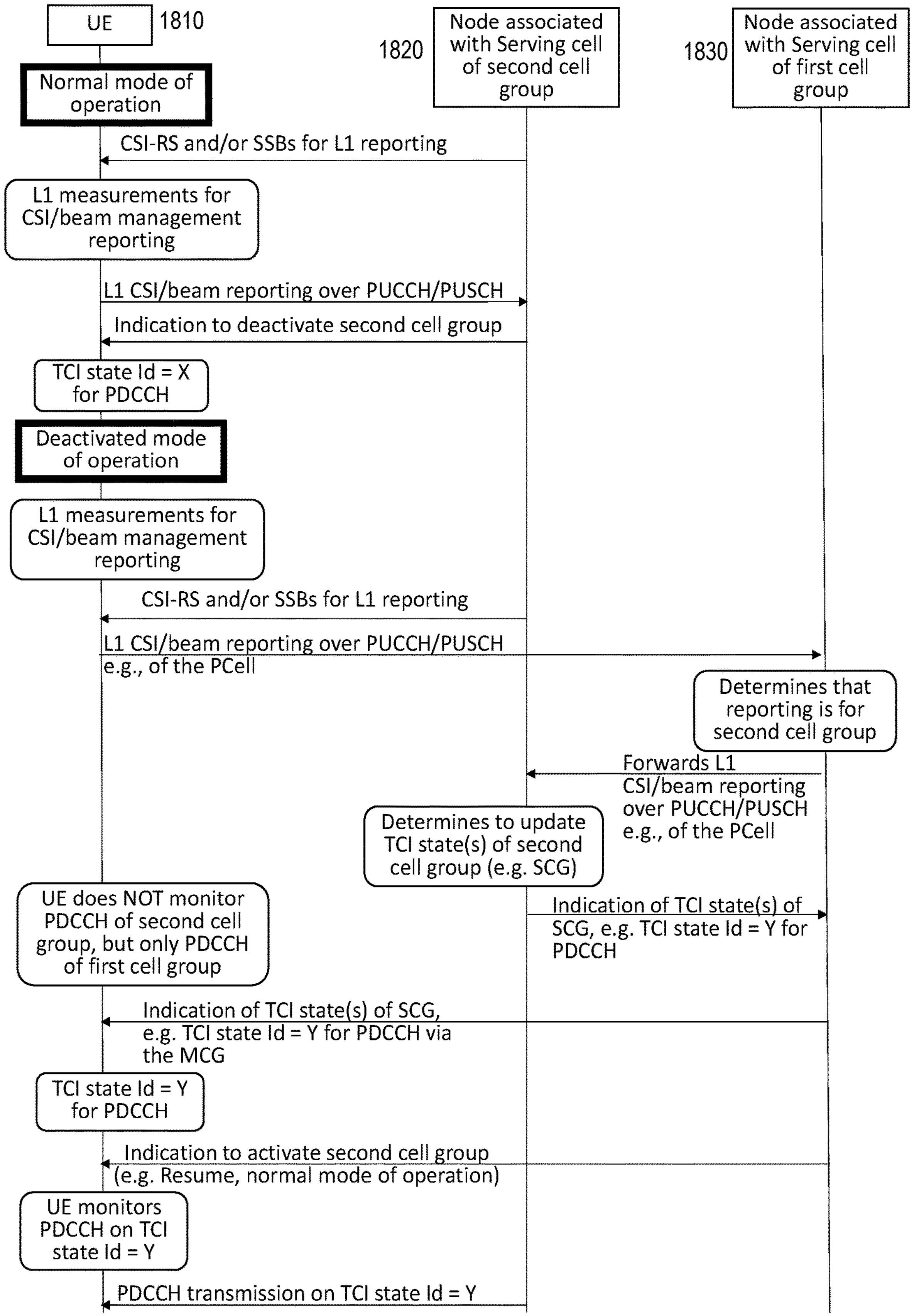

In any event, when resuming the deactivated second cell group, the UE receives with the resume indication/command a TCI state indication for the PDCCH of the second cell group according to these embodiments. FIGS. 23-24 show signal flow diagrams that illustrates certain of these embodiments, particularly for the case without inter-cell group reporting (i.e., SCG measurements are reported on an SCG cell). The exemplary signaling shown in FIGS. 23-24 is between the UE (1810), the node associated with the serving cell of the second cell group (e.g., SN 1820), and the node associated with the serving cell of the first cell group (e.g., MN 1830).

FIG. 23 shows the case of MN-initiated SCG resume without inter-cell group reporting. In these embodiments, before transmitting the resume command to the UE, the MN requests from the SN the latest PDCCH TCI state update for SCG. Upon reception, the MN can include that TCI state in the command to resume the SCG transmitted via the MCG, in the same message or multiplexed with the SCG resume command. In an alternative for this MN-initiated case, the SN can regularly update the latest PDCCH TCI state for the SCG, even without a request from the MN.

FIG. 24 shows the case of SN-initiated SCG resume without inter-cell group reporting. In these embodiments, the SN requests SCG resume by the MN and includes in the request the latest PDCCH TCI state update for SCG. Upon reception, the MN can include that TCI state in the command to resume the SCG transmitted via the MCG, in the same message or multiplexed with the SCG resume command.

Figure 25:
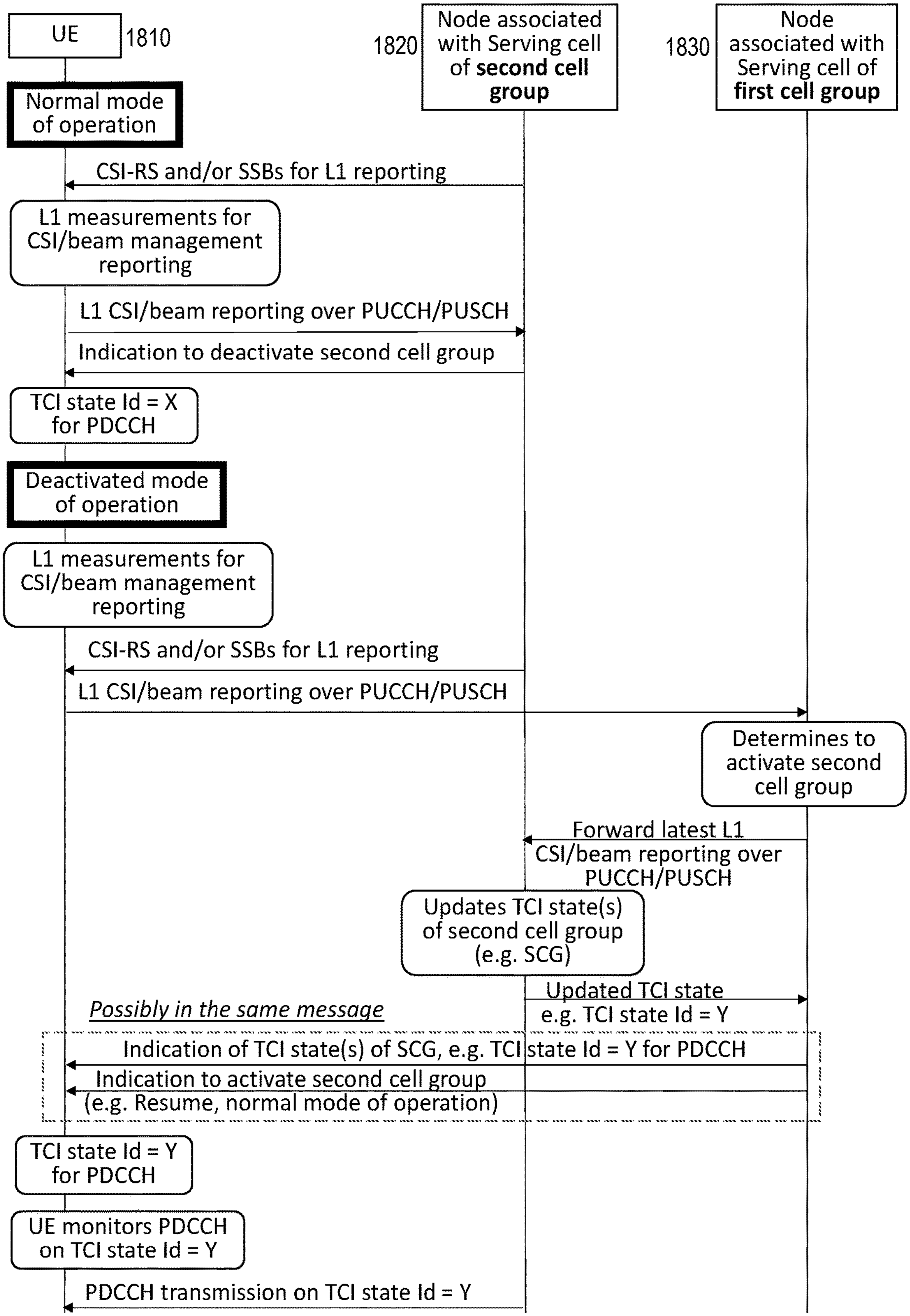
Figure 26:
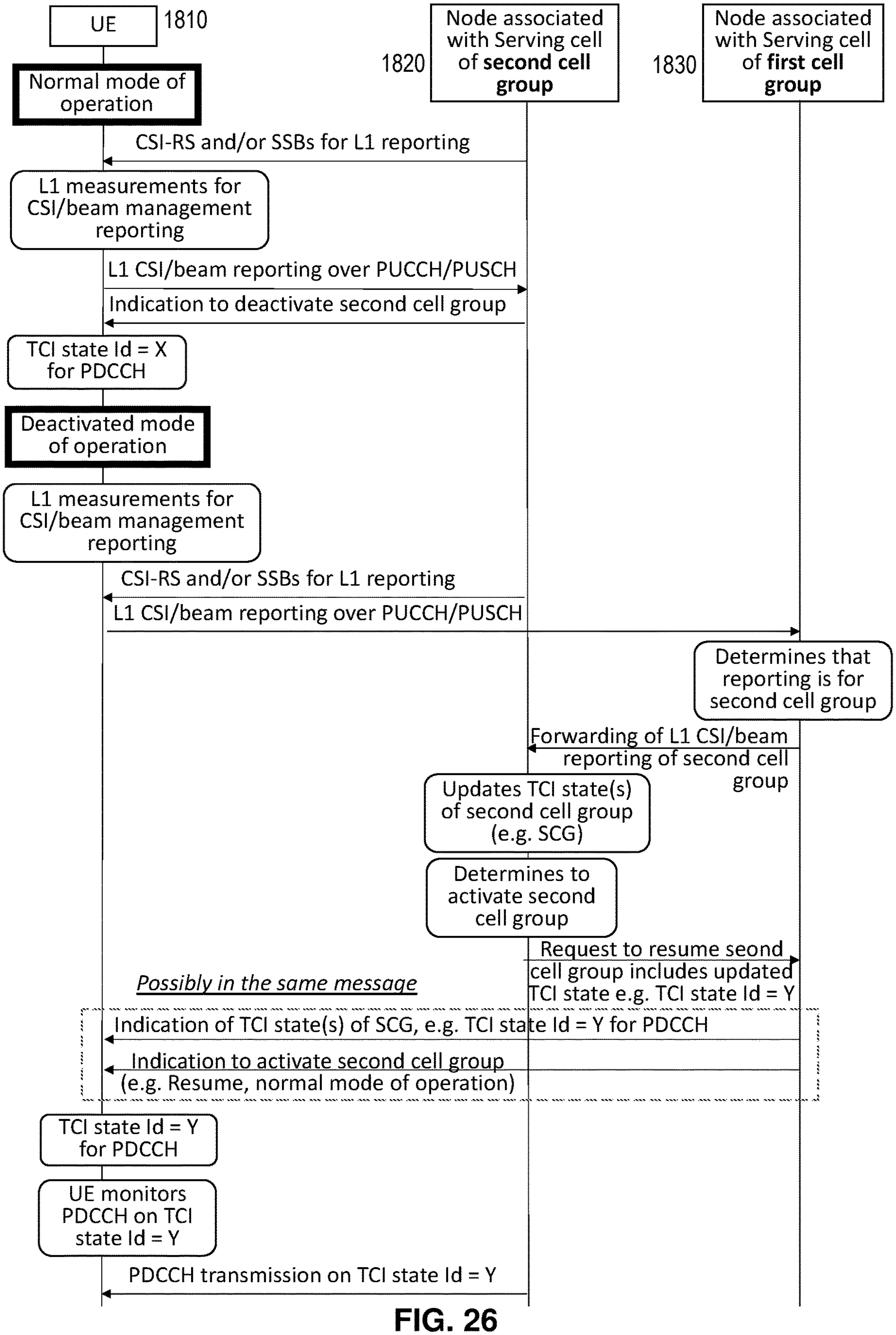

FIGS. 25-26 show signal flow diagrams that illustrate other of these embodiments, particularly for the case with inter-cell group reporting (i.e., SCG measurements are reporting on an MCG cell). The exemplary signaling shown in FIGS. 25-26 is between the UE (1810), the node associated with the serving cell of the second cell group (e.g., SN 1820), and the node associated with the serving cell of the first cell group (e.g., MN 1830).

FIG. 25 shows the case of MN-initiated SCG resume with inter-cell group reporting. In these embodiments, before transmitting the resume command to the UE, the MN forwards the latest L1 CSI/beam measurements that were reported by the UE, from which the SN determines a PDCCH TCI state update for SCG. Upon reception, the MN can include that TCI state in the command to resume the SCG transmitted via the MCG, in the same message or multiplexed with the SCG resume command. In an alternative for this MN-initiated case, the SN can regularly update the latest PDCCH TCI state for the SCG, even without a request from the MN.

FIG. 26 shows the case of SN-initiated SCG resume with inter-cell group reporting. In these embodiments, the SN requests SCG resume by the MN and includes in the request the latest PDCCH TCI state update for SCG. The SN can determine this based on UE L1 measurements for the second cell group forwarded by the MN. The MN can include the received PDCCH TCI state in the command to resume the SCG (transmitted via the MCG), either in the same message as the SCG resume command or multiplexed with it.

In another variant without PDCCH TCI state updates, the L1 measurements reported via SN or MN can be used to configure/re-configure contention free RACH resources. This can also speed up the SCG resume. In another variant, RRC measurement reports via the first cell group on cells/beams of the second cell group can also be used for that purpose.

In other embodiments, the UE may refrain from performing and/or reporting L1 measurements while the second cell group is deactivated and does not receive any MAC CEs for PDCCH TCI state indication while the second cell group is deactivated. In these embodiments, the UE can assume the latest TCI state indicated for the configured CORESET. Several variants are possible.

In some variants, the UE can store the latest indicated PDCCH TCI state for the second cell group when it transitions the second cell group to deactivated mode of operation. Upon reception of the command to resume the second cell group, the UE assumes the latest stored TCI state for PDCCH when it needs to monitor PDCCH on the SCG upon resumption.

In other variants, the UE may perform L1 measurements on the second cell group while it is deactivated based on the latest indicated TCI state (e.g., measurement on the Reference Signal associated to the indicated TCI state, like the QCL source) but they are not reported while the second cell group is deactivated. Upon reception of the command to resume the second cell group, the UE compares a measurement (e.g. RSRP of the PSCell) with a threshold (e.g. possibly configurable) and if the measurement value is higher than the threshold, the UE assumes the latest TCI state as valid and starts monitoring PDCCH according to this TCI state. Otherwise, if the measurement value is lower than the threshold, the UE assumes the latest TCI state is not valid and performs random access to the second cell group (e.g., to the PSCell).

Other embodiments involve various signaling by the MN and the SN upon resumption of the SCG. In some of these embodiments, the MN determines to resume the second cell group and requests the latest UE SCG measurements, performed but not reported while SCG is deactivated. Upon receiving a UE report with that information, the MN can either determine the SCG TCI state or inform the latest measurements to the SN to then obtain from it the latest SCG TCI state (e.g. for the PScell). Then, the MN transmits that to the UE with (or within) the command resuming the SCG.

In other of these embodiments, the SN determines to resume the second cell group and requests the latest UE SCG measurements from the MN (performed but not reported while SCG is deactivated). Upon receiving a UE report with that information, the MN can either determine the SCG TCI state to be updated or inform the latest measurements to the SN to then obtain from it the latest SCG TCI state (e.g. for the PScell). Then, MN transmits that to the UE with (or within) the command resuming the SCG;

Both of the above-described arrangements avoid a UE random access procedure but may involve at least one addition round trip time over the air interface during SCG resume.

Other embodiments involve UE-initiated resumption of the SCG. In these embodiments, the UE can assume a PDCCH TCI state based on at least one of the embodiments described above (e.g., reception of MAC CE with TCI state indication for the second cell group via the first cell group). Then, if UE-initiated resumption is triggered, the UE transmits on PUCCH assuming this latest TCI state.

Figure 27:
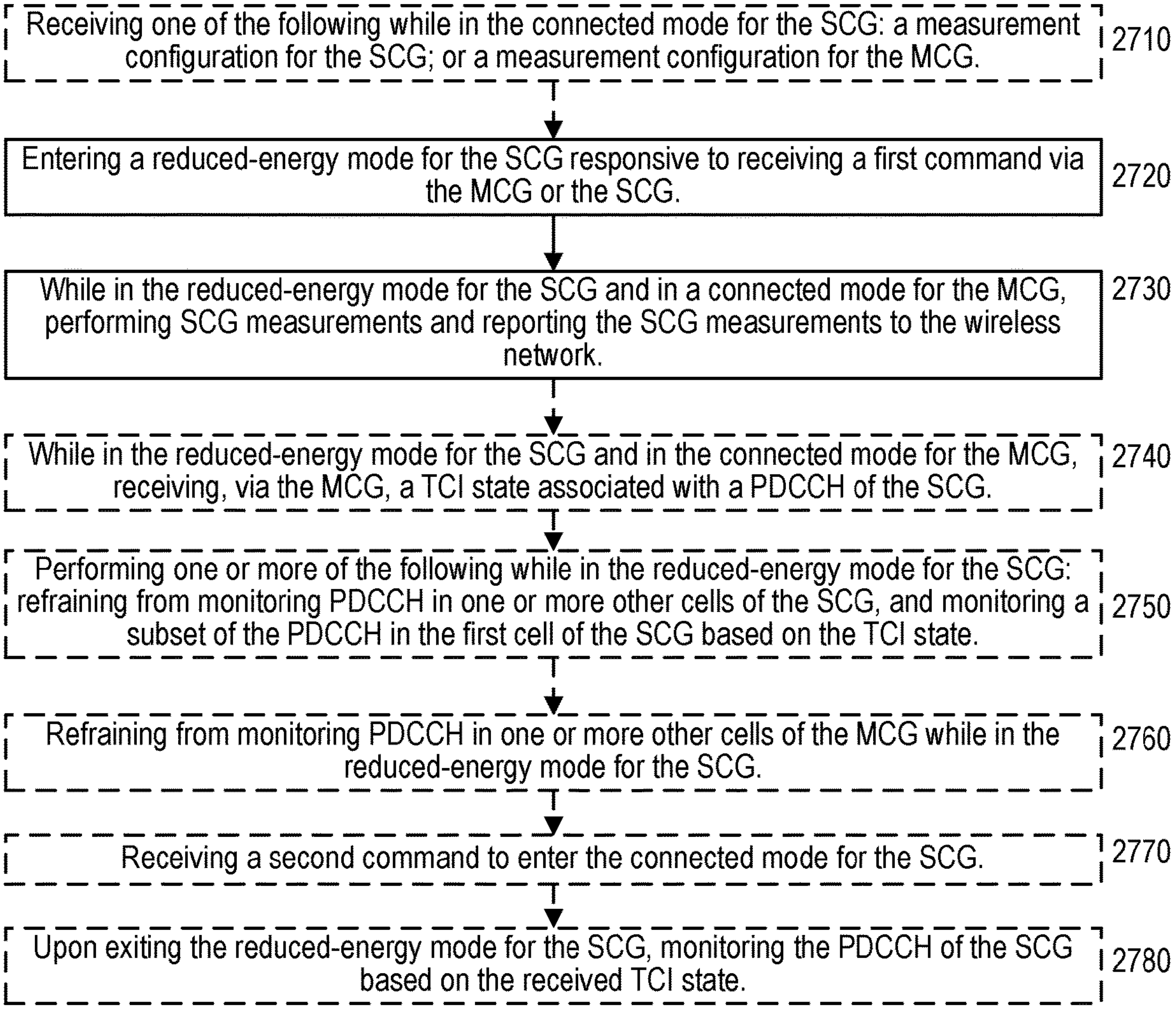
FIG. 27 is a flow diagram of an exemplary method (e.g., procedure) for a UE (e.g., wireless device, IoT device, etc. or component(s) thereof), according to various embodiments of the present disclosure.
Figure 28:
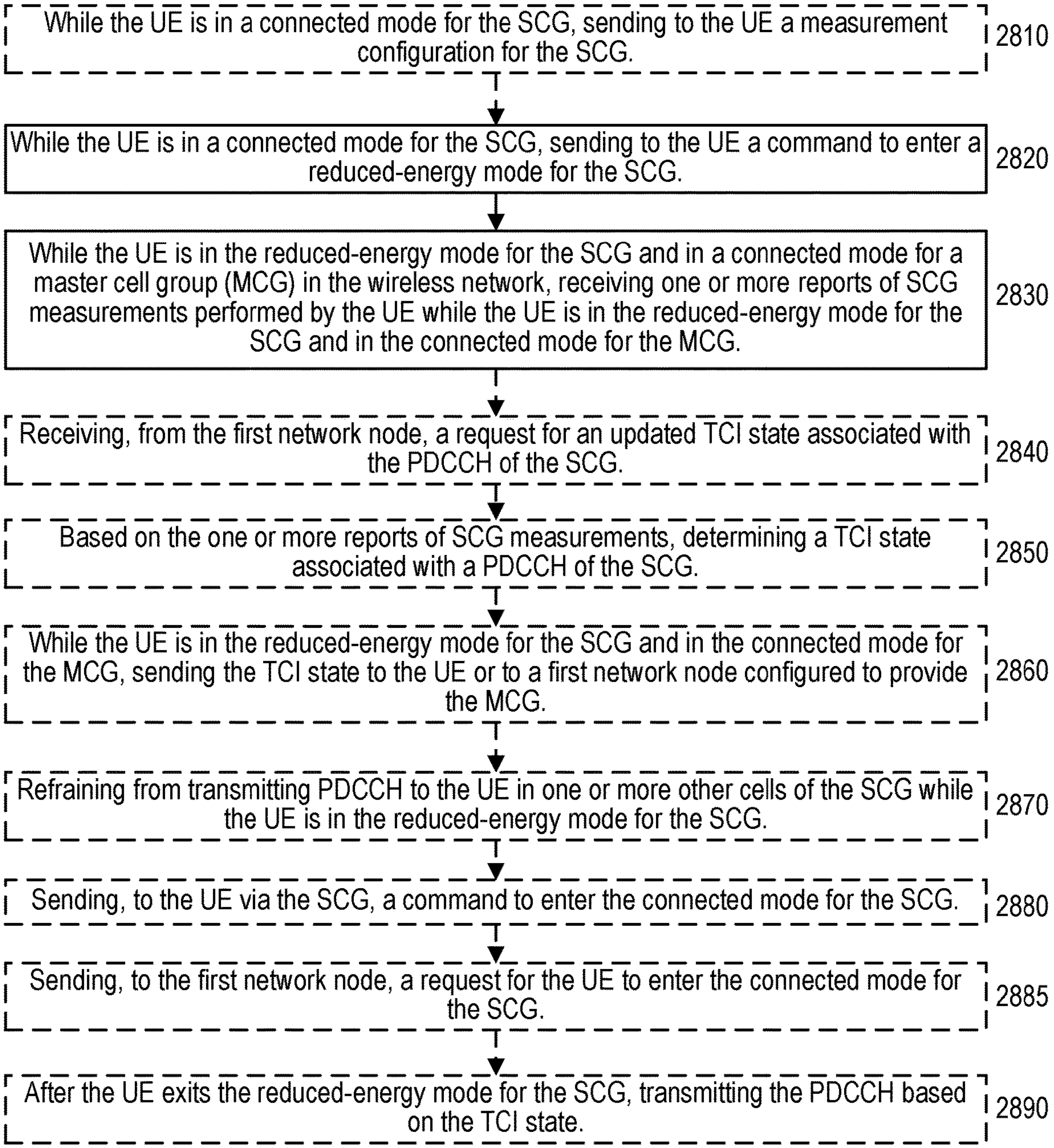
FIG. 28 is a flow diagram of an exemplary method (e.g., procedure) for a second network node (e.g., base station, eNB, gNB, ng-eNB, en-gNB, etc.) in a wireless network (e.g., E-UTRAN, NG-RAN), according to various embodiments of the present disclosure.
Figure 29:
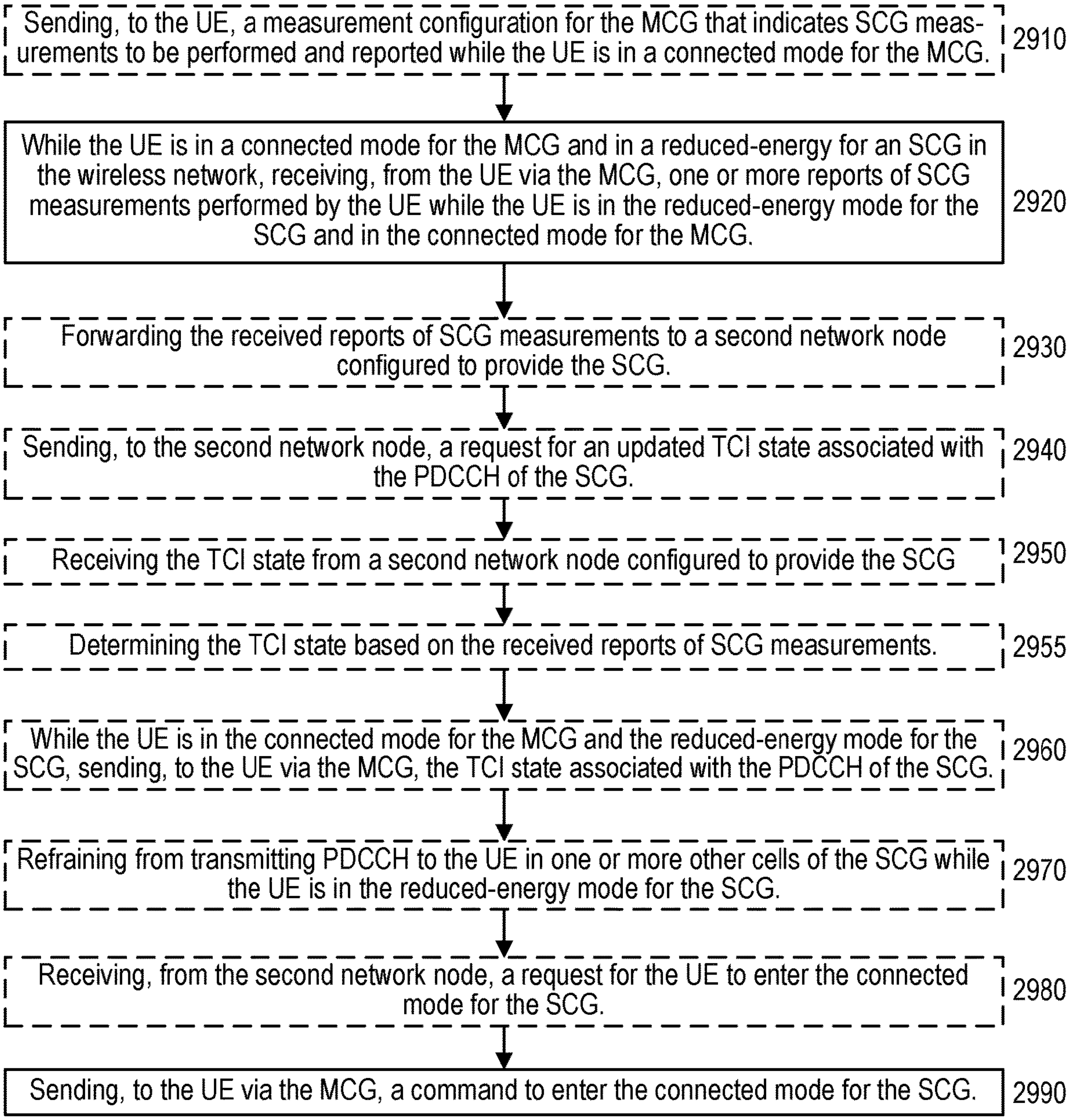
FIG. 29 is a flow diagram of an exemplary method (e.g., procedure) for a first network node (e.g., base station, eNB, gNB, ng-eNB, en-gNB, etc.) in a wireless network (e.g., E-UTRAN, NG-RAN), according to various embodiments of the present disclosure.

The embodiments described above can be further illustrated with reference to FIGS. 27-29, which show exemplary methods (e.g., procedures) performed by a UE, a second network node, and a first network node, respectively. In other words, various features of operations described below correspond to various embodiments described above. These exemplary methods can be used cooperatively to provide various exemplary benefits and/or advantages. Although FIGS. 27-29 show specific blocks in a particular order, the operations of the respective methods can be performed in different orders than shown and can be combined and/or divided into blocks having different functionality than shown. Optional blocks or operations are indicated by dashed lines.

In particular, FIG. 27 shows a flow diagram of an exemplary method (e.g., procedure) for a UE configured to communicate with a wireless network via an MCG and an SCG, according to various embodiments of the present disclosure. The exemplary method can be performed by a UE (e.g., wireless device, IoT device, modem, etc. or component thereof) such as described elsewhere herein.

The exemplary method can include operations of block 2720, where the UE can enter a reduced-energy mode for the SCG responsive to receiving a first command via the MCG or the SCG. The exemplary method can also include operations of block 2730, where the UE can, while in the reduced-energy mode for the SCG and in a connected mode for the MCG, perform SCG measurements and report the SCG measurements to the wireless network.

In some embodiments, the SCG measurements are reported to the wireless network via one of the following: a PUSCH of the MCG, a PUSCH of the SCG, a PUCCH of the MCG, or a PUCCH of the SCG. In some embodiments, the SCG measurements are reported in one of the following: a MAC CE sent via the MCG, an RRC message sent via the MCG, layer-1 UL control information (UCI) sent via the MCG, or layer-1 UCI sent via the SCG.

In some embodiments, the SCG includes a PSCell and one or more SCells, and the SCG measurements are reported (e.g., in block 2730) via the PSCell. Additionally, the one or more SCells have no uplinks configured while the UE is in the reduced-energy mode for the SCG.

In some embodiments, reporting the SCG measurements while in the reduced-energy mode for the SCG (e.g., in block 2730) is responsive to one of the following:

- one or more conditions that are also applicable to reporting of SCG measurements while in the connected mode for the SCG; or
- a reporting period that is greater than a reporting period for SCG measurements while in the connected mode for the SCG.

In some embodiments, the exemplary method can also include the operations of blocks 2740 and 2780. In block 2740, the UE can, while in the reduced-energy mode for the SCG and in the connected mode for the MCG, receive via the MCG a TCI state associated with a PDCCH of the SCG. In block 2780, the UE can, upon exiting the reduced-energy mode for the SCG, monitor the PDCCH of the SCG based on the received TCI state.

In some of these embodiments, the received TCI state is different than a most recent TCI state associated with the PDCCH of the SCG, the most recent TCI state being received before entering the reduced-energy mode for the SCG. In some of these embodiments, the exemplary method can also include the operations of block 2770, where the UE can receive a second command to enter the connected mode for the SCG. In such case, exiting the reduced-energy mode for the SCG is responsive to the second command.

Different variants of these embodiments correspond to different arrangements shown in FIGS. 18-26, discussed above. In some variants, the TCI state is received via the MCG and the second command is received via the SCG. In other variants, the TCI state and the second command are received concurrently via the MCG. Furthermore, in different variants, the second command is received and the SCG measurements are reported via a same one or via different ones of the MCG and the SCG. Additionally, in these different variants, the TCI state is received and the SCG measurements are reported via a same one or via different ones of the MCG and the SCG.

In some embodiments, the TCI state is received (e.g., in block 2740) as a MAC CE via a PDCCH in a first cell of the SCG (e.g., PSCell). The exemplary method can also include the operations of block 2750, where the UE can perform one or more of the following while in the reduced-energy mode for the SCG: refraining from monitoring PDCCH in one or more other cells (e.g., SCells) of the SCG, and monitoring a subset of the PDCCH in the first cell of the SCG based on the TCI state.

In other embodiments, the TCI state is received (e.g., in block 2740) as a MAC CE via a PDCCH in a first cell of the MCG (e.g., PCell). The exemplary method can also include the operations of block 2760, where the UE can refrain from monitoring PDCCH in one or more other cells (e.g., SCells) of the MCG while in the reduced-energy mode for the SCG.

In some embodiments, the exemplary method can also include the operations of block 2710, where the UE can receive one of the following while in the connected mode for the SCG:

- a measurement configuration for the SCG, which indicates the SCG measurements to be performed and reported while in the reduced-energy mode for the SCG, or
- a measurement configuration for the MCG, which indicates SCG measurements to be performed and reported while in the connected mode for the MCG.

In such embodiments, performing and reporting SCG measurements while in the reduced-energy mode for the SCG (e.g., in block 2730) can be based on the received measurement configuration.

In addition, FIG. 28 shows a flow diagram of an exemplary method (e.g., procedure) for a second network node configured to provide an SCG for a UE in a wireless network, according to various embodiments of the present disclosure. The exemplary method can be performed by a network node (e.g., base station, eNB, gNB, ng-eNB, en-gNB, etc., or components thereof) such as described elsewhere herein.

The exemplary method can include the operations of block 2820, where the second network node can, while the UE is in a connected mode for the SCG, send to the UE a command to enter a reduced-energy mode for the SCG. The exemplary method can include the operations of block 2830, where the second network node can, while the UE is in the reduced-energy mode for the SCG and in a connected mode for an MCG in the wireless network, receive one or more reports of SCG measurements performed by the UE while the UE is in the reduced-energy mode for the SCG and in the connected mode for the MCG.

In some embodiments, the reports of SCG measurements are received from the first network node. In other embodiments, the reports of SCG measurements are received from the UE via a PUSCH of the SCG or via a PUCCH of the SCG. In some variants, the reports of SCG measurements are received from the UE in layer-1 UCI via the SCG.

In some embodiments, the SCG includes a PSCell and one or more SCells, and the SCG measurements are received from the UE (e.g., in block 2830) via the PSCell. Additionally, the one or more SCells have no uplinks configured while the UE is in the reduced-energy mode for the SCG.

In some embodiments, the reports of SCG measurements are received (e.g., in block 2830) responsive to one of the following:

- one or more conditions that are also applicable to reporting of SCG measurements while the UE is in the connected mode for the SCG; or
- a reporting period that is greater than a reporting period for SCG measurements while the UE is in the connected mode for the SCG.

In some embodiments, the exemplary method can also include the operations of block 2880, where the second network node can send, to the UE via the SCG, a command to enter the connected mode for the SCG. In other embodiments, the exemplary method can also include the operations of block 2885, where the second network node can send, to the first network node, a request for the UE to enter the connected mode for the SCG. These operations can cause (directly or indirectly) the UE to exit the reduced-energy mode and enter the connected mode for the SCG.

In some embodiments, the exemplary method can also include the operations of blocks 2850-2860 and 2890. In block 2850, the second network node can, based on the one or more reports of SCG measurements (e.g., received in block 2830), determine a TCI state associated with a PDCCH of the SCG. In block 2860, the second network node can, while the UE is in the reduced-energy mode for the SCG and in the connected mode for the MCG, send the TCI state to the UE or to a first network node configured to provide the MCG. In block 2890, the second network node can, after the UE exits the reduced-energy mode for the SCG, transmit the PDCCH based on the TCI state.

In some of these embodiments, the TCI state is different than a most recent TCI state associated with the PDCCH of the SCG. The most recent TCI state was sent to the UE before the UE entered the reduced-energy mode for the SCG. In some of these embodiments, the exemplary method can include the operations of block 2840, where the second network node can receive, from the first network node, a request for an updated TCI state associated with the PDCCH of the SCG. The TCI state is sent to the first network node (e.g., in block 2860) in response to the request. In some cases, determining the TCI state (e.g., in block 2850) can also be responsive to the request.

In some of these embodiments, the TCI state is sent to the UE as a MAC CE via a PDCCH in a first cell (e.g., PSCell) of the SCG. In some variants, the TCI state is sent in a subset of the PDCCH in the first cell of the SCG. In other variants, the exemplary method can also include the operations of block 2870, where the second network node can refrain from transmitting PDCCH to the UE in one or more other cells (e.g., SCells) of the SCG while the UE is in the reduced-energy mode for the SCG.

In some embodiments, the exemplary method can also include the operations of block 2810, where the second network node can send, to the UE while the UE is in the connected mode for the SCG, a measurement configuration for the SCG that indicates SCG measurements to be performed and reported while in the reduced-energy mode for the SCG. The reported SCG measurements can be based on the measurement configuration.

In addition, FIG. 29 shows a flow diagram of an exemplary method (e.g., procedure) for a first network node arranged to provide an MCG for a UE in a wireless network, according to various embodiments of the present disclosure. The exemplary method can be performed by a network node (e.g., base station, eNB, gNB, ng-eNB, en-gNB, etc., or components thereof) such as described elsewhere herein.

The exemplary method can include the operations of block 2920, where the first network node can, while the UE is in a connected mode for the MCG and in a reduced-energy for an SCG in the wireless network, receive from the UE via the MCG one or more reports of SCG measurements performed by the UE while the UE is in the reduced-energy mode for the SCG and in the connected mode for the MCG. The exemplary method can also include the operations of block 2990, where the second node can send, to the UE via the MCG, a command to enter the connected mode for the SCG.

In some embodiments, the reports of SCG measurements are received from the UE via one a PUSCH or a PUCCH (i.e., of the MCG). In some embodiments, each report of SCG measurements is received from the UE in one of the following: a MAC CE, an RRC message, or layer-1 UCI. In some embodiments, the exemplary method can also include the operations of block 2930, where the first network node can forward the received reports of SCG measurements to a second network node configured to provide the SCG.

In some embodiments, the exemplary method can also include the operations of block 2960, where the first network node can, while the UE is in the reduced-energy mode for the SCG and in the connected mode for the MCG, send to the UE via the MCG a TCI state associated with a PDCCH of the SCG. The first network node can obtain this TCI state in various ways. These can include receiving the TCI state from a second network node configured to provide the SCG (block 2950). In some cases, the exemplary method can also include the operations of block 2940, where the first network node can send, to the second network node, a request for an updated TCI state associated with the PDCCH of the SCG. The TCI state can be received (e.g., in block 2950) in response to the request. In other variants, the exemplary method can also include the operations of block 2955, where the first network node can determine the TCI state based on the received reports of SCG measurements (e.g., in block 2920).

In some embodiments, the TCI state is sent as a MAC CE via a PDCCH in a first cell (e.g., PCell) of the MCG, and the exemplary method also includes the operations of block 2970, where the first network node can refrain from transmitting PDCCH to the UE in one or more other cells (e.g., SCells) of the MCG while the UE is in the reduced-energy mode for the SCG.

In some embodiments, the exemplary method can also include the operations of block 2970, where the first network node can receive, from a second network node configured to provide the SCG, a request for the UE to enter the connected mode for the SCG. The command can be sent (e.g., in block 2990) in response to the request.

In some embodiments, the exemplary method can also include the operations of block 2910, where the first network node can send, to the UE, a measurement configuration for the MCG that indicates SCG measurements to be performed and reported while the UE is in the connected mode for the MCG. The received reports of SCG measurements (e.g., in block 2920) can be based on the measurement configuration.

Figure 30:
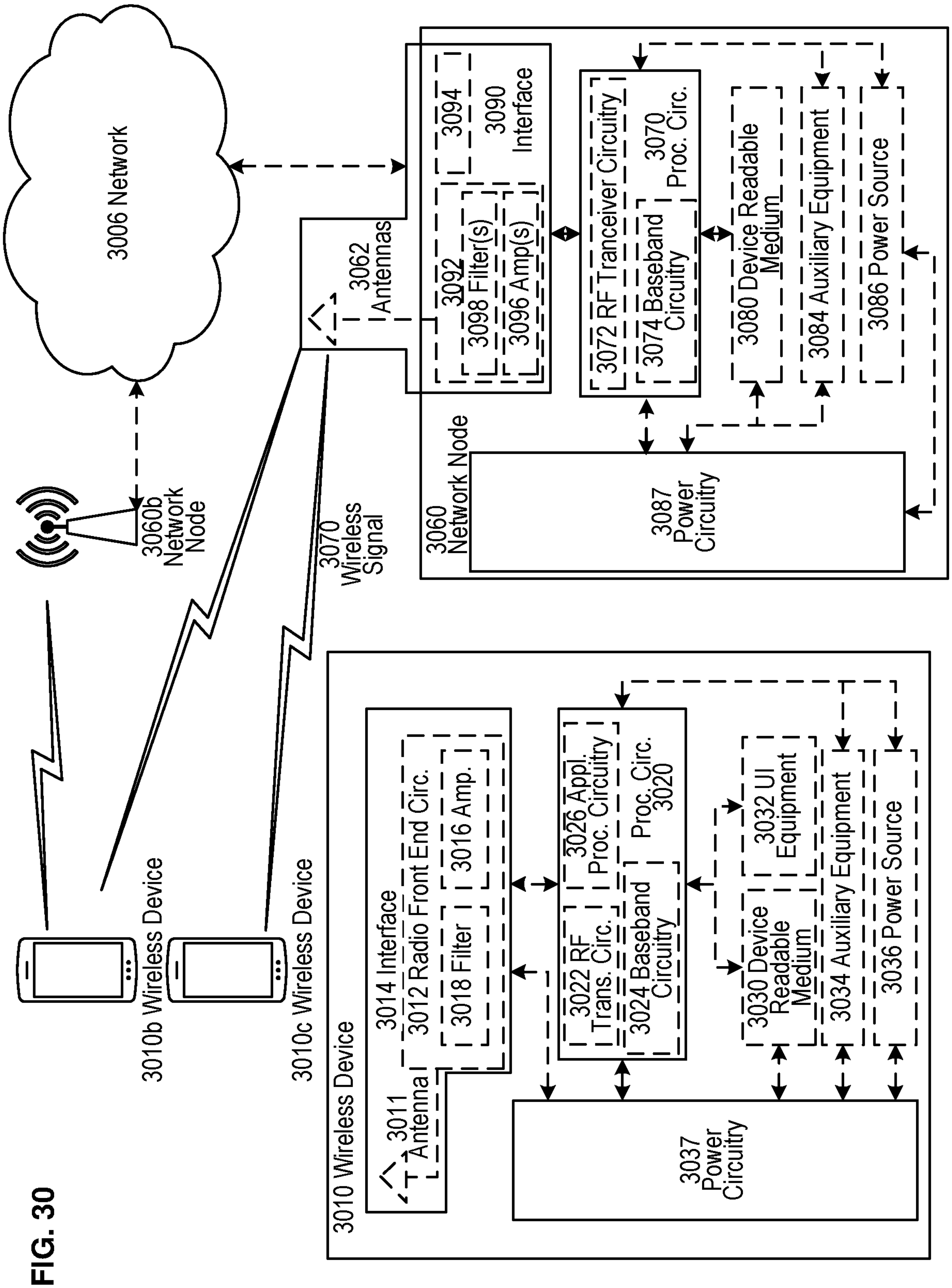
FIG. 30 illustrates an embodiment of a wireless network.

Although the subject matter described herein can be implemented in any appropriate type of system using any suitable components, the embodiments disclosed herein are described in relation to a wireless network, such as the example wireless network illustrated in FIG. 30. For simplicity, the wireless network of FIG. 30 only depicts network 3006, network nodes 3060 and 3060*b*, and WDs 3010, 3010*b*, and 3010*c*. In practice, a wireless network can further include any additional elements suitable to support communication between wireless devices or between a wireless device and another communication device, such as a landline telephone, a service provider, or any other network node or end device. Of the illustrated components, network node 3060 and wireless device (WD) 3010 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 3006 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 3060 and WD 3010 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 30, network node 3060 includes processing circuitry 3070, device readable medium 3080, interface 3090, auxiliary equipment 3084, power source 3086, power circuitry 3087, and antenna 3062. Although network node 3060 illustrated in the example wireless network of FIG. 30 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 3060 are depicted as single boxes located within a larger box, or nested within multiple boxes, in practice, a network node can comprise multiple different physical components that make up a single illustrated component (e.g., device readable medium 3080 can comprise multiple separate hard drives as well as multiple RAM modules).

Similarly, network node 3060 can be composed of multiple physically separate components (e.g., NodeB component and RNC component, or BTS component and BSC component, etc.), which can each have their own respective components. In certain scenarios in which network node 3060 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 3060 can be configured to support multiple radio access technologies (RATs). In such embodiments, some components can be duplicated (e.g., separate device readable medium 3080 for the different RATs) and some components can be reused (e.g., the same antenna 3062 can be shared by the RATs). Network node 3060 can also include multiple sets of the various illustrated components for different wireless technologies integrated into network node 3060, such as, for example, GSM, WCDMA, LTE, NR, WiFi, or Bluetooth wireless technologies. These wireless technologies can be integrated into the same or different chip or set of chips and other components within network node 3060.

Processing circuitry 3070 can be configured to perform any determining, calculating, or similar operations (e.g., certain obtaining operations) described herein as being provided by a network node. These operations performed by processing circuitry 3070 can include processing information obtained by processing circuitry 3070 by, for example, converting the obtained information into other information, comparing the obtained information or converted information to information stored in the network node, and/or performing one or more operations based on the obtained information or converted information, and as a result of said processing making a determination.

Processing circuitry 3070 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 3060, either alone or in conjunction with other network node 3060 components (e.g., device readable medium 3080). Such functionality can include any of the various wireless features, functions, or benefits discussed herein.

For example, processing circuitry 3070 can execute instructions stored in device readable medium 3080 or in memory within processing circuitry 3070. In some embodiments, processing circuitry 3070 can include a system on a chip (SOC). As a more specific example, instructions (also referred to as a computer program product) stored in medium 3080 can include instructions that, when executed by processing circuitry 3070, can configure network node 3060 to perform operations corresponding to various exemplary methods (e.g., procedures) described herein.

In some embodiments, processing circuitry 3070 can include one or more of radio frequency (RF) transceiver circuitry 3072 and baseband processing circuitry 3074. In some embodiments, radio frequency (RF) transceiver circuitry 3072 and baseband processing circuitry 3074 can be on separate chips (or sets of chips), boards, or units, such as radio units and digital units. In alternative embodiments, part or all of RF transceiver circuitry 3072 and baseband processing circuitry 3074 can be on the same chip or set of chips, boards, or units In certain embodiments, some or all of the functionality described herein as being provided by a network node, base station, eNB or other such network device can be performed by processing circuitry 3070 executing instructions stored on device readable medium 3080 or memory within processing circuitry 3070. In alternative embodiments, some or all of the functionality can be provided by processing circuitry 3070 without executing instructions stored on a separate or discrete device readable medium, such as in a hard-wired manner. In any of those embodiments, whether executing instructions stored on a device readable storage medium or not, processing circuitry 3070 can be configured to perform the described functionality. The benefits provided by such functionality are not limited to processing circuitry 3070 alone or to other components of network node 3060 but are enjoyed by network node 3060 as a whole, and/or by end users and the wireless network generally.

Device readable medium 3080 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 3070. Device readable medium 3080 can store any suitable instructions, data or information, including a computer program, software, an application including one or more of logic, rules, code, tables, etc. and/or other instructions capable of being executed by processing circuitry 3070 and, utilized by network node 3060. Device readable medium 3080 can be used to store any calculations made by processing circuitry 3070 and/or any data received via interface 3090. In some embodiments, processing circuitry 3070 and device readable medium 3080 can be considered to be integrated.

Interface 3090 is used in the wired or wireless communication of signaling and/or data between network node 3060, network 3006, and/or WDs 3010. As illustrated, interface 3090 comprises port(s)/terminal(s) 3094 to send and receive data, for example to and from network 3006 over a wired connection. Interface 3090 also includes radio front end circuitry 3092 that can be coupled to, or in certain embodiments a part of, antenna 3062. Radio front end circuitry 3092 comprises filters 3098 and amplifiers 3096. Radio front end circuitry 3092 can be connected to antenna 3062 and processing circuitry 3070. Radio front end circuitry can be configured to condition signals communicated between antenna 3062 and processing circuitry 3070. Radio front end circuitry 3092 can receive digital data that is to be sent out to other network nodes or WDs via a wireless connection. Radio front end circuitry 3092 can convert the digital data into a radio signal having the appropriate channel and bandwidth parameters using a combination of filters 3098 and/or amplifiers 3096. The radio signal can then be transmitted via antenna 3062. Similarly, when receiving data, antenna 3062 can collect radio signals which are then converted into digital data by radio front end circuitry 3092. The digital data can be passed to processing circuitry 3070. In other embodiments, the interface can comprise different components and/or different combinations of components.

In certain alternative embodiments, network node 3060 may not include separate radio front end circuitry 3092, instead, processing circuitry 3070 can comprise radio front end circuitry and can be connected to antenna 3062 without separate radio front end circuitry 3092. Similarly, in some embodiments, all or some of RF transceiver circuitry 3072 can be considered a part of interface 3090. In still other embodiments, interface 3090 can include one or more ports or terminals 3094, radio front end circuitry 3092, and RF transceiver circuitry 3072, as part of a radio unit (not shown), and interface 3090 can communicate with baseband processing circuitry 3074, which is part of a digital unit (not shown).

Antenna 3062 can include one or more antennas, or antenna arrays, configured to send and/or receive wireless signals. Antenna 3062 can be coupled to radio front end circuitry 3090 and can be any type of antenna capable of transmitting and receiving data and/or signals wirelessly. In some embodiments, antenna 3062 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 3062 can be separate from network node 3060 and can be connectable to network node 3060 through an interface or port.

Antenna 3062, interface 3090, and/or processing circuitry 3070 can be configured to perform any receiving operations and/or certain obtaining operations described herein as being performed by a network node. Any information, data and/or signals can be received from a wireless device, another network node and/or any other network equipment. Similarly, antenna 3062, interface 3090, and/or processing circuitry 3070 can be configured to perform any transmitting operations described herein as being performed by a network node. Any information, data and/or signals can be transmitted to a wireless device, another network node and/or any other network equipment.

Power circuitry 3087 can comprise, or be coupled to, power management circuitry and can be configured to supply the components of network node 3060 with power for performing the functionality described herein. Power circuitry 3087 can receive power from power source 3086. Power source 3086 and/or power circuitry 3087 can be configured to provide power to the various components of network node 3060 in a form suitable for the respective components (e.g., at a voltage and current level needed for each respective component). Power source 3086 can either be included in, or external to, power circuitry 3087 and/or network node 3060. For example, network node 3060 can be connectable to an external power source (e.g., an electricity outlet) via an input circuitry or interface such as an electrical cable, whereby the external power source supplies power to power circuitry 3087. As a further example, power source 3086 can comprise a source of power in the form of a battery or battery pack which is connected to, or integrated in, power circuitry 3087. The battery can provide backup power should the external power source fail. Other types of power sources, such as photovoltaic devices, can also be used.

Alternative embodiments of network node 3060 can include additional components beyond those shown in FIG. 30 that can be responsible for providing certain aspects of the network node's functionality, including any of the functionality described herein and/or any functionality necessary to support the subject matter described herein. For example, network node 3060 can include user interface equipment to allow and/or facilitate input of information into network node 3060 and to allow and/or facilitate output of information from network node 3060. This can allow and/or facilitate a user to perform diagnostic, maintenance, repair, and other administrative functions for network node 3060.

In some embodiments, a wireless device (WD, e.g., WD 3010) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 3010 includes antenna 3011, interface 3014, processing circuitry 3020, device readable medium 3030, user interface equipment 3032, auxiliary equipment 3034, power source 3036 and power circuitry 3037. WD 3010 can include multiple sets of one or more of the illustrated components for different wireless technologies supported by WD 3010, such as, for example, GSM, WCDMA, LTE, NR, WiFi, WiMAX, or Bluetooth wireless technologies, just to mention a few. These wireless technologies can be integrated into the same or different chips or set of chips as other components within WD 3010.

Antenna 3011 can include one or more antennas or antenna arrays, configured to send and/or receive wireless signals, and is connected to interface 3014. In certain alternative embodiments, antenna 3011 can be separate from WD 3010 and be connectable to WD 3010 through an interface or port. Antenna 3011, interface 3014, and/or processing circuitry 3020 can be configured to perform any receiving or transmitting operations described herein as being performed by a WD. Any information, data and/or signals can be received from a network node and/or another WD. In some embodiments, radio front end circuitry and/or antenna 3011 can be considered an interface.

As illustrated, interface 3014 comprises radio front end circuitry 3012 and antenna 3011. Radio front end circuitry 3012 comprise one or more filters 3018 and amplifiers 3016. Radio front end circuitry 3014 is connected to antenna 3011 and processing circuitry 3020 and can be configured to condition signals communicated between antenna 3011 and processing circuitry 3020. Radio front end circuitry 3012 can be coupled to or a part of antenna 3011. In some embodiments, WD 3010 may not include separate radio front end circuitry 3012; rather, processing circuitry 3020 can comprise radio front end circuitry and can be connected to antenna 3011. Similarly, in some embodiments, some or all of RF transceiver circuitry 3022 can be considered a part of interface 3014. Radio front end circuitry 3012 can receive digital data that is to be sent out to other network nodes or WDs via a wireless connection. Radio front end circuitry 3012 can convert the digital data into a radio signal having the appropriate channel and bandwidth parameters using a combination of filters 3018 and/or amplifiers 3016. The radio signal can then be transmitted via antenna 3011. Similarly, when receiving data, antenna 3011 can collect radio signals which are then converted into digital data by radio front end circuitry 3012. The digital data can be passed to processing circuitry 3020. In other embodiments, the interface can comprise different components and/or different combinations of components.

Processing circuitry 3020 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 3010 functionality either alone or in combination with other WD 3010 components, such as device readable medium 3030. Such functionality can include any of the various wireless features or benefits discussed herein.

For example, processing circuitry 3020 can execute instructions stored in device readable medium 3030 or in memory within processing circuitry 3020 to provide the functionality disclosed herein. More specifically, instructions (also referred to as a computer program product) stored in medium 3030 can include instructions that, when executed by processor 3020, can configure wireless device 3010 to perform operations corresponding to various exemplary methods (e.g., procedures) described herein.

As illustrated, processing circuitry 3020 includes one or more of RF transceiver circuitry 3022, baseband processing circuitry 3024, and application processing circuitry 3026. In other embodiments, the processing circuitry can comprise different components and/or different combinations of components. In certain embodiments processing circuitry 3020 of WD 3010 can comprise a SOC. In some embodiments, RF transceiver circuitry 3022, baseband processing circuitry 3024, and application processing circuitry 3026 can be on separate chips or sets of chips. In alternative embodiments, part or all of baseband processing circuitry 3024 and application processing circuitry 3026 can be combined into one chip or set of chips, and RF transceiver circuitry 3022 can be on a separate chip or set of chips. In still alternative embodiments, part or all of RF transceiver circuitry 3022 and baseband processing circuitry 3024 can be on the same chip or set of chips, and application processing circuitry 3026 can be on a separate chip or set of chips. In yet other alternative embodiments, part or all of RF transceiver circuitry 3022, baseband processing circuitry 3024, and application processing circuitry 3026 can be combined in the same chip or set of chips. In some embodiments, RF transceiver circuitry 3022 can be a part of interface 3014. RF transceiver circuitry 3022 can condition RF signals for processing circuitry 3020.

In certain embodiments, some or all of the functionality described herein as being performed by a WD can be provided by processing circuitry 3020 executing instructions stored on device readable medium 3030, which in certain embodiments can be a computer-readable storage medium. In alternative embodiments, some or all of the functionality can be provided by processing circuitry 3020 without executing instructions stored on a separate or discrete device readable storage medium, such as in a hard-wired manner. In any of those particular embodiments, whether executing instructions stored on a device readable storage medium or not, processing circuitry 3020 can be configured to perform the described functionality. The benefits provided by such functionality are not limited to processing circuitry 3020 alone or to other components of WD 3010, but are enjoyed by WD 3010 as a whole, and/or by end users and the wireless network generally.

Processing circuitry 3020 can be configured to perform any determining, calculating, or similar operations (e.g., certain obtaining operations) described herein as being performed by a WD. These operations, as performed by processing circuitry 3020, can include processing information obtained by processing circuitry 3020 by, for example, converting the obtained information into other information, comparing the obtained information or converted information to information stored by WD 3010, and/or performing one or more operations based on the obtained information or converted information, and as a result of said processing making a determination.

Device readable medium 3030 can be operable to store a computer program, software, an application including one or more of logic, rules, code, tables, etc. and/or other instructions capable of being executed by processing circuitry 3020. Device readable medium 3030 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 3020. In some embodiments, processing circuitry 3020 and device readable medium 3030 can be considered to be integrated.

User interface equipment 3032 can include components that allow and/or facilitate a human user to interact with WD 3010. Such interaction can be of many forms, such as visual, audial, tactile, etc. User interface equipment 3032 can be operable to produce output to the user and to allow and/or facilitate the user to provide input to WD 3010. The type of interaction can vary depending on the type of user interface equipment 3032 installed in WD 3010. For example, if WD 3010 is a smart phone, the interaction can be via a touch screen; if WD 3010 is a smart meter, the interaction can be through a screen that provides usage (e.g., the number of gallons used) or a speaker that provides an audible alert (e.g., if smoke is detected). User interface equipment 3032 can include input interfaces, devices and circuits, and output interfaces, devices and circuits. User interface equipment 3032 can be configured to allow and/or facilitate input of information into WD 3010 and is connected to processing circuitry 3020 to allow and/or facilitate processing circuitry 3020 to process the input information. User interface equipment 3032 can include, for example, a microphone, a proximity or other sensor, keys/buttons, a touch display, one or more cameras, a USB port, or other input circuitry. User interface equipment 3032 is also configured to allow and/or facilitate output of information from WD 3010, and to allow and/or facilitate processing circuitry 3020 to output information from WD 3010. User interface equipment 3032 can include, for example, a speaker, a display, vibrating circuitry, a USB port, a headphone interface, or other output circuitry. Using one or more input and output interfaces, devices, and circuits, of user interface equipment 3032, WD 3010 can communicate with end users and/or the wireless network and allow and/or facilitate them to benefit from the functionality described herein.

Auxiliary equipment 3034 is operable to provide more specific functionality which may not be generally performed by WDs. This can comprise specialized sensors for doing measurements for various purposes, interfaces for additional types of communication such as wired communications etc. The inclusion and type of components of auxiliary equipment 3034 can vary depending on the embodiment and/or scenario.

Power source 3036 can, in some embodiments, be in the form of a battery or battery pack. Other types of power sources, such as an external power source (e.g., an electricity outlet), photovoltaic devices or power cells, can also be used. WD 3010 can further comprise power circuitry 3037 for delivering power from power source 3036 to the various parts of WD 3010 which need power from power source 3036 to carry out any functionality described or indicated herein. Power circuitry 3037 can in certain embodiments comprise power management circuitry. Power circuitry 3037 can additionally or alternatively be operable to receive power from an external power source; in which case WD 3010 can be connectable to the external power source (such as an electricity outlet) via input circuitry or an interface such as an electrical power cable. Power circuitry 3037 can also in certain embodiments be operable to deliver power from an external power source to power source 3036. This can be, for example, for the charging of power source 3036. Power circuitry 3037 can perform any converting or other modification to the power from power source 3036 to make it suitable for supply to the respective components of WD 3010.

Figure 31:
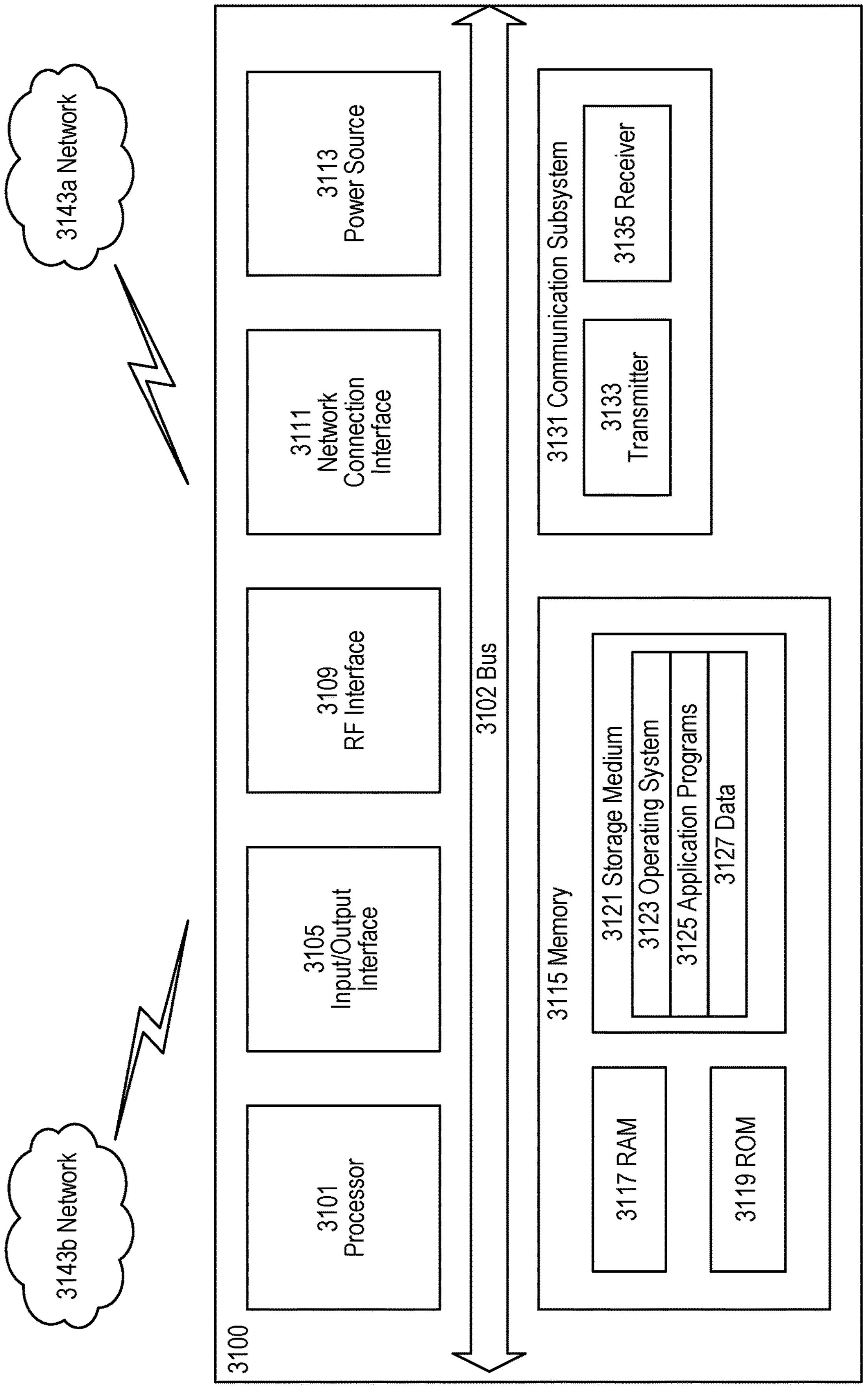
FIG. 31 illustrates an embodiment of a UE.

FIG. 31 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 3100 can be any UE identified by the 3$^{rd}$ Generation Partnership Project (3GPP), including a NB-IoT UE, a machine type communication (MTC) UE, and/or an enhanced MTC (eMTC) UE. UE 3100, as illustrated in FIG. 31, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 31 is a UE, the components discussed herein are equally applicable to a WD, and vice-versa.

In FIG. 31, UE 3100 includes processing circuitry 3101 that is operatively coupled to input/output interface 3105, radio frequency (RF) interface 3109, network connection interface 3111, memory 3115 including random access memory (RAM) 3117, read-only memory (ROM) 3119, and storage medium 3121 or the like, communication subsystem 3131, power source 3133, and/or any other component, or any combination thereof. Storage medium 3121 includes operating system 3123, application program 3125, and data 3127. In other embodiments, storage medium 3121 can include other similar types of information. Certain UEs can utilize all of the components shown in FIG. 31, or only a subset of the components. The level of integration between the components can vary from one UE to another UE. Further, certain UEs can contain multiple instances of a component, such as multiple processors, memories, transceivers, transmitters, receivers, etc.

In FIG. 31, processing circuitry 3101 can be configured to process computer instructions and data. Processing circuitry 3101 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 3101 can include two central processing units (CPUs). Data can be information in a form suitable for use by a computer.

In the depicted embodiment, input/output interface 3105 can be configured to provide a communication interface to an input device, output device, or input and output device. UE 3100 can be configured to use an output device via input/output interface 3105. An output device can use the same type of interface port as an input device. For example, a USB port can be used to provide input to and output from UE 3100. The output device can be a speaker, a sound card, a video card, a display, a monitor, a printer, an actuator, an emitter, a smartcard, another output device, or any combination thereof. UE 3100 can be configured to use an input device via input/output interface 3105 to allow and/or facilitate a user to capture information into UE 3100. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 31, RF interface 3109 can be configured to provide a communication interface to RF components such as a transmitter, a receiver, and an antenna. Network connection interface 3111 can be configured to provide a communication interface to network **3143*a*. Network 3143*a* can encompass wired and/or wireless networks such as a local-area network (LAN), a wide-area network (WAN), a computer network, a wireless network, a telecommunications network, another like network or any combination thereof. For example, network 3143*a* can comprise a Wi-Fi network. Network connection interface 3111 can be configured to include a receiver and a transmitter interface used to communicate with one or more other devices over a communication network according to one or more communication protocols, such as Ethernet, TCP/IP, SONET, ATM, or the like. Network connection interface 3111** can implement receiver and transmitter functionality appropriate to the communication network links (e.g., optical, electrical, and the like). The transmitter and receiver functions can share circuit components, software or firmware, or alternatively can be implemented separately.

RAM 3117 can be configured to interface via bus 3102 to processing circuitry 3101 to provide storage or caching of data or computer instructions during the execution of software programs such as the operating system, application programs, and device drivers. ROM 3119 can be configured to provide computer instructions or data to processing circuitry 3101. For example, ROM 3119 can be configured to store invariant low-level system code or data for basic system functions such as basic input and output (I/O), startup, or reception of keystrokes from a keyboard that are stored in a non-volatile memory. Storage medium 3121 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 3121 can be configured to include operating system 3123; application program 3125 such as a web browser application, a widget or gadget engine or another application; and data file 3127. Storage medium 3121 can store, for use by UE 3100, any of a variety of various operating systems or combinations of operating systems. For example, application program 3125 can include executable program instructions (also referred to as a computer program product) that, when executed by processor 3101, can configure UE 3100 to perform operations corresponding to various exemplary methods (e.g., procedures) described herein.

Storage medium 3121 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 3121 can allow and/or facilitate UE 3100 to access computer-executable instructions, application programs or the like, stored on transitory or non-transitory memory media, to off-load data, or to upload data. An article of manufacture, such as one utilizing a communication system can be tangibly embodied in storage medium 3121, which can comprise a device readable medium.

In FIG. 31, processing circuitry 3101 can be configured to communicate with network 3143*b* using communication subsystem 3131. Network 3143*a* and network 3143*b* can be the same network or networks or different network or networks. Communication subsystem 3131 can be configured to include one or more transceivers used to communicate with network 3143*b*. For example, communication subsystem 3131 can be configured to include one or more transceivers used to communicate with one or more remote transceivers of another device capable of wireless communication such as another WD, UE, or base station of a radio access network (RAN) according to one or more communication protocols, such as IEEE 802.31, CDMA, WCDMA, GSM, LTE, UTRAN, WiMax, or the like. Each transceiver can include transmitter 3133 and/or receiver 3135 to implement transmitter or receiver functionality, respectively, appropriate to the RAN links (e.g., frequency allocations and the like). Further, transmitter 3133 and receiver 3135 of each transceiver can share circuit components, software or firmware, or alternatively can be implemented separately.

In the illustrated embodiment, the communication functions of communication subsystem 3131 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 3131 can include cellular communication, Wi-Fi communication, Bluetooth communication, and GPS communication. Network 3143*b* can encompass wired and/or wireless networks such as a local-area network (LAN), a wide-area network (WAN), a computer network, a wireless network, a telecommunications network, another like network or any combination thereof. For example, network 3143*b* can be a cellular network, a Wi-Fi network, and/or a near-field network. Power source 3113 can be configured to provide alternating current (AC) or direct current (DC) power to components of UE 3100.

The features, benefits and/or functions described herein can be implemented in one of the components of UE 3100 or partitioned across multiple components of UE 3100. Further, the features, benefits, and/or functions described herein can be implemented in any combination of hardware, software or firmware. In one example, communication subsystem 3131 can be configured to include any of the components described herein. Further, processing circuitry 3101 can be configured to communicate with any of such components over bus 3102. In another example, any of such components can be represented by program instructions stored in memory that when executed by processing circuitry 3101 perform the corresponding functions described herein. In another example, the functionality of any of such components can be partitioned between processing circuitry 3101 and communication subsystem 3131. In another example, the non-computationally intensive functions of any of such components can be implemented in software or firmware and the computationally intensive functions can be implemented in hardware.

Figure 32:
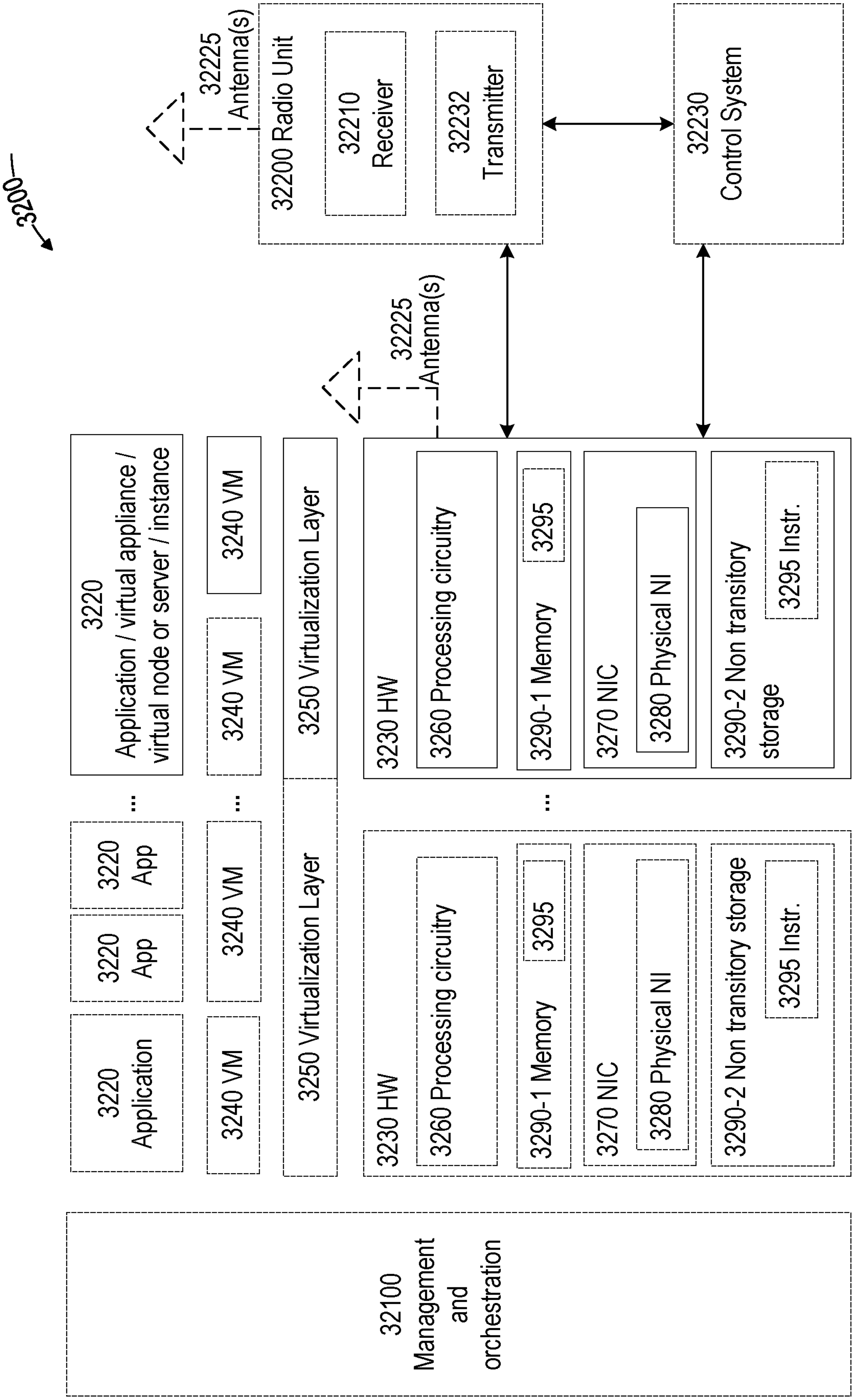
FIG. 32 is a block diagram illustrating an exemplary virtualization environment usable for implementation of various embodiments of network nodes in a wireless network.

FIG. 32 is a schematic block diagram illustrating a virtualization environment 3200 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 3200 hosted by one or more of hardware nodes 3230. Further, in embodiments in which the virtual node is not a radio access node or does not require radio connectivity (e.g., a core network node), then the network node can be entirely virtualized.

The functions can be implemented by one or more applications 3220 (which can alternatively be called software instances, virtual appliances, network functions, virtual nodes, virtual network functions, etc.) operative to implement some of the features, functions, and/or benefits of some of the embodiments disclosed herein. Applications 3220 are run in virtualization environment 3200 which provides hardware 3230 comprising processing circuitry 3260 and memory 3290. Memory 3290 contains instructions 3295 executable by processing circuitry 3260 whereby application 3220 is operative to provide one or more of the features, benefits, and/or functions disclosed herein.

Virtualization environment 3200 can include general-purpose or special-purpose network hardware devices (or nodes) 3230 comprising a set of one or more processors or processing circuitry 3260, which can be commercial off-the-shelf (COTS) processors, dedicated Application Specific Integrated Circuits (ASICs), or any other type of processing circuitry including digital or analog hardware components or special purpose processors. Each hardware device can comprise memory 3290-1 which can be non-persistent memory for temporarily storing instructions 3295 or software executed by processing circuitry 3260. For example, instructions 3295 can include program instructions (also referred to as a computer program product) that, when executed by processing circuitry 3260, can configure hardware node 3220 to perform operations corresponding to various exemplary methods (e.g., procedures) described herein. Such operations can also be attributed to virtual node(s) 3220 that is/are hosted by hardware node 3230.

Each hardware device can comprise one or more network interface controllers (NICs) 3270, also known as network interface cards, which include physical network interface 3280. Each hardware device can also include non-transitory, persistent, machine-readable storage media 3290-2 having stored therein software 3295 and/or instructions executable by processing circuitry 3260. Software 3295 can include any type of software including software for instantiating one or more virtualization layers 3250 (also referred to as hypervisors), software to execute virtual machines 3240 as well as software allowing it to execute functions, features and/or benefits described in relation with some embodiments described herein.

Virtual machines 3240, comprise virtual processing, virtual memory, virtual networking or interface and virtual storage, and can be run by a corresponding virtualization layer 3250 or hypervisor. Different embodiments of the instance of virtual appliance 3220 can be implemented on one or more of virtual machines 3240, and the implementations can be made in different ways.

During operation, processing circuitry 3260 executes software 3295 to instantiate the hypervisor or virtualization layer 3250, which can sometimes be referred to as a virtual machine monitor (VMM). Virtualization layer 3250 can present a virtual operating platform that appears like networking hardware to virtual machine 3240.

As shown in FIG. 32, hardware 3230 can be a standalone network node with generic or specific components. Hardware 3230 can comprise antenna 32225 and can implement some functions via virtualization. Alternatively, hardware 3230 can be part of a larger cluster of hardware (e.g., such as in a data center or customer premise equipment (CPE)) where many hardware nodes work together and are managed via management and orchestration (MANO) 32100, which, among others, oversees lifecycle management of applications 3220.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 3240 can be a software implementation of a physical machine that runs programs as if they were executing on a physical, non-virtualized machine. Each of virtual machines 3240, and that part of hardware 3230 that executes that virtual machine, be it hardware dedicated to that virtual machine and/or hardware shared by that virtual machine with others of the virtual machines 3240, forms a separate virtual network elements (VNE).

Still in the context of NFV, Virtual Network Function (VNF) is responsible for handling specific network functions that run in one or more virtual machines 3240 on top of hardware networking infrastructure 3230 and corresponds to application 3220 in FIG. 32.

In some embodiments, one or more radio units 32200 that each include one or more transmitters 32232 and one or more receivers 32210 can be coupled to one or more antennas 32225. Radio units 32200 can communicate directly with hardware nodes 3230 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 32230, which can alternatively be used for communication between the hardware nodes 3230 and radio units 32200.

Figure 33:
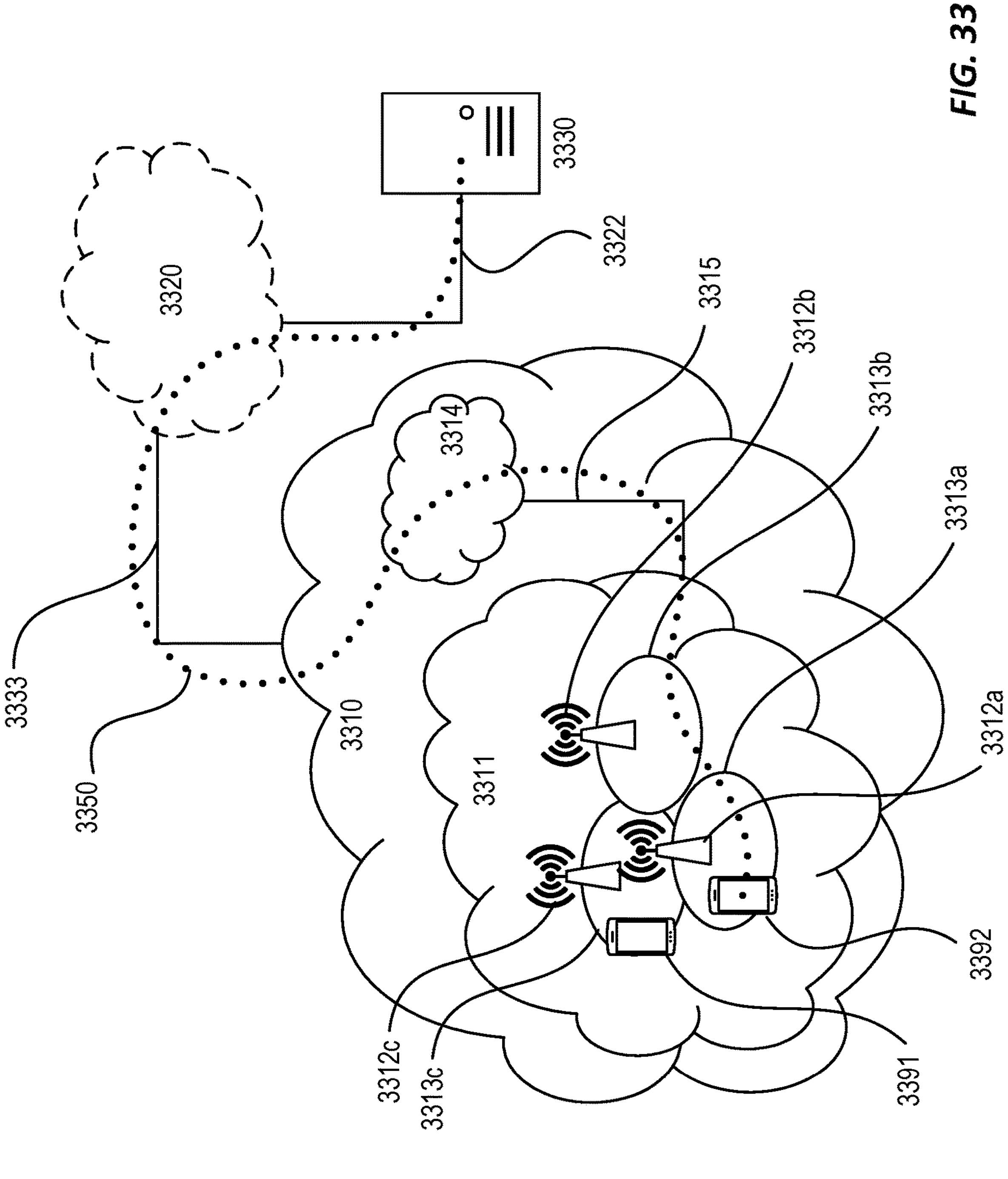
FIGS. 33-34 are block diagrams of various communication systems and/or networks, according to various embodiments of the present disclosure.

With reference to FIG. 33, in accordance with an embodiment, a communication system includes telecommunication network 3310, such as a 3GPP-type cellular network, which comprises access network 3311, such as a radio access network, and core network 3314. Access network 3311 comprises a plurality of base stations 3312*a*, 3312*b*, 3312*c*, such as NBs, eNBs, gNBs or other types of wireless access points, each defining a corresponding coverage area 3313*a*, 3313*b*, 3313*c*. Each base station 3312*a*, 3312*b*, 3312*c* is connectable to core network 3314 over a wired or wireless connection 3315. A first UE 3391 located in coverage area 3313*c* can be configured to wirelessly connect to, or be paged by, the corresponding base station 3312*c*. A second UE 3392 in coverage area 3313*a* is wirelessly connectable to the corresponding base station 3312*a*. While a plurality of UEs 3391, 3392 are illustrated in this example, the disclosed embodiments are equally applicable to a situation where a sole UE is in the coverage area or where a sole UE is connecting to the base stations in the coverage area.

Telecommunication network 3310 is itself connected to host computer 3330, which can be embodied in the hardware and/or software of a standalone server, a cloud-implemented server, a distributed server or as processing resources in a server farm. Host computer 3330 can be under the ownership or control of a service provider or can be operated by the service provider or on behalf of the service provider. Connections 3333 and 3322 between telecommunication network 3310 and host computer 3330 can extend directly from core network 3314 to host computer 3330 or can go via an optional intermediate network 3320. Intermediate network 3320 can be one of, or a combination of more than one of, a public, private or hosted network; intermediate network 3320, if any, can be a backbone network or the Internet; in particular, intermediate network 3320 can comprise two or more sub-networks (not shown).

The communication system of FIG. 33 as a whole enables connectivity between the connected UEs 3391, 3392 and host computer 3330. The connectivity can be described as an over-the-top (OTT) connection 3350. Host computer 3330 and the connected UEs 3391, 3392 are configured to communicate data and/or signaling via OTT connection 3350, using access network 3311, core network 3314, any intermediate network 3320 and possible further infrastructure (not shown) as intermediaries. OTT connection 3350 can be transparent in the sense that the participating communication devices through which OTT connection 3350 passes are unaware of routing of uplink and downlink communications. For example, base station 3312 may not or need not be informed about the past routing of an incoming downlink communication with data originating from host computer 3330 to be forwarded (e.g., handed over) to a connected UE 3391. Similarly, base station 3312 need not be aware of the future routing of an outgoing uplink communication originating from the UE 3391 towards the host computer 3330.

Example implementations, in accordance with an embodiment, of the UE, base station and host computer discussed in the preceding paragraphs will now be described with reference to FIG. 34. In communication system 3400, host computer 3410 comprises hardware 3415 including communication interface 3416 configured to set up and maintain a wired or wireless connection with an interface of a different communication device of communication system 3400. Host computer 3410 further comprises processing circuitry 3418, which can have storage and/or processing capabilities. In particular, processing circuitry 3418 can comprise one or more programmable processors, application-specific integrated circuits, field programmable gate arrays or combinations of these (not shown) adapted to execute instructions. Host computer 3410 further comprises software 3411, which is stored in or accessible by host computer 3410 and executable by processing circuitry 3418. Software 3411 includes host application 3412. Host application 3412 can be operable to provide a service to a remote user, such as UE 3430 connecting via OTT connection 3450 terminating at UE 3430 and host computer 3410. In providing the service to the remote user, host application 3412 can provide user data which is transmitted using OTT connection 3450.

Communication system 3400 can also include base station 3420 provided in a telecommunication system and comprising hardware 3425 enabling it to communicate with host computer 3410 and with UE 3430. Hardware 3425 can include communication interface 3426 for setting up and maintaining a wired or wireless connection with an interface of a different communication device of communication system 3400, as well as radio interface 3427 for setting up and maintaining at least wireless connection 3470 with UE 3430 located in a coverage area (not shown in FIG. 34) served by base station 3420. Communication interface 3426 can be configured to facilitate connection 3460 to host computer 3410. Connection 3460 can be direct, or it can pass through a core network (not shown in FIG. 34) of the telecommunication system and/or through one or more intermediate networks outside the telecommunication system. In the embodiment shown, hardware 3425 of base station 3420 can also include processing circuitry 3428, which can comprise one or more programmable processors, application-specific integrated circuits, field programmable gate arrays or combinations of these (not shown) adapted to execute instructions.

Base station 3420 also includes software 3421 stored internally or accessible via an external connection. For example, software 3421 can include program instructions (also referred to as a computer program product) that, when executed by processing circuitry 3428, can configure base station 3420 to perform operations corresponding to various exemplary methods (e.g., procedures) described herein.

Communication system 3400 can also include UE 3430 already referred to, whose hardware 3435 can include radio interface 3437 configured to set up and maintain wireless connection 3470 with a base station serving a coverage area in which UE 3430 is currently located. Hardware 3435 of UE 3430 can also include processing circuitry 3438, which can comprise one or more programmable processors, application-specific integrated circuits, field programmable gate arrays or combinations of these (not shown) adapted to execute instructions.

UE 3430 also includes software 3431, which is stored in or accessible by UE 3430 and executable by processing circuitry 3438. Software 3431 includes client application 3432. Client application 3432 can be operable to provide a service to a human or non-human user via UE 3430, with the support of host computer 3410. In host computer 3410, an executing host application 3412 can communicate with the executing client application 3432 via OTT connection 3450 terminating at UE 3430 and host computer 3410. In providing the service to the user, client application 3432 can receive request data from host application 3412 and provide user data in response to the request data. OTT connection 3450 can transfer both the request data and the user data. Client application 3432 can interact with the user to generate the user data that it provides. Software 3431 can also include program instructions (also referred to as a computer program product) that, when executed by processing circuitry 3438, can configure UE 3430 to perform operations corresponding to various exemplary methods (e.g., procedures) described herein.

Figure 34:
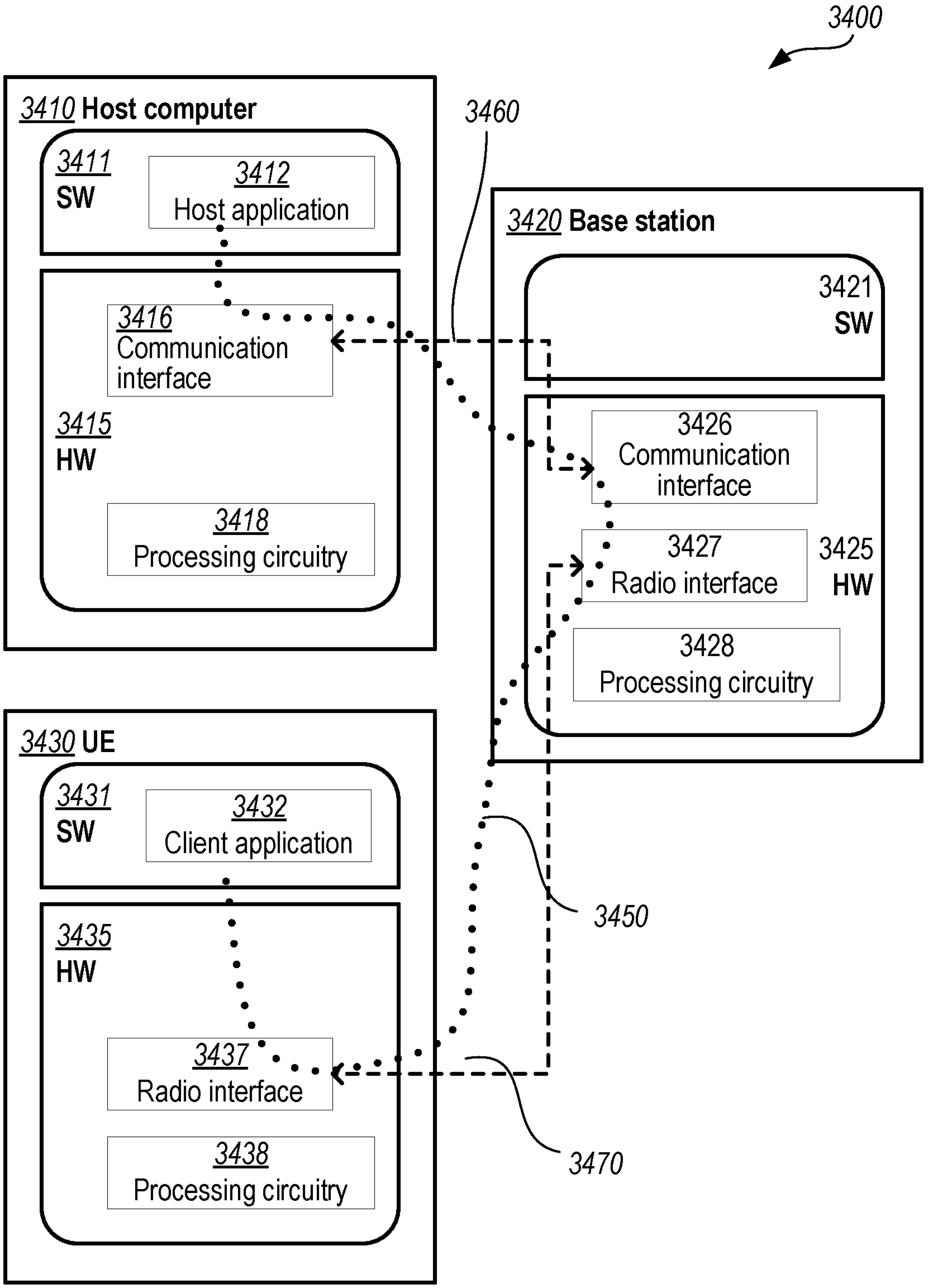

It is noted that host computer 3410, base station 3420 and UE 3430 illustrated in FIG. 34 can be similar or identical to host computer 1230, one of base stations 3312*a*, 3312*b*, 3312*c* and one of UEs 3391, 3392 of FIG. 33, respectively. This is to say, the inner workings of these entities can be as shown in FIG. 34 and independently, the surrounding network topology can be that of FIG. 33.

In FIG. 34, OTT connection 3450 has been drawn abstractly to illustrate the communication between host computer 3410 and UE 3430 via base station 3420, without explicit reference to any intermediary devices and the precise routing of messages via these devices. Network infrastructure can determine the routing, which it can be configured to hide from UE 3430 or from the service provider operating host computer 3410, or both. While OTT connection 3450 is active, the network infrastructure can further take decisions by which it dynamically changes the routing (e.g., on the basis of load balancing consideration or reconfiguration of the network).

Wireless connection 3470 between UE 3430 and base station 3420 is in accordance with the teachings of the embodiments described throughout this disclosure. One or more of the various embodiments improve the performance of OTT services provided to UE 3430 using OTT connection 3450, in which wireless connection 3470 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 3450 between host computer 3410 and UE 3430, in response to variations in the measurement results. The measurement procedure and/or the network functionality for reconfiguring OTT connection 3450 can be implemented in software 3411 and hardware 3415 of host computer 3410 or in software 3431 and hardware 3435 of UE 3430, or both. In embodiments, sensors (not shown) can be deployed in or in association with communication devices through which OTT connection 3450 passes; the sensors can participate in the measurement procedure by supplying values of the monitored quantities exemplified above, or supplying values of other physical quantities from which software 3411, 3431 can compute or estimate the monitored quantities. The reconfiguring of OTT connection 3450 can include message format, retransmission settings, preferred routing etc.; the reconfiguring need not affect base station 3420, and it can be unknown or imperceptible to base station 3420. Such procedures and functionalities can be known and practiced in the art. In certain embodiments, measurements can involve proprietary UE signaling facilitating host computer 3410's measurements of throughput, propagation times, latency and the like. The measurements can be implemented in that software 3411 and 3431 causes messages to be transmitted, in particular empty or 'dummy' messages, using OTT connection 3450 while it monitors propagation times, errors, etc.

Figure 35:
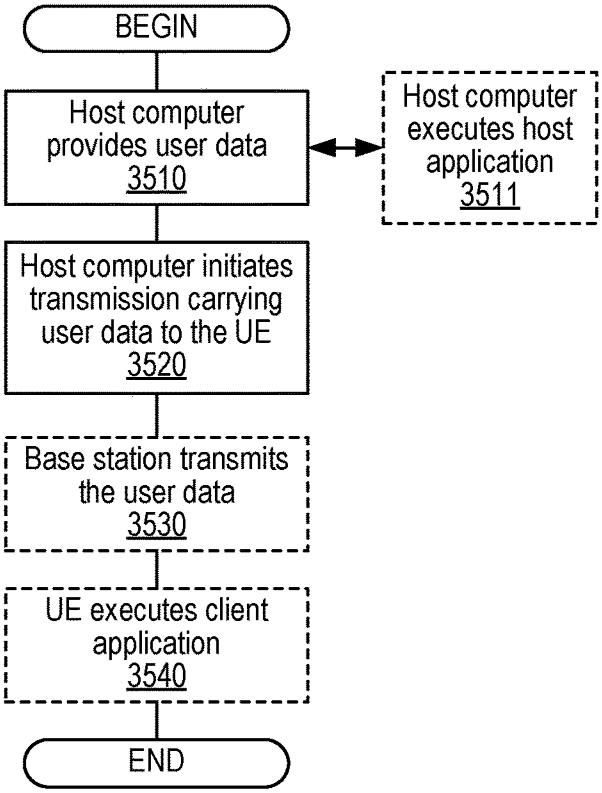
FIGS. 35-38 are flow diagrams of exemplary methods (e.g., procedures) for transmission and/or reception of user data, according to various embodiments of the present disclosure.

FIG. 35 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 35 will be included in this section. In step 3510, the host computer provides user data. In substep 3511 (which can be optional) of step 3510, the host computer provides the user data by executing a host application. In step 3520, the host computer initiates a transmission carrying the user data to the UE. In step 3530 (which can be optional), the base station transmits to the UE the user data which was carried in the transmission that the host computer initiated, in accordance with the teachings of the embodiments described throughout this disclosure. In step 3540 (which can also be optional), the UE executes a client application associated with the host application executed by the host computer.

Figure 36:
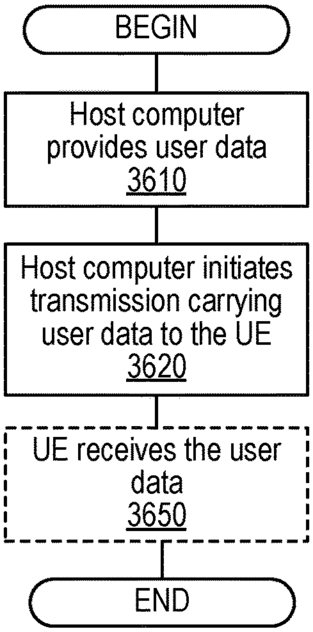

FIG. 36 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 36 will be included in this section. In step 3610 of the method, the host computer provides user data. In an optional substep (not shown) the host computer provides the user data by executing a host application. In step 3620, the host computer initiates a transmission carrying the user data to the UE. The transmission can pass via the base station, in accordance with the teachings of the embodiments described throughout this disclosure. In step 3630 (which can be optional), the UE receives the user data carried in the transmission.

Figure 37:
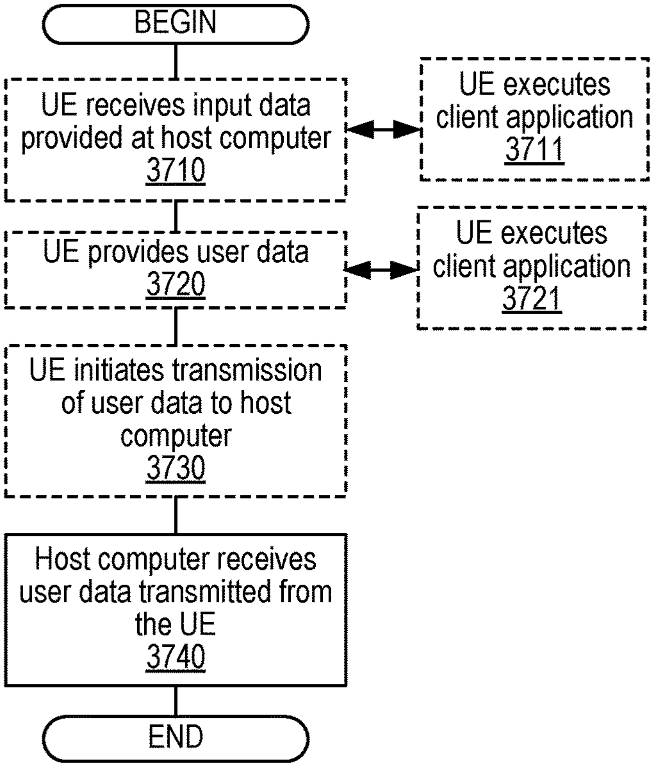

FIG. 37 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 37 will be included in this section. In step 3710 (which can be optional), the UE receives input data provided by the host computer. Additionally or alternatively, in step 3720, the UE provides user data. In substep 3721 (which can be optional) of step 3720, the UE provides the user data by executing a client application. In substep 3711 (which can be optional) of step 3710, the UE executes a client application which provides the user data in reaction to the received input data provided by the host computer. In providing the user data, the executed client application can further consider user input received from the user. Regardless of how the user data was provided, the UE initiates, in substep 3730 (which can be optional), transmission of the user data to the host computer. In step 3740 of the method, the host computer receives the user data transmitted from the UE, in accordance with the teachings of the embodiments described throughout this disclosure.

Figure 38:
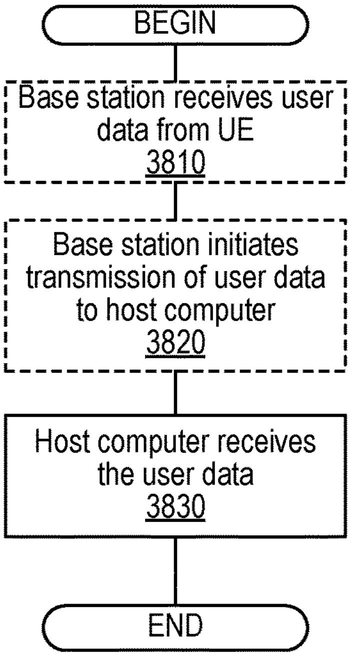

FIG. 38 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 38 will be included in this section. In step 3810 (which can be optional), in accordance with the teachings of the embodiments described throughout this disclosure, the base station receives user data from the UE. In step 3820 (which can be optional), the base station initiates transmission of the received user data to the host computer. In step 3830 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method for a user equipment (UE) configured to communicate with a wireless network via a master cell group (MCG) and a secondary cell group (SCG), the method comprising:
- while in a normal mode of operation for the SCG, receiving the following from a second node associated with the SCG:
  - a first transmission configuration indicator (TCI) state associated with a physical downlink control channel (PDCCH) of the SCG, and
  - a command to enter a reduced-energy mode for the SCG;
- while in the reduced-energy mode for the SCG, performing SCG measurements based on the first TCI state and/or receiving a second TCI state associated with the PDCCH of the SCG; and
- upon exiting the reduced-energy mode for the SCG, monitoring the PDCCH of the SCG based on the second TCI state.

B1. A method for a first node, of a wireless network, associated with a master cell group (MCG) for a user equipment (UE) also configured to communicate with the wireless network via a secondary cell group (SCG), the method comprising one or more of the following operations while the UE is in a reduced-energy mode for the SCG:
- receiving, from the UE, one or more reports of measurements performed based on a first transmission configuration indicator (TCI) state associated with a physical downlink control channel (PDCCH) of the SCG;
- forwarding the one or more reports to a second node associated with the SCG;
- determining a second TCI state associated with the PDCCH of the SCG;
- sending the second TCI state to the UE; and
- sending, to the UE, a request to resume a normal mode of operation for the SCG.

C1. A method for a second node, of a wireless network, associated with a secondary cell group (SCG) for a user equipment (UE) also configured to communicate with the wireless network via a master cell group (MCG), the method comprising:
- sending the following to the UE while the UE is in a normal mode of operation for the SCG:
  - a first transmission configuration indicator (TCI) state associated with a physical downlink control channel (PDCCH) of the SCG, and
  - a command to enter a reduced-energy mode for the SCG;
- performing one or more of the following operations while the UE is in the reduced-energy mode for the SCG:
  - determining a second TCI state associated with the PDCCH of the SCG;
  - sending the second TCI state to a first node associated with the MCG;
  - receiving, from the first node, one or more reports of measurements performed by the UE based on the first TCI state; and
  - sending, to the first node, a request to resume the UE's normal mode of operation for the SCG; and
- after the UE exits the reduced-energy mode for the SCG, transmitting the PDCCH based on the second TCI state.

D1. A user equipment (UE) configured to communicate with a wireless network via a master cell group (MCG) and a secondary cell group (SCG), the UE comprising:
- radio transceiver circuitry configured to communicate with the wireless network via the SCG and a master cell group (MCG); and
- processing circuitry operatively coupled to the radio transceiver circuitry, whereby the processing circuitry and the radio transceiver circuitry are configured to perform operations corresponding to the method of embodiment A1.

D2. A user equipment (UE) to communicate with a wireless network via a master cell group (MCG) and a secondary cell group (SCG), the UE being further arranged to perform operations corresponding to the method of embodiment A1.

D3. A non-transitory, computer-readable medium storing computer-executable instructions that, when executed by processing circuitry of a user equipment (UE) arranged to communicate with a wireless network via a master cell group (MCG) and a secondary cell group (SCG), configure the UE to perform operations corresponding to the method of embodiment A1.

D4. A computer program product comprising computer-executable instructions that, when executed by processing circuitry of a user equipment (UE) arranged to communicate with a wireless network via a master cell group (MCG) and a secondary cell group (SCG), configure the UE to perform operations corresponding to the method of embodiment A1.

E1. A network node, of a wireless network, arranged to communicate with a user equipment (UE) via a master cell group (MCG) or a secondary cell group (SCG), the network node comprising:
- communication interface circuitry configured to communicate with the UE via one of the SCG or the MCG, and with a further network that communicates with the UE via the other of the SCG or the MCG; and
- processing circuitry operatively coupled to the communication interface circuitry, whereby the processing circuitry and the communication interface circuitry are configured to perform operations corresponding to any of the methods of embodiments B1 and C1.

E2. A network node, of a wireless network, arranged to communicate with a user equipment (UE) via a master cell group (MCG) or a secondary cell group (SCG), the network node being further arranged to perform operations corresponding to any of the methods of embodiments B1 and C1.

E3. A non-transitory, computer-readable medium storing computer-executable instructions that, when executed by processing circuitry of a network node arranged to communicate with a user equipment (UE) via a master cell group (MCG) or a secondary cell group (SCG), configure the network node to perform operations corresponding to any of the methods of embodiments B1 and C1.

E4. A computer program product comprising computer-executable instructions that, when executed by processing circuitry of a network node arranged to communicate with a user equipment (UE) via a master cell group (MCG) or a secondary cell group (SCG), configure the network node to perform operations corresponding to any of the methods of embodiments B1 and C1.

The invention claimed is:

1. A method for a user equipment (UE) configured to communicate with a wireless network via a master cell group (MCG) and a secondary cell group (SCG), the method comprising:
- entering a reduced-energy mode for the SCG responsive to receiving a first command via the MCG or the SCG; and
- while in the reduced-energy mode for the SCG and in a connected mode for the MCG, performing SCG measurements and reporting the SCG measurements to the wireless network;
- while in the reduced-energy mode for the SCG and in the connected mode for the MCG, receiving, via the MCG, a second command to enter connected mode for the SCG, wherein a Transmission Configuration Indicator (TCI) state associated with a physical downlink control channel (PDCCH) of the SCG is included in or received with the second command; and
- upon exiting the reduced-energy mode for the SCG responsive to the second command, monitoring the PDCCH of the SCG based on the received TCI state.

2. The method of claim 1, wherein:
- the SCG includes a primary SCG cell (PSCell) and one or more secondary cells (SCells);
- the SCG measurements are reported via the PSCell; and
- the one or more SCells have no uplinks configured while the UE is in the reduced-energy mode for the SCG.

3. The method of claim 1, wherein reporting the SCG measurements while in the reduced-energy mode for the SCG is responsive to one of the following:
- one or more conditions that are also applicable to reporting of SCG measurements while in the connected mode for the SCG; or
- a reporting period that is greater than a reporting period for SCG measurements while in the connected mode for the SCG.

4. The method of claim 1, wherein the received TCI state is different than a most recent TCI state associated with the PDCCH of the SCG, wherein the most recent TCI state is received before entering the reduced-energy mode for the SCG.

5. The method of claim 1, wherein:
- one of the following first conditions applies:
  - the second command is received and the SCG measurements are reported via a same one of the MCG and the SCG; or
  - the second command is received and the SCG measurements are reported via different ones of the MCG and the SCG; and
- one of the following second conditions applies:
  - the TCI state is received and the SCG measurements are reported via a same one of the MCG and the SCG; or
  - the TCI state is received and the SCG measurements are reported via different ones of the MCG and the SCG.

6. The method of claim 1, wherein:
- the TCI state is received as a medium access control (MAC) control element (CE) via a PDCCH in a first cell of the SCG, and
- the method further comprises performing one or more of the following while in the reduced-energy mode for the SCG:
  - refraining from monitoring PDCCH in one or more other cells of the SCG; and
  - monitoring a subset of the PDCCH in the first cell of the SCG based on the TCI state.

7. The method of claim 1, wherein:
- the TCI state is received as a medium access control (MAC) control element (CE) via a PDCCH in a first cell of the MCG; and
- the method further comprises refraining from monitoring PDCCH in one or more other cells of the MCG while in the reduced-energy mode for the SCG.

8. A method for a second network node configured to provide a secondary cell group (SCG) for a user equipment (UE) in a wireless network, the method comprising:

while the UE is in a connected mode for the SCG, sending to the UE a command to enter a reduced-energy mode for the SCG; and performing the following operations while the UE is in the reduced-energy mode for the SCG and in a connected mode for a master cell group (MCG) in the wireless network:

receiving one or more reports of SCG measurements performed by the UE while the UE is in the reduced-energy mode for the SCG and in the connected mode for the MCG;

based on the one or more reports of SCG measurements, determining a TCI state associated with a physical downlink control channel (PDCCH) of the SCG;

receiving, from a first network node configured to provide the MCG, a request for an updated TCI state associated with the PDCCH of the SCG; and sending the determined TCI state to the first network node in response to the request.

9. The method of claim 8, wherein:

the SCG includes a primary SCG cell (PSCell) and one or more secondary cell (SCells);

the reports of SCG measurements are received from the UE via the PSCell; and the one or more SCells have no uplinks configured while the UE is in the reduced-energy mode for the SCG.

10. The method of claim 8, wherein the reports of SCG measurements are received responsive to one of the following:

one or more conditions that are also applicable to reporting of SCG measurements while the UE is in the connected mode for the SCG; or a reporting period that is greater than a reporting period for SCG measurements while the UE is in the connected mode for the SCG.

11. The method of claim 8, further comprising:

after the UE exits the reduced-energy mode for the SCG, transmitting the PDCCH based on the TCI state.

12. The method of claim 11, wherein one or more of the following applies:

the TCI state is sent to the UE as a medium access control (MAC) control element (CE) via a PDCCH in a first cell of the SCG;

the method further comprises refraining from transmitting PDCCH to the UE in one or more other cells of the SCG while the UE is in the reduced-energy mode for the SCG; and the TCI state is sent in a subset of the PDCCH in the first cell of the SCG.

13. The method of claim 8, wherein the TCI state is different than a most recent TCI state associated with the PDCCH of the SCG, the most recent TCI state being sent to the UE before the UE entered the reduced-energy mode for the SCG.

14. A method for a first network node configured to provide a master cell group (MCG) for a user equipment (UE) in a wireless network, the method comprising the following operations while the UE is in a connected mode for the MCG and in a reduced-energy mode for a secondary cell group (SCG) in the wireless network:

receiving, from the UE via the MCG, one or more reports of SCG measurements performed by the UE while the UE is in the reduced-energy mode for the SCG and in the connected mode for the MCG;

sending, to a second network node configured to provide the SCG, a request for an updated Transmission Configuration Indicator (TCI) state associated with a physical downlink control channel (PDCCH) of the SCG;

receiving, from the second network node in response to the request, a TCI state associated with the PDCCH of the SCG; and sending, to the UE via the MCG, a command to enter the connected mode for the SCG, wherein the TCI state is included in or sent with the command.

15. The method of claim 14, wherein one or more of the following applies:

the TCI state and the command are sent concurrently;

the TCI state is sent as a medium access control (MAC) control element (CE) via a PDCCH in a first cell of the MCG; and the method further comprises refraining from transmitting PDCCH to the UE in one or more other cells of the MCG while the UE is in the reduced-energy mode for the SCG.

* * * * *